(12) United States Patent
Hotelling et al.

(10) Patent No.: US 7,653,883 B2
(45) Date of Patent: Jan. 26, 2010

(54) PROXIMITY DETECTOR IN HANDHELD DEVICE

(75) Inventors: Steve P. Hotelling, San Jose, CA (US); Duncan Robert Kerr, San Francisco, CA (US); Bas Ording, San Francisco, CA (US); Jonathan P. Ive, San Francisco, CA (US); Peter J. Kennedy, Boca Raton, FL (US); Anthony M. Fadell, Portola Valley, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 513 days.

(21) Appl. No.: 11/241,839

(22) Filed: Sep. 30, 2005

(65) Prior Publication Data

US 2006/0161871 A1 Jul. 20, 2006

Related U.S. Application Data

(63) Continuation-in-part of application No. 11/165,958, filed on Jun. 23, 2005, and a continuation-in-part of application No. 10/927,925, filed on Aug. 26, 2004, and a continuation-in-part of application No. 11/038,590, filed on Jan. 18, 2005, and a continuation-in-part of application No. 10/903,964, filed on Jul. 30, 2004.

(51) Int. Cl.
*G06F 3/033* (2006.01)
(52) U.S. Cl. ....................... 715/863; 715/864
(58) Field of Classification Search ................ 715/864, 715/808, 764, 863, 862; 345/173–177
See application file for complete search history.

(56) References Cited

U.S. PATENT DOCUMENTS

| 3,333,160 A | 7/1967 | Gorski |
| 3,541,541 A | 11/1970 | Englebart |
| 3,662,105 A | 5/1972 | Hurst et al. |
| 3,798,370 A | 3/1974 | Hurst |
| 4,246,452 A | 1/1981 | Chandler |
| 4,550,221 A | 10/1985 | Mabusth |
| 4,672,364 A | 6/1987 | Lucas |

(Continued)

FOREIGN PATENT DOCUMENTS

CA       1243096       10/1988

(Continued)

OTHER PUBLICATIONS

"4-Wire Resistive Touchscreens," http://www.touchscreens.com/intro-touchtypes-4resistive.html, downloaded Aug. 5, 2005.
"5-Wire Resistive Touchscreens," http://www.touchscreens.com/intro-touchtypes-resistive.html, downloaded Aug. 5, 2005.
"MultiTouch Overview," FingerWorks, http://www.fingerworks.com/multoverview.html downloaded Aug. 30, 2005.

(Continued)

*Primary Examiner*—Kieu Vu
*Assistant Examiner*—Omar Abdul-Ali
(74) *Attorney, Agent, or Firm*—Morrison & Foerster LLP

(57) ABSTRACT

Proximity based systems and methods that are implemented on an electronic device are disclosed. The method includes sensing an object spaced away and in close proximity to the electronic device. The method also includes performing an action in the electronic device when an object is sensed.

34 Claims, 24 Drawing Sheets

U.S. PATENT DOCUMENTS

| | | | |
|---|---|---|---|
| 4,672,558 A | 6/1987 | Beckes et al. | |
| 4,692,809 A | 9/1987 | Beining et al. | |
| 4,695,827 A | 9/1987 | Beining et al. | |
| 4,733,222 A | 3/1988 | Evans | |
| 4,734,685 A | 3/1988 | Watanabe et al. | |
| 4,746,770 A | 5/1988 | McAvinney | |
| 4,771,276 A | 9/1988 | Parks | |
| 4,788,384 A | 11/1988 | Bruere-Dawson et al. | |
| 4,806,846 A | 2/1989 | Kerber | |
| 4,898,555 A | 2/1990 | Sampson | |
| 4,968,877 A | 11/1990 | McAvinney et al. | |
| 5,003,519 A | 3/1991 | Noirjean et al. | |
| 5,017,030 A | 5/1991 | Crews | |
| 5,178,477 A | 1/1993 | Gambaro | |
| 5,189,403 A | 2/1993 | Franz et al. | |
| 5,194,862 A | 3/1993 | Edwards et al. | |
| 5,224,861 A | 7/1993 | Glass et al. | |
| 5,241,308 A | 8/1993 | Young | |
| 5,252,951 A | 10/1993 | Tannenbaum | |
| 5,281,966 A | 1/1994 | Walsh | |
| 5,305,017 A | 4/1994 | Gerpheide | |
| 5,319,386 A | 6/1994 | Gunn et al. | |
| 5,345,543 A | 9/1994 | Capps et al. | |
| 5,347,295 A * | 9/1994 | Agulnick et al. | 345/156 |
| 5,367,453 A | 11/1994 | Capps et al. | |
| 5,376,948 A | 12/1994 | Roberts | |
| 5,379,057 A | 1/1995 | Clough et al. | |
| 5,398,310 A | 3/1995 | Tchao et al. | |
| 5,442,742 A | 8/1995 | Greyson et al. | |
| 5,463,388 A | 10/1995 | Boie et al. | |
| 5,463,696 A | 10/1995 | Beernink et al. | |
| 5,471,578 A | 11/1995 | Moran et al. | |
| 5,479,528 A | 12/1995 | Speeter | |
| 5,483,261 A | 1/1996 | Yasutake | |
| 5,488,204 A | 1/1996 | Mead et al. | |
| 5,495,077 A | 2/1996 | Miller et al. | |
| 5,513,309 A | 4/1996 | Beier et al. | |
| 5,523,775 A | 6/1996 | Capps | |
| 5,530,455 A | 6/1996 | Gillick et al. | |
| 5,543,590 A | 8/1996 | Gillespie et al. | |
| 5,543,591 A | 8/1996 | Gillespie et al. | |
| 5,548,667 A | 8/1996 | Tu | |
| 5,559,301 A | 9/1996 | Bryan, Jr. et al. | |
| 5,563,632 A | 10/1996 | Roberts | |
| 5,563,996 A | 10/1996 | Tchao | |
| 5,565,658 A | 10/1996 | Gerpheide et al. | |
| 5,572,647 A | 11/1996 | Blades | |
| 5,579,036 A | 11/1996 | Yates, IV | |
| 5,581,681 A | 12/1996 | Tchao et al. | |
| 5,583,946 A | 12/1996 | Gourdol | |
| 5,589,856 A | 12/1996 | Stein et al. | |
| 5,590,219 A | 12/1996 | Gourdol | |
| 5,592,566 A | 1/1997 | Pagallo et al. | |
| 5,594,469 A | 1/1997 | Freeman et al. | |
| 5,594,810 A | 1/1997 | Gourdol | |
| 5,596,694 A | 1/1997 | Capps | |
| 5,612,719 A | 3/1997 | Beernink et al. | |
| 5,625,715 A | 4/1997 | Trew et al. | |
| 5,631,805 A | 5/1997 | Bonsall et al. | |
| 5,633,955 A | 5/1997 | Bozinovic et al. | |
| 5,634,102 A | 5/1997 | Capps | |
| 5,636,101 A | 6/1997 | Bonsall et al. | |
| 5,642,108 A | 6/1997 | Gopher et al. | |
| 5,644,657 A | 7/1997 | Capps et al. | |
| 5,666,113 A | 9/1997 | Logan | |
| 5,666,502 A | 9/1997 | Capps | |
| 5,666,552 A | 9/1997 | Greyson et al. | |
| 5,675,361 A | 10/1997 | Santilli | |
| 5,675,362 A | 10/1997 | Clough et al. | |
| 5,677,710 A | 10/1997 | Thompson-Rohrlich | |
| 5,689,253 A | 11/1997 | Hargreaves et al. | |
| 5,710,844 A | 1/1998 | Capps et al. | |
| 5,729,250 A | 3/1998 | Bishop et al. | |
| 5,730,165 A | 3/1998 | Philipp | |
| 5,736,976 A | 4/1998 | Cheung | |
| 5,741,990 A | 4/1998 | Davies et al. | |
| 5,745,116 A | 4/1998 | Pisutha-Arnond | |
| 5,745,716 A | 4/1998 | Tchao et al. | |
| 5,748,184 A | 5/1998 | Shieh | |
| 5,748,269 A | 5/1998 | Harris et al. | |
| 5,748,512 A | 5/1998 | Vargas | |
| 5,764,222 A | 6/1998 | Shieh | |
| 5,764,818 A | 6/1998 | Capps et al. | |
| 5,767,457 A | 6/1998 | Gerpheide et al. | |
| 5,767,842 A | 6/1998 | Korth et al. | |
| 5,790,104 A | 8/1998 | Shieh | |
| 5,790,107 A | 8/1998 | Kasser et al. | |
| 5,798,760 A | 8/1998 | Vayda et al. | |
| 5,802,516 A | 9/1998 | Shwarts et al. | |
| 5,808,567 A | 9/1998 | McCloud | |
| 5,809,267 A | 9/1998 | Moran et al. | |
| 5,821,690 A | 10/1998 | Martens et al. | |
| 5,821,930 A | 10/1998 | Hansen | |
| 5,823,782 A | 10/1998 | Marcus et al. | |
| 5,825,308 A | 10/1998 | Rosenberg | |
| 5,825,351 A | 10/1998 | Tam | |
| 5,825,352 A | 10/1998 | Bisset et al. | |
| 5,835,079 A | 11/1998 | Shieh | |
| 5,844,506 A * | 12/1998 | Binstead | 341/34 |
| 5,854,625 A | 12/1998 | Frisch et al. | |
| 5,874,948 A | 2/1999 | Shieh | |
| 5,877,751 A | 3/1999 | Kanemitsu et al. | |
| 5,880,411 A | 3/1999 | Gillespie et al. | |
| 5,883,619 A | 3/1999 | Ho et al. | |
| 5,898,434 A | 4/1999 | Small et al. | |
| 5,910,800 A | 6/1999 | Shields et al. | |
| 5,920,309 A | 7/1999 | Bisset et al. | |
| 5,923,319 A | 7/1999 | Bishop et al. | |
| 5,933,134 A | 8/1999 | Shieh | |
| 5,943,043 A | 8/1999 | Furuhata et al. | |
| 5,943,044 A | 8/1999 | Martinelli et al. | |
| 6,002,389 A | 12/1999 | Kasser | |
| 6,002,808 A | 12/1999 | Freeman | |
| 6,005,555 A | 12/1999 | Katsurahira et al. | |
| 6,020,881 A | 2/2000 | Naughton et al. | |
| 6,028,271 A | 2/2000 | Gillespie et al. | |
| 6,031,524 A | 2/2000 | Kunert | |
| 6,037,882 A | 3/2000 | Levy | |
| 6,050,825 A | 4/2000 | Nichol et al. | |
| 6,052,339 A | 4/2000 | Frenkel et al. | |
| 6,057,845 A | 5/2000 | Dupouy | |
| 6,072,494 A | 6/2000 | Nguyen | |
| 6,073,036 A | 6/2000 | Heikkinen et al. | |
| 6,084,576 A | 7/2000 | Leu et al. | |
| 6,094,197 A | 7/2000 | Buxton et al. | |
| 6,105,419 A * | 8/2000 | Michels et al. | 73/49.3 |
| 6,107,997 A | 8/2000 | Ure | |
| 6,128,003 A | 10/2000 | Smith et al. | |
| 6,131,299 A | 10/2000 | Raab et al. | |
| 6,135,958 A | 10/2000 | Mikula-Curtis et al. | |
| 6,144,380 A | 11/2000 | Shwarts et al. | |
| 6,151,596 A | 11/2000 | Hosomi | |
| 6,188,391 B1 | 2/2001 | Seely et al. | |
| 6,198,515 B1 | 3/2001 | Cole | |
| 6,208,329 B1 | 3/2001 | Ballare | |
| 6,222,465 B1 | 4/2001 | Kumar et al. | |
| 6,239,790 B1 | 5/2001 | Martinelli et al. | |
| 6,243,071 B1 | 6/2001 | Shwarts et al. | |
| 6,246,862 B1 | 6/2001 | Grivas et al. | |
| 6,249,606 B1 | 6/2001 | Kiraly et al. | |
| 6,255,604 B1 | 7/2001 | Tokioka et al. | |
| 6,278,443 B1 | 8/2001 | Amro et al. | |
| 6,288,707 B1 | 9/2001 | Philipp | |
| 6,289,326 B1 | 9/2001 | LaFleur | |

| | | |
|---|---|---|
| 6,292,178 B1 | 9/2001 | Bernstein et al. |
| 6,308,144 B1 | 10/2001 | Bronfeld et al. |
| 6,310,610 B1 | 10/2001 | Beaton et al. |
| 6,313,853 B1 * | 11/2001 | Lamontagne et al. ........ 715/762 |
| 6,323,846 B1 | 11/2001 | Westerman et al. |
| 6,323,849 B1 | 11/2001 | He et al. |
| 6,333,753 B1 | 12/2001 | Hinckley |
| 6,337,678 B1 | 1/2002 | Fish |
| 6,347,290 B1 | 2/2002 | Bartlett |
| 6,359,632 B1 | 3/2002 | Eastty et al. |
| 6,377,009 B1 | 4/2002 | Philipp et al. |
| 6,380,931 B1 | 4/2002 | Gillespie et al. |
| 6,411,287 B1 | 6/2002 | Scharff et al. |
| 6,414,671 B1 | 7/2002 | Gillespie et al. |
| 6,414,674 B1 * | 7/2002 | Kamper et al. .............. 345/173 |
| 6,421,234 B1 | 7/2002 | Ricks et al. |
| 6,442,440 B1 | 8/2002 | Miller |
| 6,452,514 B1 | 9/2002 | Philipp et al. |
| 6,457,355 B1 | 10/2002 | Philipp et al. |
| 6,466,036 B1 | 10/2002 | Philipp et al. |
| 6,480,188 B1 | 11/2002 | Horsley |
| 6,489,978 B1 | 12/2002 | Gong et al. |
| 6,515,669 B1 | 2/2003 | Mohri et al. |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee et al. |
| 6,570,557 B1 | 5/2003 | Westerman et al. |
| 6,583,676 B2 | 6/2003 | Krah et al. |
| 6,593,916 B1 | 7/2003 | Aroyan |
| 6,610,936 B2 | 8/2003 | Gillespie et al. |
| 6,624,833 B1 | 9/2003 | Kumar et al. |
| 6,639,577 B2 | 10/2003 | Eberhard |
| 6,650,319 B1 | 11/2003 | Hurst et al. |
| 6,658,994 B1 | 12/2003 | McMillan |
| 6,661,920 B1 | 12/2003 | Skinner |
| 6,670,894 B2 | 12/2003 | Mehring |
| 6,677,932 B1 | 1/2004 | Westerman |
| 6,677,934 B1 | 1/2004 | Blanchard |
| 6,680,677 B1 | 1/2004 | Tiphane |
| 6,690,387 B2 | 2/2004 | Zimmerman et al. |
| 6,724,366 B2 | 4/2004 | Crawford |
| 6,757,002 B1 | 6/2004 | Oross et al. |
| 6,803,906 B1 | 10/2004 | Morrison et al. |
| 6,806,869 B2 | 10/2004 | Yamakado |
| 6,842,672 B1 | 1/2005 | Straub et al. |
| 6,856,259 B1 | 2/2005 | Sharp |
| 6,888,536 B2 | 5/2005 | Westerman et al. |
| 6,900,795 B1 | 5/2005 | Knight, III et al. |
| 6,903,730 B2 * | 6/2005 | Mathews et al. ............ 345/179 |
| 6,920,609 B1 | 7/2005 | Milevic |
| 6,920,619 B1 * | 7/2005 | Milekic ...................... 715/859 |
| 6,927,761 B2 | 8/2005 | Badaye et al. |
| 6,930,661 B2 | 8/2005 | Uchida et al. |
| 6,942,571 B1 | 9/2005 | McAllister et al. |
| 6,958,749 B1 | 10/2005 | Matsushita et al. |
| 6,961,912 B2 * | 11/2005 | Aoki et al. .................. 715/863 |
| 6,965,375 B1 | 11/2005 | Gettemy et al. |
| 6,972,401 B2 | 12/2005 | Akitt et al. |
| 6,972,749 B2 | 12/2005 | Hinckley et al. |
| 6,977,666 B1 | 12/2005 | Hedrick |
| 6,985,801 B1 | 1/2006 | Straub et al. |
| 6,992,659 B2 | 1/2006 | Gettemy |
| 7,015,894 B2 | 3/2006 | Morohoshi et al. |
| 7,031,228 B2 | 4/2006 | Born et al. |
| 7,058,902 B2 | 6/2006 | Iwema et al. |
| 7,098,896 B2 | 8/2006 | Kushler et al. |
| 7,129,416 B1 | 10/2006 | Steinfeld et al. |
| 7,184,064 B2 | 2/2007 | Zimmerman et al. |
| 7,233,316 B2 | 6/2007 | Smith et al. |
| 7,319,454 B2 * | 1/2008 | Thacker et al. ............. 345/163 |
| RE40,153 E | 3/2008 | Westerman et al. |
| 7,339,580 B2 | 3/2008 | Westerman et al. |
| 2001/0015718 A1 * | 8/2001 | Hinckley et al. ............ 345/156 |
| 2002/0015024 A1 | 2/2002 | Westerman et al. |
| 2002/0075317 A1 | 6/2002 | Dardick |
| 2002/0080123 A1 | 6/2002 | Kennedy et al. |
| 2002/0085037 A1 | 7/2002 | Leavitt et al. |
| 2002/0118848 A1 | 8/2002 | Karpenstein |
| 2002/0140633 A1 * | 10/2002 | Rafii et al. ...................... 345/8 |
| 2002/0140668 A1 | 10/2002 | Crawford |
| 2002/0180763 A1 | 12/2002 | Kung |
| 2002/0191029 A1 | 12/2002 | Gillespie et al. |
| 2002/0196238 A1 | 12/2002 | Tsukada et al. |
| 2003/0006974 A1 | 1/2003 | Clough et al. |
| 2003/0071858 A1 | 4/2003 | Morohoshi |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0076363 A1 | 4/2003 | Murphy |
| 2003/0095095 A1 | 5/2003 | Pihlaja |
| 2003/0095096 A1 | 5/2003 | Robbin et al. |
| 2003/0098858 A1 | 5/2003 | Perski et al. |
| 2003/0132950 A1 | 7/2003 | Surucu et al. |
| 2003/0160808 A1 * | 8/2003 | Foote et al. ................. 345/700 |
| 2003/0164820 A1 | 9/2003 | Kent |
| 2003/0193481 A1 | 10/2003 | Sokolsky |
| 2003/0206202 A1 | 11/2003 | Moriya |
| 2003/0210260 A1 | 11/2003 | Palmer et al. |
| 2003/0214534 A1 | 11/2003 | Uemura et al. |
| 2003/0234768 A1 | 12/2003 | Rekimoto et al. |
| 2003/0237043 A1 | 12/2003 | Novak et al. |
| 2004/0001048 A1 | 1/2004 | Kraus et al. |
| 2004/0021644 A1 | 2/2004 | Enomoto |
| 2004/0053661 A1 | 3/2004 | Jones et al. |
| 2004/0056837 A1 | 3/2004 | Koga et al. |
| 2004/0056849 A1 | 3/2004 | Lohbihler et al. |
| 2004/0080529 A1 | 4/2004 | Wojcik |
| 2004/0134238 A1 | 7/2004 | Buckroyd et al. |
| 2004/0135818 A1 | 7/2004 | Thomson et al. |
| 2004/0136564 A1 | 7/2004 | Roeber et al. |
| 2004/0145601 A1 | 7/2004 | Brielmann et al. |
| 2004/0146688 A1 | 7/2004 | Treat |
| 2004/0150668 A1 | 8/2004 | Myers et al. |
| 2004/0150669 A1 | 8/2004 | Sabiers et al. |
| 2004/0155888 A1 | 8/2004 | Padgitt et al. |
| 2004/0263484 A1 | 12/2004 | Mantysalo et al. |
| 2005/0012723 A1 | 1/2005 | Pallakoff |
| 2005/0015731 A1 | 1/2005 | Mak et al. |
| 2005/0024341 A1 | 2/2005 | Gillespie et al. |
| 2005/0052425 A1 | 3/2005 | Zadesky et al. |
| 2005/0052427 A1 | 3/2005 | Wu et al. |
| 2005/0104867 A1 | 5/2005 | Westerman et al. |
| 2005/0110768 A1 | 5/2005 | Marriott et al. |
| 2005/0134578 A1 * | 6/2005 | Chambers et al. ........... 345/184 |
| 2005/0162402 A1 | 7/2005 | Watanachote |
| 2005/0223308 A1 | 10/2005 | Gunn et al. |
| 2006/0001650 A1 | 1/2006 | Robbins et al. |
| 2006/0010400 A1 | 1/2006 | Dehlin et al. |
| 2006/0022955 A1 | 2/2006 | Kennedy |
| 2006/0022956 A1 | 2/2006 | Lengeling |
| 2006/0026335 A1 | 2/2006 | Hotelling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling |
| 2006/0032680 A1 | 2/2006 | Elias et al. |
| 2006/0033724 A1 | 2/2006 | Chaudhri et al. |
| 2006/0044259 A1 | 3/2006 | Hotelling et al. |
| 2006/0053387 A1 | 3/2006 | Ording |
| 2006/0066582 A1 | 3/2006 | Lyon et al. |
| 2006/0085757 A1 | 4/2006 | Andre et al. |
| 2006/0097991 A1 | 5/2006 | Hotelling et al. |
| 2006/0161870 A1 | 7/2006 | Hotelling et al. |
| 2006/0181517 A1 | 8/2006 | Zadesky et al. |
| 2006/0197750 A1 | 9/2006 | Kerr et al. |
| 2006/0232567 A1 | 10/2006 | Westerman et al. |

| | | | | | | |
|---|---|---|---|---|---|---|
| 2006/0238517 | A1 | 10/2006 | King et al. | JP | 2003-173237 A | 6/2003 |
| 2006/0238518 | A1 | 10/2006 | Westerman et al. | KR | 4057131 A | 7/2004 |
| 2006/0238519 | A1 | 10/2006 | Westerman et al. | WO | WO-92/02000 A1 | 2/1992 |
| 2006/0238520 | A1 | 10/2006 | Westerman et al. | WO | WO 94/29788 | 12/1994 |
| 2006/0238521 | A1 | 10/2006 | Westerman et al. | WO | WO-94/29788 A1 | 12/1994 |
| 2006/0238522 | A1 | 10/2006 | Westerman et al. | WO | WO-97/18547 A1 | 5/1997 |
| 2006/0265668 | A1 | 11/2006 | Rainisto | WO | WO-97/23738 A1 | 7/1997 |
| 2006/0290921 | A1 | 12/2006 | Hotelling et al. | WO | WO-97/36225 A1 | 10/1997 |
| 2007/0070050 | A1 | 3/2007 | Westerman et al. | WO | WO-97/40744 A1 | 11/1997 |
| 2007/0070051 | A1 | 3/2007 | Westerman et al. | WO | WO 98/14863 | 4/1998 |
| 2007/0070052 | A1 | 3/2007 | Westerman et al. | WO | WO-98/14863 A1 | 4/1998 |
| 2007/0078919 | A1 | 4/2007 | Westerman et al. | WO | WO-99/28813 A1 | 6/1999 |
| 2007/0081726 | A1 | 4/2007 | Westerman et al. | WO | WO-99/38149 A1 | 7/1999 |
| 2007/0083823 | A1 | 4/2007 | Jaeger | WO | WO-99/54807 A1 | 10/1999 |
| 2007/0139395 | A1 | 6/2007 | Westerman et al. | WO | WO-00/38042 A1 | 6/2000 |
| 2007/0171210 | A1 | 7/2007 | Chaudhri et al. | WO | WO-01/02949 A1 | 1/2001 |
| 2007/0177803 | A1 | 8/2007 | Elias et al. | WO | WO 02/01482 A1 | 1/2002 |
| 2007/0177804 | A1 | 8/2007 | Elias et al. | WO | WO-02/39245 A2 | 5/2002 |
| 2007/0229464 | A1 | 10/2007 | Hotelling et al. | WO | WO-02/39245 A3 | 5/2002 |
| 2007/0236466 | A1 | 10/2007 | Hotelling | WO | WO-02/39245 C3 | 5/2002 |
| 2007/0247429 | A1 | 10/2007 | Westerman | WO | WO-03/027822 A2 | 4/2003 |
| 2007/0257890 | A1 | 11/2007 | Hotelling et al. | WO | WO-03/027822 A3 | 4/2003 |
| 2007/0268273 | A1 | 11/2007 | Westerman et al. | WO | WO-03/036457 A2 | 5/2003 |
| 2007/0268274 | A1 | 11/2007 | Westerman et al. | WO | WO-03/036457 A3 | 5/2003 |
| 2007/0268275 | A1 | 11/2007 | Westerman et al. | WO | WO-03/062978 A2 | 7/2003 |
| 2008/0036743 | A1 | 2/2008 | Westerman et al. | WO | WO-03/062978 A3 | 7/2003 |
| 2008/0041639 | A1 | 2/2008 | Westerman et al. | WO | WO-03/088176 | 10/2003 |
| 2008/0042986 | A1 | 2/2008 | Westerman et al. | WO | WO-03/098421 A1 | 11/2003 |
| 2008/0042987 | A1 | 2/2008 | Westerman et al. | WO | WO-2004/029789 A1 | 4/2004 |
| 2008/0042988 | A1 | 2/2008 | Westerman et al. | WO | WO-2004/047069 A1 | 6/2004 |
| 2008/0042989 | A1 | 2/2008 | Westerman et al. | WO | WO-2005/114369 A2 | 12/2005 |
| 2008/0128182 | A1 | 6/2008 | Westerman et al. | WO | WO-2006/020304 A2 | 2/2006 |
| 2008/0211775 | A1 | 9/2008 | Hotelling et al. | WO | WO-2006-020304 A3 | 2/2006 |
| 2008/0211779 | A1* | 9/2008 | Pryor ......................... 345/173 | WO | WO-2006/020305 A2 | 2/2006 |
| 2008/0211783 | A1 | 9/2008 | Hotelling et al. | WO | WO-2006/020305 A3 | 2/2006 |
| 2008/0211784 | A1 | 9/2008 | Hotelling et al. | WO | WO-2006/023569 | 3/2006 |
| 2008/0211785 | A1 | 9/2008 | Hotelling et al. | WO | WO-2006/026012 A2 | 3/2006 |
| 2008/0231610 | A1 | 9/2008 | Hotelling et al. | WO | WO-2007/037808 A1 | 4/2007 |
| 2009/0021489 | A1 | 1/2009 | Westerman et al. | WO | WO-2007/089766 A2 | 8/2007 |
| | | | | WO | WO-2007/089766 A3 | 8/2007 |
| | | | | WO | WO-2008/094791 A2 | 7/2008 |
| | | | | WO | WO-2008/094791 A3 | 7/2008 |

FOREIGN PATENT DOCUMENTS

| | | |
|---|---|---|
| DE | 100 42 300 A1 | 3/2002 |
| DE | 100 59 906 | 6/2002 |
| DE | 101 40 874 | 3/2003 |
| DE | 102 51 296 A1 | 5/2004 |
| EP | 0 288 692 | 11/1988 |
| EP | 0 394 614 A2 | 10/1990 |
| EP | 0 422 577 A2 | 4/1991 |
| EP | 0 422 577 A3 | 4/1991 |
| EP | 0 464 908 | 1/1992 |
| EP | 0 622 722 A2 | 11/1994 |
| EP | 0 622 722 A3 | 11/1994 |
| EP | 0 622 722 B1 | 11/1994 |
| EP | 0 664 504 | 7/1995 |
| EP | 0 817 000 A1 | 1/1998 |
| EP | 0 817 000 B1 | 1/1998 |
| EP | 0 926 588 A2 | 6/1999 |
| EP | 1 014 295 | 6/2000 |
| EP | 1 233 330 A2 | 8/2002 |
| EP | 1 505 484 A1 | 2/2005 |
| EP | 1 517 228 A2 | 3/2005 |
| EP | 1 569 079 A1 | 8/2005 |
| GB | 2330670 A | 4/1999 |
| GB | 2344894 A | 6/2000 |
| JP | 7-230352 A | 8/1995 |
| JP | 10-039748 A | 2/1998 |
| JP | 11-133816 A | 5/1999 |
| JP | 11-194863 A | 7/1999 |
| JP | 2000-163031 A | 6/2000 |
| JP | 2000-163193 A | 6/2000 |
| JP | 2001-134382 A | 5/2001 |
| JP | 2000-034023 A | 1/2002 |

OTHER PUBLICATIONS

"Near Field Imaging Touchscreens," http://www.touchscreens.com/intro-touchtypes-nfi.html, downloaded Aug. 5, 2005.
"PenTouch Capacitive Touchscreens," http://www.touchscreens.com/intro-touchtypes-pentouch.html, downloaded Aug. 5, 2005.
"Surface Acoustic Wave Touchscreens," http://www.touchscreens.com/intro-touchtypes-saw.html, downloaded Aug. 5, 2005.
"Symbol Commander," http://www.sensiva.com/symbolcomander/, downloaded Aug. 30, 2005.
"Tips for Typing," FingerWorks, http://www.fingerworks.com/mini_typing.html, downloaded Aug. 30, 2005.
"Touch Technologies Overview," 2001, 3M Touch Systems, Massachusetts.
"Touchscreen Technology Choices," http://www.elotouch.com/products/detech2.asp, downloaded Aug. 5, 2005.
"Visual Disabilities", http://depts.stcc.edu/ods/ACCESS/bpvisual.htm, downloaded Oct. 25, 2005.
"Wacom Components—Technology," http://www.wacom-components.com/english/tech.asp., downloaded Oct. 10, 2004.
"Watershed Algorithm," http://rsb.info.nih.gov/ij/plugins/watershed.html, downloaded Aug. 5, 2005.
Ian Hardy, "Fingerworks," Mar. 7, 2002.
Jun Rekimoto, "SmartSkin: An Infrastructure for Freehand Manipulation on Interactive Surfaces," CHI 2002, Apr. 20-25, 2002.
U.S. Appl. No. 10/654,108, filed Sep. 2, 2003.
U.S. Appl. No. 10/789,676, filed Feb. 27, 2004.
Office Action dated Nov. 1, 2007 in U.S. Appl. No. 11/240,788.
Office Action dated Jul. 24, 2007 in U.S. Appl. No. 10/927,925.
Office Action dated Dec. 20, 2007 in U.S. Appl. No. 10/927,925.

Smith et al., "Relating Distortion to Performance in Distortion-Oriented Displays," Proceedings of the 6$^{th}$ Australian Conference on Computer-Human Interaction (OZCHI '96) 1996.

U.S. Appl. No. 11/165,958 titled Method and Apparatus for Remotely Detecting Presence, filed Jun. 23, 2005.

U.S. Appl. No. 60/658,777 titled Multi-Functional Hand-Held Device, filed Mar. 4, 2005.

U.S. Appl. No. 11/240,788 titled Proximity Detector in Handheld Device, filed Sep. 30, 2005.

"A Brief Overview of Gesture Recognition," http://www.dai.ed.ac.uk/Cvonline/LOCAL_COPIES/COHEN/gesture_overview.html, downloaded Apr. 20, 2004.

"Ai Squared Products—XoomText Magnifier", http://www.aisquared.com/Products/zoomtextmag/index.cfm, downloaded Oct. 26, 2005.

"Ai Squared Products", http://www.aisquared.com/Products/index.cfm, downloaded Oct. 25, 2005.

"Capacitive Touchscreens," http://www.touchscreens.com/intro-touchtypes-capacitive.html, downloaded Aug. 5, 2005.

"Captive Position Sensing," http://www.synaptics.com/technology/cps.cfm, downloaded Aug. 5, 2005.

"Comparing Touch Technologies," http://www.touchscreens.com/intro-touchtypes.html, downloaded Oct. 10, 2004.

"Gesture Recognition," http://www.fingerworks.com/gesture_recognition.html, downloaded Aug. 30, 2005.

"GlidePoint®," http://www.cirque.com/technology/technology_gp.htm, downloaded Aug. 5, 2005.

"How do touchscreen monitors know where you're touching?," http://electronics.howstuffworks.com/question716.htm, downloaded Aug. 5, 2005.

"How Does a Touchscreen Work?," http://www.touchscreens.com/intro-anatomy.html, downloaded Aug. 5, 2005.

"iGesture Products for Everyone (learn in minutes)," FingerWorks, 2005.

"Infrared Touchscreens," http://www.touchscreens.com/intro-touchtypes-infrared.html, downloaded Aug. 5, 2005.

"Lunar Screen Magnifier and Lunar Plus Enhanced Screen Magnifier", www.dolphincomputeraccess.com/products/lunar.htm, downloaded Oct. 25, 2005.

"Mouse Emulation," FingerWorks, http://www.fingerworks.com/gesture_guide_mouse.html, downloaded Aug. 30, 2005.

"Mouse Gestures in Opera," http://www.opera.com/features/mouse/, downloaded Aug. 30, 2005.

"Mouse Gestures," Optim oz, May 21, 2004.

Office Action dated Apr. 30, 2008 in U.S. Appl. No. 11/240,788.

Kahney, "Pcket Pcs Masquerade as IPods," Available at: http://www.wired.com/gadgets/mac/news/2004/03/62543 Mar. 8, 2004.

The Gadgeteer, "Apple iPod (30GB)," Available at: http://the-gadgeteer.com/review/apple_ipod_30gb_review Jun. 6, 2003.

Office Action dated May 5, 2008 in U.S. Appl. No. 10/927,925.

Annex to Form PCT/ISA/206 Communication Relating to the Results of the Partial International Search Received in Corresponding PCT Application No. PCT/US2005/025641 dated Feb. 19, 2007.

Anonymous. (2005). "Gesture Recognition," located at <http://www.fingerworks.com/gesture_recognition.html>, last visited Aug. 30, 2005.

Anonymous. (2005). "iGesture Products for Everyone (Learn in Minutes)," *Finger Works*, downloaded Aug. 30, 2005.

Anonymous. (2005). "Touch Technologies: Touch is Everywhere," located at http://www.3m.com/3MTouchSystems/downloads/PDFs/TouchTechOV.pdf., last visited Aug. 30, 2005.

Anonymous. "FingerWorks—Gesture Guide—Application Switching," obtained from http://www.fingerworks.com/gesture_guide_apps.html, generated on Aug. 27, 2004, 1-pg.

Anonymous. "FingerWorks—Gesture Guide—Editing," obtained from http://www.fingerworks.com/gesure_guide_editing.html, generated on Aug. 27, 2004, 1-pg.

Anonymous. "FingerWorks—Gesture Guide—File Operations," obtained from http://www.fingerworks.com/gesture_guide_files.html, generated on Aug. 27, 2004, 1-pg.

Anonymous. "FingerWorks—Gesture Guide—Text Manipulation," obtained from http://www.fingerworks.com/gesture_guide_text_manip.html, generated on Aug. 27, 2004, 2-pg.

Anonymous. "FingerWorks—Gesture Guide—Tips and Tricks," obtained from http://www.fingerworks.com/gesture_guide_tips.html, generated Aug. 27, 2004, 2-pgs.

Anonymous. "FingerWorks—Gesture Guide—Web," obtained from http://www.fingerworks.com/gesture_guide_web.html, generated on Aug. 27, 2004, 1-pg.

Anonymous. "FingerWorks—Guide to Hand Gestures for USB Touchpads," obtained from http://www.fingerworks.com/igesture_userguide.html, generated Aug. 27, 2004, 1-pg.

Anonymous. "FingerWorks—iGesture—Technical Details," obtained from http://www.fingerworks.com/igesture_tech.html, generated Aug. 27, 2004, 1-pg.

Anonymous. "FingerWorks—The Only Touchpads with Ergonomic Full-Hand Resting and Relaxation!" obtained from <http://www.fingerworks.com/resting.html>, Copyright 2001, 1-pg.

Anonymous. "FingerWorks—Tips for Typing on the Mini," obtained from http://www.fingerworks.com/mini_typing.html, generated on Aug. 27, 2004, 2-pgs.

Anonymous. "iGesture Pad—the MultiFinger USB TouchPad with Whole-Hand Gestures,"obtained from http://www.fingerworks.com/igesture.html, generated Aug. 27, 2004, 2-pgs.

Bier et al., "Toolglass and Magic Lenses: The see-through interface" In James Kijiya, editor, Computer Graphics (SIGGRAPH '93 Proceedings), vol. 27, pp. 73-80, Aug. 1993.

Buxton, W. et al. (Jul. 22, 1985). "Issues and Techniques in Touch-Sensitive Tablet Input," *Proceedings ACM Siggraph*, pp. 215-224.

Chang, C-C. et al. (Aug. 1, 1993). "A Hashing-Oriented Nearest Neighbor Searching Scheme," *Pattern Recognition Letters*, 14(8):625-630.

Chen et al. "Flowfield and Beyond: Applying Pressure-Sensitive Multi-Point Touchpad Interaction," *Multimedia and Expo, 2003, ICME '03, Proceedings*, Jul. 9, 2003, pp. 1-49, 152.

Crowley, J.L. (Mar. 1, 1997). "Vision for Man-Machine Interaction," *Robotics and Autonomous Systems*, 19(3-4):347-358.

Davis, J. et al. (May 2, 1994). "Recognizing Hand Gestures," *European Conference on Computer Vision*, Berlin, DE, 1:331-340.

Davis, J. et al. (Oct. 31, 1994). "Determining 3-D Hand Motion," *Signals, Systems and Computers, 1994 Conference Record of the 28$^{th}$ Asilomar Conference on Pacific Grove*, CA, Oct. 31-Nov. 2, 1994, Los Alamitos, CA, pp. 1262-1266.

Douglas et al., The Ergonomics of Computer Pointing Devices (1997).

European examination report for European Patent Application No. 06016830.9, mailed Aug. 6, 2008.

European examination report for European Patent Application No. 06016856.4 mailed Sep. 16, 2008.

European examination report for European patent Application No. 99904228.6, mailed Apr. 20, 2006.

European examination report for European Patent Application No. 99904228.6, mailed Mar. 23, 2007.

European search report for European Patent Application No. 06016830.9 mailed Dec. 3, 2007.

European Search Report mailed Dec. 12, 2008, for EP Application No. 06016855.6 filed Jan. 25, 1999, six pages.

European Search Report mailed Dec. 13, 2007, for EP Application No. 05772892.5, filed Jul. 19, 2005, three pages.

European Search Report mailed Dec. 15, 2008, for EP Application No. 08016449.4, filed Jul. 19, 2005, six pages.

European Search Report mailed Dec. 15, 2008, for EP Application No. 08016450.2, filed Jul. 19, 2005, six pages.

European Search Report mailed Dec. 23, 2008, for EP Application No. 06016831.7 filed Jan. 25, 1999, seven pages.

European Search Report mailed Jan. 9, 2009, for EP Application No. 06016832.5 filed Jan. 25, 1999, four pages.

European Search Report received in EP 1 621 989 (@ *Beyer Weaver & Thomas, LLP*) dated Mar. 27, 2006.

European supplementary search report for European Patent Application No. 99904228.6, mailed Feb. 16, 2005.

EVB Elektronik "TSOP6238 IR Receiver Modules for Infrared Remote Control Systems" dated Jan. 2004 1-pg.

Extended European search report for European Patent Application No. 06016858.0, mailed Dec. 21, 2007.

Extended European search report for European Patent Application No. 06016856.4, mailed Mar. 14, 2008.
Final Office Action mailed May 21, 2008, for U.S. Appl. No. 11/048,264, filed Jan. 31, 2005, 11 pages.
Final Office Action mailed Oct. 16, 2008, for U.S. Appl. No. 11/038,590, filed Jan. 18, 2005, 35 pages.
Final Office Action mailed Nov. 10, 2008, for U.S. Appl. No. 10/927,925, filed Aug. 26, 2004, 22 pages.
Final Office Action mailed Dec. 23, 2008, for U.S. Appl. No. 10/903,964, filed Jul. 30, 2004, 12 pages.
Final Office Action mailed Dec. 24, 2008, for U.S. Appl. No. 11/240,788, filed Sep. 30, 2005, 12 pages.
Final Office Action mailed Mar. 5, 2009, for U.S. Appl. No. 11/228,758, filed Sep. 16, 2005, 15 pages.
Fisher et al., "Repetitive Motion Disorders: The Design of Optimal Rate- Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," In CHI 2001 Summary, pp. 121-122, 2001.
Hardy. "Fingerworks" Mar. 7, 2002; BBC World On Line.
Heap, T. et al. (Oct. 14, 1996). "Towards 3D Hand Tracking Using a Deformable Model," *Proceedings of the 2nd International Conference*, Killington, VT, USA, Oct. 14-16, 1996, *Automatic Face and Gesture Recognition, IEEE Comput. Soc.*, pp. 140-145.
Hillier and Gerald J. Lieberman, *Introduction to Operations Research* (1986).
International Search Report dated Mar. 3, 2006 (PCT/US 05/03325; 119-0052WO).
International search report for PCT/US99/01454, mailed May 14, 1999.
International Search Report mailed Apr. 24, 2007, for PCT Application No. PCT/US2005/025641 filed Jul. 19, 2005, five pages.
International Search Report mailed Aug. 11, 2008, for PCT Application No. PCT/US2007/002512 filed Jan. 30, 2007, three pages.
International Search Report mailed Oct. 8, 2008, for PCT Application No. PCT/US2008/051727, filed Jan. 22, 2008, six pages.
International Search Report received in corresponding PCT application No. PCT/US2006/008349 dated Oct. 6, 2006.
Jacob et al., "Integrality and Separability of Input Devices," *ACM Transactions on Computer-Human Interaction*, 1:3-26 (Mar. 1994).
Japanese Office Action mailed Oct. 27, 2008, for JP Patent Application No. 2007-523644, one page.
Jones, R. (2001). "MTC Express Multi-Touch Controller," *Computer Music Journal* 25(1):97-99.
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Lee. "A Fast Multiple-Touch-Sensitive Input Device," Master's Thesis, University of Toronto (1984).
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-25.].
Matsushita et al., "HoloWall: Designing a Finger, Hand, Body and Object Sensitive Wall," In Proceedings of UIST '97, Oct. 1997.
Mohri, K. (Nov. 25, 2000). "Wearable Human Interface Based on Hand/Finger Gesture Recognition," *Human Interface Association Magazine* 2(4):9-18. (Only Abstract in English.).
Nirei, K. et al. (Aug. 5, 1996). "Human Hand Tracking from Binocular Image Sequences," *Proceedings of the 1996 IEEE IECON 22nd International Conference*, Taipei, Taiwan, Aug. 5-10, 1996, *Industrial Electronics, Control, and Instrumentation* 1(5):297-302.
Non-Final Office Action mailed Sep. 21, 2007, for U.S. Appl. No. 11/428,515, filed Jul. 3, 2006, seven pages.
Non-Final Office Action mailed Sep. 24, 2007, for U.S. Appl. No. 11/428,506, filed Jul. 3, 2006, six pages.
Non-Final Office Action mailed Sep. 24, 2007, for U.S. Appl. No. 11/428,521, filed Jul. 3, 2006, six pages.
Non-Final Office Action mailed Sep. 28, 2007, for U.S. Appl. No. 11/048,264, filed Jan. 31, 2005, 11 pages.
Non-Final Office Action mailed Dec. 31, 2007, for U.S. Appl. No. 11/038,590, filed Jan. 18, 2005, 32 pages.
Non-Final Office Action mailed Jan. 28, 2008, for U.S. Appl. No. 11/428,522, filed Jul. 3, 2006, seven pages.
Non-Final Office Action mailed Feb. 4, 2008, for U.S. Appl. No. 11/428,515, filed Jul. 3, 2006, six pages.
Non-Final Office Action mailed Mar. 17, 2008, for U.S. Appl. No. 10/903,964, filed Jul. 30, 2004, 34 pages.
Non-Final Office Action mailed Jul. 9, 2008, for U.S. Appl. No. 11/428,521, filed Jul. 3, 2006, 11 pages.
Non-Final Office Action mailed Sep. 2, 2008, for U.S. Appl. No. 11/428,522, filed Jul. 3, 2006, six pages.
Non-Final Office Action mailed Sep. 15, 2008, for U.S. Appl. No. 11/428,506, filed Jul. 3, 2006, eight pages.
Non-Final Office Action mailed Oct. 3, 2008, for U.S. Appl. No. 11/228,758, filed Sep. 16, 2005, 16 pages.
Non-Final Office Action mailed Oct. 31, 2008, for U.S. Appl. No. 11/428,515, filed Jul. 3, 2006, seven pages.
Non-Final Office Action mailed Dec. 11, 2008, for U.S. Appl. No. 11/048,264, filed Jan. 31, 2005, 11 pages.
Non-Final Office Action mailed Feb. 17, 2009, for U.S. Appl. No. 11/428,522, filed Jul. 3, 2006, six pages.
Non-Final Office Action mailed Apr. 2, 2009, for U.S. Appl. No. 11/038,590, filed Jan. 18, 2005, 41 pages.
Notice of Allowability mailed Feb. 11, 2009, for U.S. Appl. No. 11/428,521, filed Jul. 3, 2006, five pages.
Pavlovic, V.I. et al. (Jul. 1997). "Visual Interpretation of Hand Gestures for Human-Computer Interaction: A Review," *IEEE Transactions on Pattern Analysis and Machine Intelligence* 19(7):677-695.
PCT International Search Report received in Corresponding PCT Application No. PCT/US2006/031526 dated Feb. 14, 2007.
PCT International Search Report received in Corresponding PCT Application No. PCT/US2005/025657 dated Feb. 26, 2007.
PCT International Search Report received in Corresponding PCT Application No. PCT/US2006/031523 dated Feb. 27, 2007.
PCT International Search Report received in Corresponding PCT Application No. PCT/US2006/031527 dated Feb. 27, 2007.
Quantum Research Group "QT510 / Qwhee1TM Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. Of UIST 2000, 2000.
Rubine et al., "Programmable Finger-Tracking Instrument Controllers," *Computer Music Journal*, vol. 14, No. 1 (Spring 1990).
Rutledge et al., "Force-To-Motion Functions For Pointing," Human-Computer Interaction—INTERACT (1990).
Schiphorst, T. et al. "Using a Gestural Interface Toolkit for Tactile Input to a Dynamic Virtual Space," *Conference on Human Factors in Computing Systems, Proceedings*, Apr. 25, 2002, pp. 754-755.
Subatai Ahmad, "A Usable Real-Time 3D Hand Tracker," Proceedings of the 28th Asilomar Conference on Signals, Systems and Computers—Part 2 (of2), vol. 2 (Oct. 1994).
Texas Instruments "TSC2003 / I2C Touch Screen Controller" Data Sheet SBAS 162, dated Oct. 2001, 20-pgs.
U.S. Appl. No. 11/332,861, filed Jan 13, 2006 which is a Reissue of 6,677,932 listed above.
Wellner. "The Digital Desk Calculators: Tangible Manipulation on a Desk Top Display" IN ACM UIST '91 Proceedings, pp. 27-34, Nov. 1991.
Westerman, W. (Jan. 1, 1999). "Hand Tracking, Finger Identification, and Chordic Manipulation on a Multi-Touch Surface," Dissertation, University of Delaware, pp. 1-333.
Westerman, Wayne, et al. (2001). "Multi-Touch: A New Tactile 2-D Gesture Interface for Human-Computer Interaction," *Proceedings of the Human Factors and Ergonomics Society* 45th Annual Meeting.

Williams. "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," In CHI '85 Proceedings, pp. 280-287, 1995.

Final Office Action mailed Jul. 7, 2009, for U.S. Appl. No. 11/048,264, filed Jan. 31, 2005, 14 pages.

Non-Final Office Action mailed Jun. 10, 2009, for U.S. Appl. No. 10/903,964, filed Jul. 30, 2004, 15 pages.

Non-Final Office Action mailed Jun. 10, 2009, for U.S. Appl. No. 11/240,788, filed Sep. 30, 2005, 13 pages.

Notice of Allowability mailed Jul. 10, 2009, for U.S. Appl. No. 11/428,521, filed Jul. 3, 2006, five pages.

Non-Final Office Action mailed Aug. 18, 2009, for U.S. Appl. No. 11/228,758, filed Sep. 16, 2005, 15 pages.

\* cited by examiner

PROXIMITY DETECTOR IN HANDHELD DEVICE

CROSS REFERENCE TO RELATED APPLICATIONS

This application is a Continuation-in-Part of U.S. patent application Ser. No. 10/903,964, titled "GESTURES FOR TOUCH SENSITIVE INPUT DEVICES," filed Jul. 30, 2004; U.S. patent application Ser. No. 11/038,590, titled "MODE-BASED GRAPHICAL USER INTERFACES FOR TOUCH SENSITIVE INPUT DEVICES," filed Jan. 18, 2005; U.S. patent application Ser. No. 10/927,925, titled "VISUAL EXPANDER," filed Aug. 26, 2004; and U.S. patent application Ser. No. 11/165,958, titled "METHODS AND APPARATUS FOR REMOTELY DETECTING PRESENCE," filed Jun. 23, 2005, all of which are herein incorporated by reference.

This application is also related to U.S. Pat. No. 6,583,676, titled "PROXIMITY/TOUCH DETECTOR AND CALIBRATION CIRCUIT," issued Jun. 24, 2003; U.S. patent application Ser. No. 10/840,862, titled "MULTIPOINT TOUCHSCREEN," filed May 6, 2004; and U.S. patent application Ser. No. 11/240,788, filed concurrently and entitled "PROXIMITY DETECTOR IN HANDHELD DEVICE"; all of which are herein incorporated by reference.

BACKGROUND OF THE INVENTION

1. Field of the Invention

The present invention relates generally to I/O platforms including proximity detection as a means for providing inputs. More particularly, the invention relates to improved methods and devices for operating a portable electronic device that utilizes proximity detection.

2. Description of the Related Art

There exist today many styles of input devices for performing operations in an electronic system. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the electronic system.

Although devices such as these work well, there are continuing efforts to improve their form, feel and functionality. An improved input means and operational methods associated therewith is therefore desired.

SUMMARY OF THE INVENTION

The invention relates, in another embodiment, to an I/O platform. The I/O platform includes an I/O surface having one or more I/O devices selected from input device and output devices. The I/O platform also includes a proximity detection system configured to detect when a finger is in close proximity to but not contacting the I/O surface.

The invention relates, in another embodiment, to a portable computing device. The portable computing device includes a housing. The portable computing device also includes a user interface including one or more I/O devices, each of which is positioned at a surface of the housing. The portable computing device further includes a proximity detection system configured to detect when an object is in close proximity but not touching the periphery of the portable computing device.

The invention relates, in another embodiment, to a portable computing device. The portable computing device includes a display configured to display a graphical user interface. The portable computing device also includes an input means configured to provide inputs to the portable computing device. The portable computing device further includes a proximity detector configured to detect objects in space above the display device. The portable computing device additionally includes a processor operatively coupled to the display device, input means and the proximity detector. The processor instructs the display device to display one or more GUI elements in response to detected object, and perform actions associated with the GUI element when an input is made at the GUI element via the input means.

The invention relates, in one embodiment, to a proximity based method implemented on an electronic device. The method includes sensing an object spaced away and in close proximity to the electronic device. The method also includes performing an action in the electronic device when an object is sensed.

The invention relates, in another embodiment, to a method performed on a user operated electronic device having a display and a proximity detector. The method includes determining if an object is detected in space above electronic device. The method also includes monitoring and analyzing the current operating conditions when an object is detected. The method further includes activating a first GUI element for a first set of operating conditions. The method additionally includes activating a second GUI element for a second set of operating conditions.

BRIEF DESCRIPTION OF THE DRAWINGS

The invention may best be understood by reference to the following description taken in conjunction with the accompanying drawings in which.

DETAILED DESCRIPTION OF THE INVENTION

Embodiments of this aspect of the invention are discussed below with reference to FIGS. 1-23. However, those skilled in the art will readily appreciate that the detailed description given herein with respect to these figures is for explanatory purposes as the invention extends beyond these limited embodiments.

Figure 1:
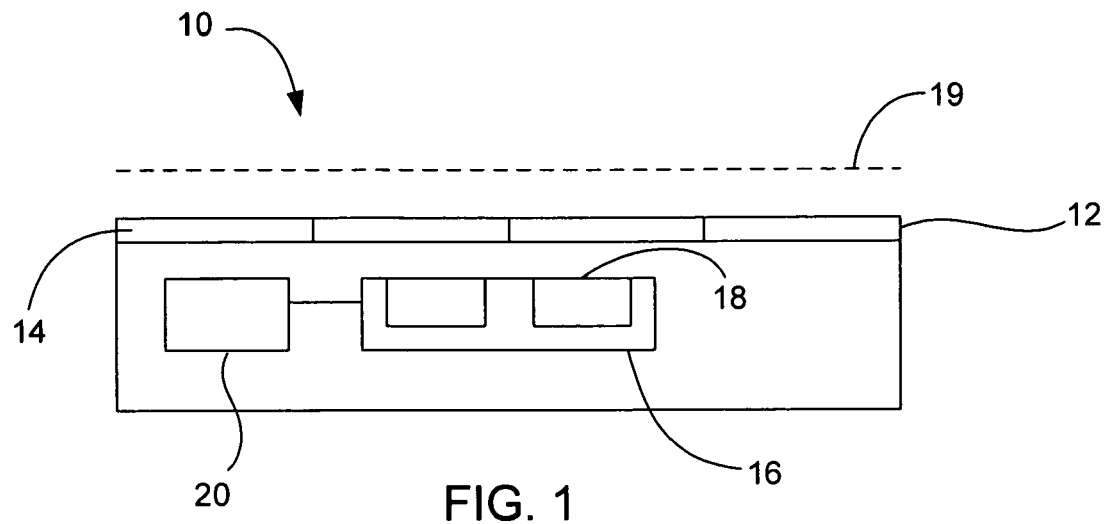
FIG. 1 is a diagram of an I/O platform, in accordance with one embodiment of the present invention.

FIG. 1 is a simplified block diagram of an I/O platform 10, in accordance with one embodiment of the present invention. The I/O platform 10 may be embodied as a peripheral stand alone device or it may be integrated into an electronic system or device. In either case, the I/O platform 10 is configured to control inputs and/or outputs associated with the host system or device. Examples of peripheral stand alone devices include mice, keyboards, joysticks, remote controls, etc. Examples of electronic devices include any consumer related electronic device such as computers, media players, telephones, etc.

The I/O platform 10 includes an I/O surface 12 having one or more input and/or output devices 14. The input devices 14A may for example be selected from buttons, switches, dials, sliders, keys or keypads, navigation pads, touch pads, touch screens, and the like. The output devices 14B may for example be selected from displays (e.g., LCD, CRT), speakers (or speaker jacks), indicators, and the like. The I/O devices 14 can be used solely or in any combination with other I/O devices 14 to form the desired I/O platform 10.

The I/O platform 10 also includes a proximity detection system 16 configured to detect when a finger (or stylus) is in close proximity to (but not in contact with) the I/O surface 12. The proximity detection system 16 may also detect location (e.g., x, y, z), direction, speed, orientation (e.g., roll, pitch, yaw), etc. of the finger relative to the I/O surface 12. Generally speaking, the proximity detection system 16 provides additional inputs to the I/O platform 10 when the a finger is placed above the I/O surface 12 as for example when a finger is moving directly towards the I/O surface 12, hovering just over the I/O surface 12 or possibly moving about but above the I/O surface 12. The input signals can be used to initiate commands, make selections, and even control motion in a display (e.g., tracking). In some cases, the inputs provided by the proximity detection system 16 may even be used in conjunction with other inputs (provided by other input devices) to create new inputs, which have different meaning than when the two inputs are used by themselves. For example, when using a touch sensing device along with a proximity detection system, advanced gestures may be performed that combine proximity gestures along with touch gestures.

The proximity detection system 16 may be widely varied. For example, it may be based on sensing technologies including capacitive, electric field, inductive, hall effect, reed, eddy current, magneto resistive, optical shadow, optical visual light, optical IR, optical color recognition, ultrasonic, acoustic emission, radar, heat, sonar, conductive or resistive and the like. A few of these technologies will now be briefly described.

Capacitive proximity systems use capacitive sensing nodes to detect changes in capacitance above the I/O surface. Objects such as a finger affect the capacitance in a non trivial manner and therefore the changes can be used to determine whether the finger is present above the I/O surface.

Infrared proximity systems send out pulses of infrared light, and detect reflections of that light from nearby objects. The light may for example be reflected off of a finger located in front of the pulsed light. If the system detects reflected light, then an object is assumed to be present. If the system does not detect reflected light, then it is assumed that there is no object present. The light may be focused to a particular distance above the I/O surface.

Optical Shadow proximity systems use photodetectors or similar device to detect changes in light intensity. If the intensity is reduced, it can be assumed that this was caused by the presence of an object forming a shadow over the photodetector.

Ultrasonic proximity systems provide ultrasonic pulses of sound, and measures the length of time it takes for those pulses to hit nearby objects and return as echos. The greater the time, the further the object.

In most cases, the proximity detection system 16 includes one or more proximity sensors 18 that generate one or more sensing fields 19 above the I/O surface 12 and that in conjunction with a controller 20 produce signals when an object disturbs or intercepts the sensing field(s). Each sensing field typically generates its own signals when disturbed. In one embodiment, a single sensing field is used to cover the entire I/O surface. In another embodiment, a single sensing field only covers a portion of the I/O surface. For example, it can be configured to cover or surround a particular I/O device or a group of I/O devices. In another embodiment, multiple sensing fields are used to cover the entire I/O surface. For example a first sensing field may be configured to cover a first I/O device or a first group of I/O devices and a second sensing field may be configured to cover a second I/O device or a second group of I/O devices. Any number of sensing fields may be used. In some cases, in order to perform tracking, the sensing fields may even be distributed as a pixilated array of nodes. In yet another embodiment, multiple sensing fields are used to only cover a portion of the I/O surface. Alternatively or additionally, the sensing fields may be configured to cover areas that do not include I/O devices as for example housing components that support the I/O platform 10.

Although the I/O surface 12 can be widely varied, several embodiments will now be discussed. It should be appreciated that these embodiments are not limitations and that they serve as examples to the infinite number of combinations that can be created when designing an I/O surface 12.

In one embodiment, the I/O surface 12 includes an output device in the form of a display and input devices in the form of a touchpad and one or more buttons. By way of example, the display may be situated in an upper region of the I/O surface, and the touch pad and buttons may be situated in a lower region of the I/O surface just below the display. Any or all of these devices may include an all encompassing or regional sensing field 19 disposed around and/or above the devices. This type of I/O surface can typically be found on media players such as the iPod music players manufactured by Apple Computer of Cupertino, Calif.

In another embodiment, the I/O surface 12 includes an enlarged touch screen display, a navigation pad, and one or more buttons. By way of example, the enlarged display may be situated in an upper/middle region of the I/O surface 12, and the navigation pad and buttons may be situated in a lower region of the I/O surface 12 just below the display. Any or all of these devices may include an all encompassing or regional sensing field 19 disposed around and/or above the devices. This type of I/O surface can typically be found on personal digital assistants (PDAs).

In another embodiment, the I/O surface 12 includes a small display, navigation pad and a keypad. By way of example, the small display may be situated in an upper region of the I/O surface 12, and the navigation pad and keypad may be situated in a lower/middle region of the I/O surface 12 just below the display. Any or all of these devices may include an all encompassing or regional sensing field 19 disposed around and/or above the devices. This type of I/O surface can typically be found on cellular phones.

In another embodiment, the I/O surface 12 only includes a touch screen display. That is, the entire I/O surface 12 is covered with a display with a touch screen disposed over the display. This type of I/O surface 12 can be found in multifunctional handheld devices where the display covers an entire side of the device. Any or all of these devices may include an all encompassing or regional sensing field 19 disposed around and/or above the devices. An example of a multifunctional device can be found in U.S. Provisional Patent Application No. 60/658,777, which is herein incorporated by reference.

In another embodiment, the I/O platform 12 is a peripheral stand alone input device such as a keyboard or mouse. The I/O surface 12 of the keyboard includes a plurality of alphanumeric keys. The I/O surface 12 of the mouse includes one or more buttons and possibly a scroll wheel. Any or all of these devices may include an all encompassing or regional sensing field 19 disposed around and/or above the devices.

In another embodiment, the I/O platform 12 is a peripheral stand alone input output device such as a monitor that includes a touch screen display. Any or all of these devices may include an all encompassing or regional sensing field 19 disposed around and/or above the devices.

In another embodiment, the I/O platform 12 is a wireless peripheral stand alone input device such as a remote control. Remote controls typically include a plurality of buttons and keys and may include a display. Any or all of these devices may include an all encompassing or regional sensing field disposed around and/or above the devices.

Figure 2:
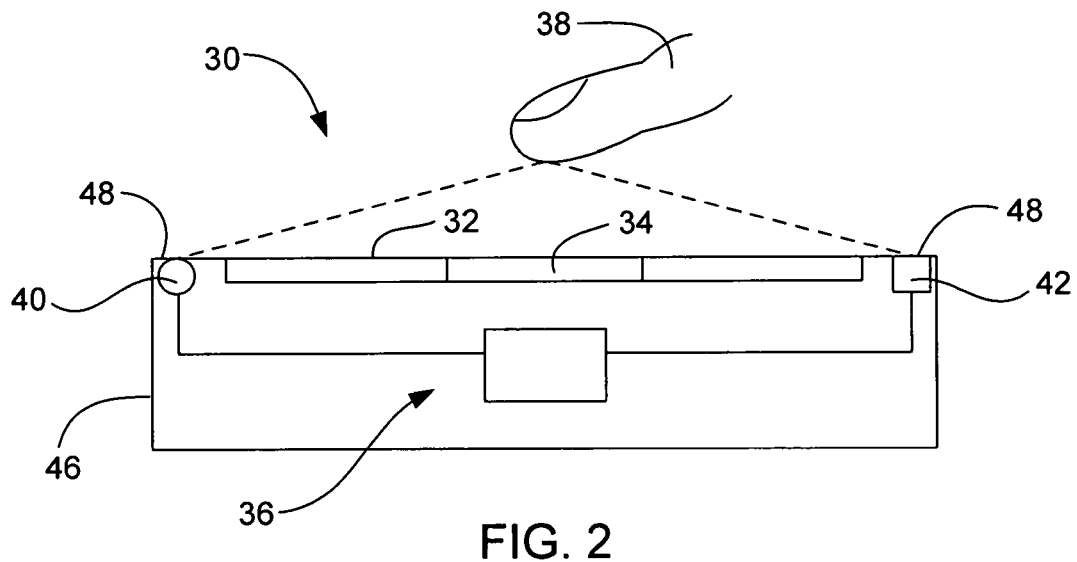
FIG. 2 is a diagram of an I/O platform, in accordance with one embodiment of the present invention.

FIG. 2 is a diagram of an I/O platform 30, in accordance with one embodiment of the present invention. The I/O platform 30 includes an I/O surface 32 including any number of I/O devices 34 in any number of combinations. The I/O platform 30 also includes an IR sensing circuit 36 for detecting the presence of an object 38 in close proximity but spaced apart from the I/O surface 32 (non contact). The IR sensing circuit 36 works by sending pulses of light, and detecting the light when it reflects off of the object 38 above the I/O surface 32. The IR sensing circuit 36 includes an emitter 40 (light source) and a detector 42. The emitter 40 generates light in the infrared bands. The emitter 40 may for example be an LED or laser diode. The detector 42, on the other hand, is configured to detect changes in light intensity. This is generally accomplished by mechanisms capable of varying electrically as a function of light intensity. The detector 42 may for example be a phototransistor.

During operation, the light from the emitter 40 hits the object 38 and scatters when a object is present above the I/O surface 32. At least a portion of the scattered light is reflected towards the detector 42. The increase in light intensity is read by the detector 42, and this is interpreted by a controller 44 to mean an object is present. If no object is present, the light is not reflected back towards the detector 42, and this is interpreted by the controller 44 to mean an object is not present.

In one embodiment, the emitter 40 and detector 42 are disposed within a housing 46 and underneath a window 48 of the housing 46. The window may be formed from a translucent or semi translucent material. The window may be the entire surface or it may only be a portion of the housing 46. The emitter 40 and detector 42 may be located at any position within the I/O surface 32. In some cases, the emitter 40 and detector 42 are located at the edge (e.g., bezel), and angled inward towards one another to improve the detection. It should be appreciated, however, that this is not a requirement. For example, they may also be positioned at more central locations and may even be positioned around a particular I/O device. Furthermore, although only one emitter 40 and detector 42 are shown, it should also be appreciated that this is not a limitation and that multiple sets may be used. This may be done to improve detection (e.g., averaging) or to create a multiple sensing fields or nodes. In some cases, an array of emitters and corresponding detector array may be used.

Figure 3:
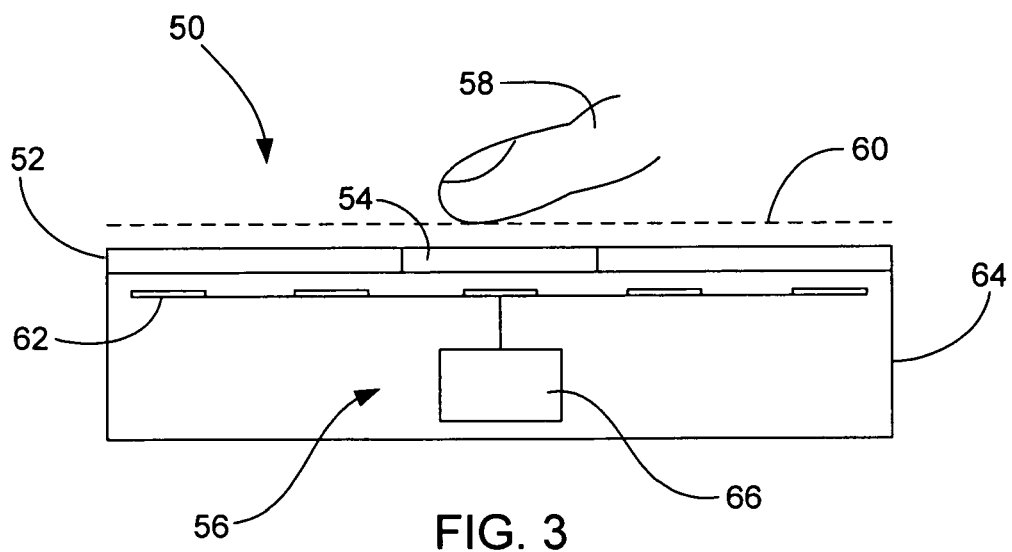
FIG. 3 is a diagram of an I/O platform, in accordance with one embodiment of the present invention.

FIG. 3 is a diagram of an I/O platform 50, in accordance with one embodiment of the present invention. The I/O platform 50 includes an I/O surface 52 including any number of I/O devices 54 in any number of combinations. The I/O platform 50 also includes a capacitive sensing circuit 56 for detecting the presence of an object 58 in close proximity but spaced apart from the I/O surface 52 (non contact). The capacitive sensing circuit 56 works by detecting changes in capacitance in an area 60 above the I/O surface 52. As should be appreciated, when an object (e.g., finger) is placed in the sensing area 60, the value of the capacitance changes due to the fact that the finger has different dielectric properties than air. Any changes can therefore be used to determine the presence of the object 58 above the I/O surface 52.

The capacitive sensing circuit 56 may include one or more capacitive sensing nodes 62. The nodes 62 may be positioned within, around and/or underneath the I/O devices 54 supported by the I/O surface 52.

The capacitive sensing nodes may be widely varied. For example, they may be based on self capacitance or mutual capacitance. In self capacitance, each of the nodes 62 typically consist of a conductive electrode. In mutual capacitance, each of the nodes 62 typically consists of conductive wires lying crosswise relative to each other (the point where the wires cross is considered the node). In either case, the conductive element may be integrally formed into the housing walls 64 of the I/O platform 50 or they may be located behind the housing walls 64 of the I/O platform 50. The housing wall 64 may for example be the housing wall that supports the I/O surface 52. Alternatively or additionally, the conductive elements may be integrated within the I/O devices themselves. Furthermore, they are typically coupled to a controller 66 that monitors the capacitance changes at each conductive element. By detecting changes in capacitance at each of the conductive elements, the microcontroller 66 can determine the presence of a object 58 or lack thereof above the I/O surface 52.

In one embodiment, a single node may be configured to cover the entire I/O surface. For example, in the case of self capacitance, a single electrode may be spread across the entire I/O surface.

In another embodiment, a single node is configured to cover some sub region of the I/O surface. In one implementation of this embodiment, for example, a single node may be configured to cover all the areas of the housing wall 64 that surround the various I/O devices 54. In another implementation, a single node is configured to cover all the areas underneath the various I/O devices 54. In another implementation, a single node may be positioned at one or more of the I/O devices 54 rather than the entire set of I/O devices. These nodes may be positioned around and/or underneath the I/O devices 54. In another implementation, a single node may be positioned around the edge of the I/O surface 52 (e.g., bezel).

In another embodiment, multiple nodes may be configured to cover the entire I/O surface 52. By way of example, the multiple nodes may be laid out in a pixilated array of sensing nodes. For example, in the case of mutual capacitance, the wires may be formed as a grid with a plurality of sensing nodes.

In another embodiment, multiple nodes may be configured to cover some sub regions of the I/O surface 52. In one implementation, for example, a multiple nodes may be configured to cover all the areas that surround the various I/O devices 54. In another implementation, multiple nodes are configured to cover all the areas underneath the various I/O devices 54. In another implementation, multiple nodes may be positioned at one or more of the I/O devices 54 rather than the entire set of I/O devices 54. These nodes may be positioned around and/or underneath the I/O devices 54. In another implementation, multiple nodes may be positioned around the edge of the I/O surface 52 (e.g., bezel).

The proximity based capacitive sensing circuit may be configured to work similarly to a touch based capacitive sensing circuit, and in some cases the circuits may be one and the same. For example, using a smart controller, a touch based device may be configured to sense objects that are not touching but in close proximity to the touch surface. Typically, the capacitance increases as a finger approaches the touch surface, and further increases as the finger presses on the touch surface.

Figure 4:
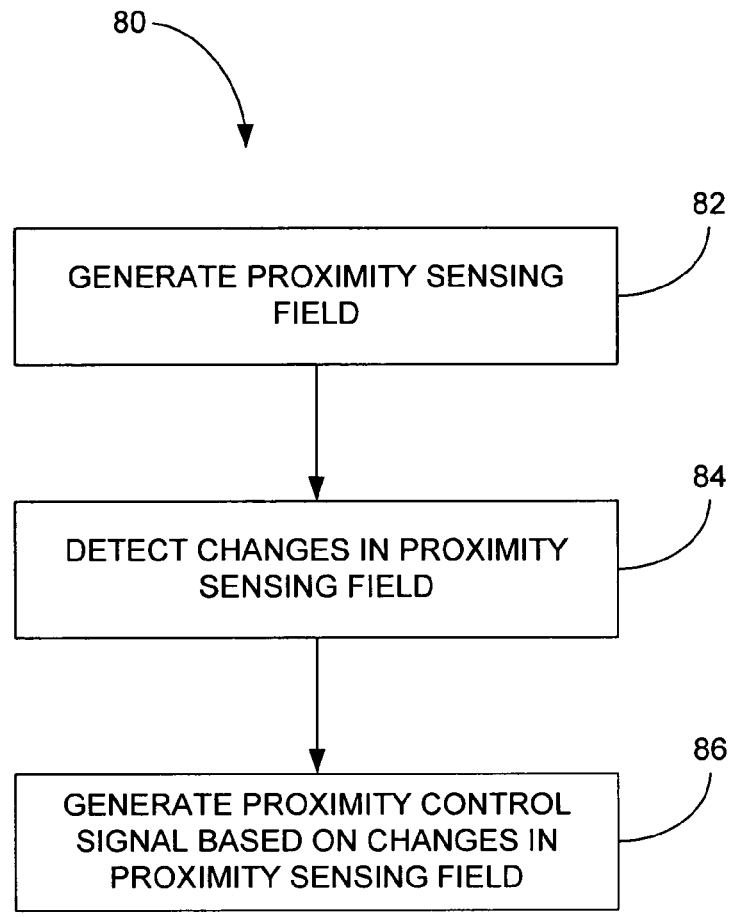
FIG. 4 is a diagram of a method of operating an I/O platform, in accordance with one embodiment of the present invention.

FIG. 4 is a diagram of a method 80 of operating an I/O platform, in accordance with one embodiment of the present invention. The method begins at block 82 where a proximity sensing field is generated above an I/O device. The sensing field may for example be generated using techniques associated with capacitance or infrared technologies (or others mentioned above). The sensing field is spaced apart (non contact) but in close proximity to the I/O devices. The distance between the I/O device and the sensing field may be as small as about 2 mm and as large as about 30 mm, and more particularly between about 2 mm and about 10 mm. Capacitance sensing fields may for example be between about 2 mm and about 3 mm while IR fields can be just about anywhere (e.g., focused to a particular distance above the surface).

In block 84, disturbances or changes in the sensing field are detected and thereafter registered as a proximity event. For example, when a finger is placed within the sensing field, the sensing field is disturbed and a controller translates this disturbance to mean that a finger is present. In the case of a capacitive proximity sensor, which may be separate component or a part of a capacitive sensing touch pad, the finger changes the capacitance at the sensing field and this change is registered as a proximity event. In the case of an IR proximity sensor, the finger scatters the light from the emitter when it is placed near the sensing field, and the scattered light is measured by a detector. Changes in light intensity is registered as a proximity event.

Thereafter, in block 86, a proximity control signal is generated based on the presence of the finger in the proximity sensing field. This is typically accomplished before any other touch based inputs are received since the finger passes through the sensing field on its way to actuating the touch based I/O devices. The proximity control signal can be used to affect the I/O platform in some non trivial manner or it can be used as a control signal in a host device.

Figure 5:
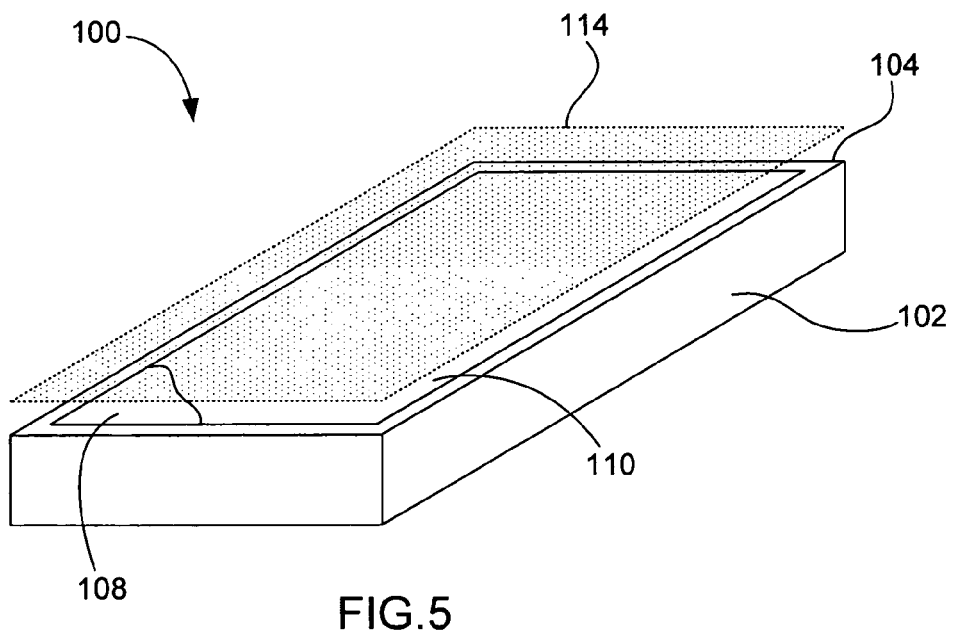
FIG. 5 is a simplified side elevation view of a portable computing device, in accordance with one embodiment of the present invention.

FIG. 5 is a simplified side elevation view of a portable computing device 100, in accordance with one embodiment of the present invention. The portable computing device 100 may for example be a portable computer, tablet PC, PDA, media player (e.g., music player, video player, game player), digital camera, GPS module, and the like.

The portable computing device 100 may be a handheld computing device. As used herein, the term "hand-held" means that the computing device has a form factor that is small enough to be comfortably held in one hand. A handheld computing device may be directed at one-handed operation or two-handed operation.

In one-handed operation, a single hand is used to both support the device as well as to perform operations with the user interface during use. Cellular phones, and media players are examples of hand-held devices that can be operated solely with one hand. In the case of a cell phone, for example, a user may grasp the phone in one hand between the fingers and the palm and use the thumb to make entries using keys, buttons or a joy pad.

In two-handed operation, one hand is used to support the device while the other hand performs operations with a user interface during use or alternatively both hands support the device as well as perform operations during use. PDA's and game players are examples of hand-held device that are typically operated with two hands. In the case of the PDA, for example, the user may grasp the device with one hand and make entries using the other hand, as for example using a stylus. In the case of the game player, the user typically grasps the device in both hands and make entries using either or both hands while holding the device.

The hand-held device may further be sized for placement into a pocket of the user (e.g., pocket sized). By being pocket-sized, the user does not have to directly carry the device and therefore the device can be taken almost anywhere the user travels (e.g., the user is not limited by carrying a large, bulky and often heavy device, as in a laptop or notebook computer).

As shown, the computing device 100 generally includes a housing 102 for enclosing internally various electronic components associated with operating the computing device 100. In general, the housing 102 serves to surround the internal electronic components at a peripheral region thereof so as to cover and protect the internal components from adverse conditions. The internal electrical components may include mechanisms for processing, generating, transmitting and receiving data associated with operating the portable computing device. By way of example, the internal electronic components may take the form of integrated circuits (e.g., processors, controllers, memory), or other electrical devices (e.g., circuit boards, cables, fans, power supplies, batteries, hard drive, disk drive, modem, connectors, etc.).

The computing device 100 also includes a user interface 104 that is the point of communication between the device 100 and the user of the device 100. The user interface may include any number of UI features, which can be located on any of the surfaces of the housing 102. In most cases, however, a predominant number of the U" features are placed on a front surface of the computing device 100. The UI features 106 may be embodied in a variety of ways and may include any number of input and/or output devices including but not limited to switches, buttons, dials, sliders, navigation pads, touch pads, touch screens, displays, speakers, and the like.

The UI features may even include advanced devices such as mechanically actuated touch pads such as those described in U.S. patent application Ser. No. 10/643,256, touch sensitive housings such as those described in U.S. patent application Ser. No. 11/115,539, multipoint sensing touch pads or touch screens such as those described in U.S. patent application Ser. No. 10/840,862, display actuators such as those described in U.S. patent application Ser. No. 11/057,050, all of which are herein incorporated by reference.

In one embodiment, the user interface 104 of the computing device 100 includes a full screen or near full screen display 108. A full screen display is a display that consumes, or at least dominates, a surface (e.g., front surface) of the computing device 100. In one example, a full screen display consumes substantially the entire front surface of the computing device 100 (in both directions). The full screen display may for example consume at least 90% of a front surface of a housing for the computing device. It may extend edge to edge or it may fit within a small bezel of the housing at the edge of the device. The full screen display may have a variety of different configurations depending on the overall footprint of the device. If the device is wide, the full screen display may have a traditional aspect ratio of about 4:3. If the device is elongated, the full screen display may have an aspect ratio that is more panoramic such as 16:9.

In this embodiment, in order to provide input functionality, the user interface 104 may additionally include a touch screen 110 disposed over the full screen display 108. The touch screen 110 may extend completely over the full screen or it may only cover a portion of the full screen. In most cases, the touch screen 110 covers at least the display portion of the full screen display 108. A multifunctional device that utilizes a full screen display among other advanced UI features may be found in U.S. Provisional Pat. App. No. 60/658,777, which is herein incorporated by reference.

Although a touch screen display is shown, it should be appreciated that the user interface may include any combination of input output devices such as any of those described above, or any of those further described in the applications incorporated by reference.

The computing device 100 also includes a proximity detection system 112. The proximity detection system is configured to detect when an object such as a finger (or stylus) comes in close proximity to the computing device 100. Proximity sensing differs from touch sensing in that there is no contact. The sensing occurs above the surface of the housing 102. For example, the proximity detection system 112 detects when an object such as a finger is placed in space above, and not in contact with, a surface of one or more regions of the computing device 100. The regions may include any side or any portion of a side of the computing device 100.

Proximity detection can be performed using a variety techniques. The techniques general depend on the object that is to be detected (e.g., finger, plastic, metal), the environmental conditions surrounding the computing device, the size of the computing device, and the costs associated with the proximity sensing technique, the resolution of the proximity sensing technique, etc. By way of example, the proximity detect system 112 may be based on techniques such as capacitive, electric field, inductive, hall effect, reed, eddy current, magneto resistive, optical shadow, optical visual light, optical IR, optical color recognition, ultrasonic, acoustic emission, radar, sonar, conductive or resistive. In each of these cases, the proximity detection system 112 may include one or more proximity sensors and/or switches. Switches are similar to sensors except that they provide a switch output when an object is detected. Furthermore, depending on the technology used, the proximity detect system may be hidden from view (e.g., internal to the housing) or it may be in plane sight to the user (e.g., external to the housing).

In one embodiment, the capacitance sensing circuit described in FIG. 3 (or similar circuit) is used. In another embodiment, the IR sensing circuit described in FIG. 2 (or similar circuit) is used.

In one embodiment, the proximity detection system 112 is configured to detect the presence of an object at the user interface 104 of the computing device 100. Using the illustrated example, the U.I. 104 is located at the front surface of the housing 102, and thus the proximity detection system 112 is configured to generate a sensing field 114 over all or some portion of the front surface of the housing 102. As mentioned previously, this may be accomplished with single or multiple sensing nodes, and regionally or over the entire surface.

In one implementation, the user interface 104 is activated from a dormant state when an object is detected. For example, the device may be woken up from a sleep mode. When it wakes up, the display 108 may be fully powered and the touch screen 110 may be readied for receiving touch inputs (e.g., unlocked).

In another implementation, the features of the user interface are altered when an object is detected. For example, buttons and switches may be illuminated and readied for input, or particular GUI elements on a display may brought into view and readied for receiving inputs. The later example may allow the display 108 to keep GUI controls and tools hidden until a user makes a motion to use the touch screen 110 or other input device. The GUI controls and tools that pop up when a finger is detected may be standard set of tools or they may be based on other factors including the location of the finger and/or the application currently running in the computing device 100. For example, in a music application, an onscreen control box that includes menu, play/pause, seek, and the like may be presented when a user hovers their finger above the user interface (especially the input portion of the user interface). Alternatively, an onscreen or virtual scroll wheel may be presented so that a user can scroll through a list of songs. Once the GUI control element is presented, the user may make selections associated therewith by using one of the input devices provide by the computing device (e.g., touch screen) or by performing a proximity gesture. A proximity gesture can be similar to a touch gesture except that it is performed without contact, and in some cases may even include a z component along with an x and y component.

Figure 6:
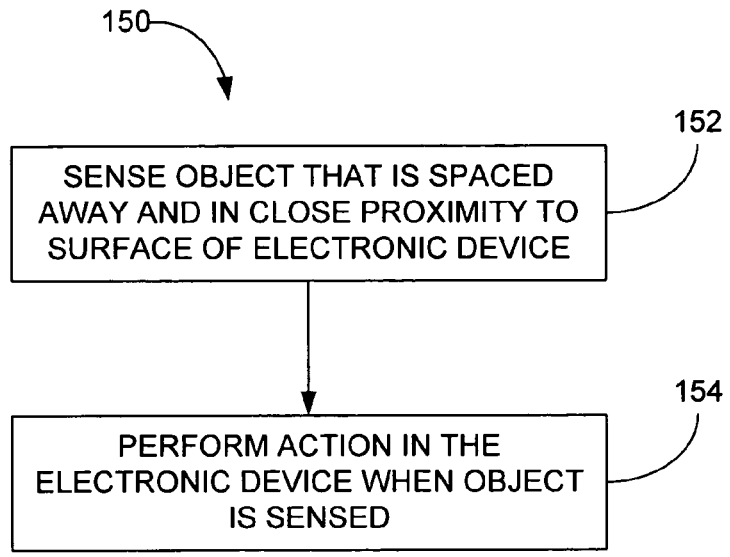
FIG. 6 is a diagram of a proximity based method, in accordance with one embodiment of the present invention.

FIG. 6 is a diagram of a proximity based method 150, in accordance with one embodiment of the present invention. The proximity based method may be performed on any electronic device as for example any of those previously described. By way of example, the method may be performed in the computing device of FIG. 5. The method 150 includes at least two blocks—blocks 152 and 154. In block 152, an object spaced away and in close proximity to an electronic device is sensed (e.g., non contact). This may for example be accomplished with any of those proximity detection systems described above. The sensing may be performed over the entire surface or regionally at particular locations of the electronic device as for example a single side, plurality of sides, all sides, a portion of single side, different portions of a single side, portions on multiple sides, and the like. The sensing may be configured to detect the presence of or lack of an object around the sensing field located above and in close proximity to the surface of the electronic device. Alternatively or additionally, the sensing may be broken up into nodes, pixels or juxtaposed sensing areas that cooperate to monitor the motion of an object as it is moved in the sensing field (this may be analogous to tracking as for example when using a touch pad or touch screen).

In block 154, an action is performed in the electronic device when an object is detected. The actions may be widely varied. The actions, may for example, include logging onto a computer or a computer network, loading a user profile associated with a user's preferred arrangement of the computer desktop, launching a particular program, opening a file or document, opening a particular GUI element, viewing a menu, making a selection, executing instructions, encrypting or decoding a message, operating an input/output device and/or the like.

Figure 7:
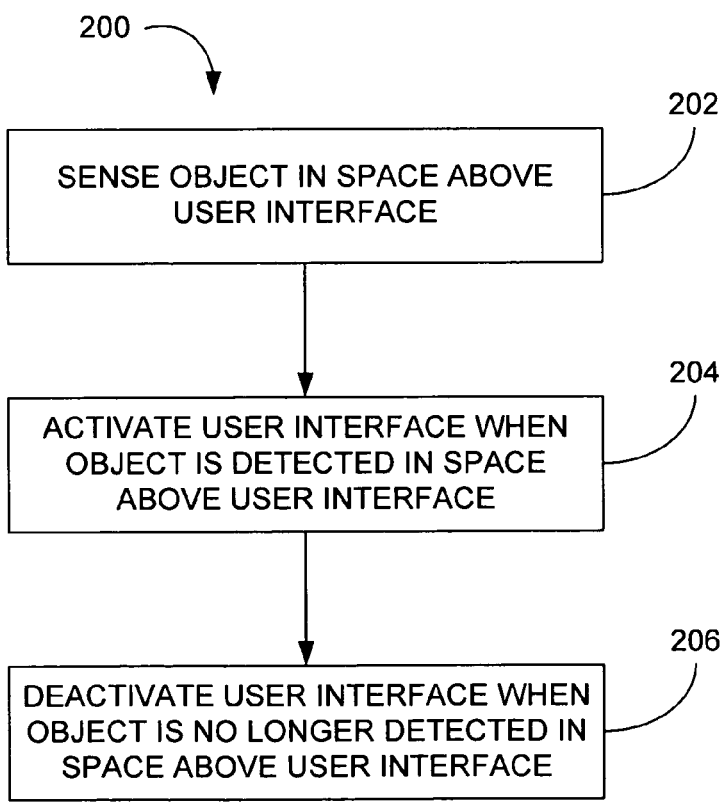
FIG. 7 is a diagram of a method of operating an electronic device, in accordance with one embodiment of the present invention.

FIG. 7 is a diagram of a method 200 of operating an electronic device, in accordance with one embodiment of the present invention. The method begins at block 202 where an object is sensed in the space above a user interface. The user interface may include for example a display, touch pad or a touch screen display (or any of those mentioned above).

Following block 304, the method proceeds to block 204 where the user interface or some portion of the user interface is activated or affected in a non trivial manner when an object is detected above the user interface. In one embodiment, the user interface is activated from a dormant state as for example when the device is in a sleep mode to save battery power or lock mode to prevent inadvertent entries at the user interface. In another embodiment, individual features of the user interface may be activated. For example, buttons, switches or navigation pads may be unlocked and illuminated. Alternatively or additionally, a display may display a GUI interface as for example one that includes tools or controls for operating some aspect of the electronic device.

The method also includes block 206 where the activated portion of the user interface is deactivated when an object is no longer detected. The deactivation may be instantaneous or it may be based on a time out. In the later case, the user interface may be deactivated when an object is not detected for a preset amount of time (e.g., 1 minute).

Figure 8:
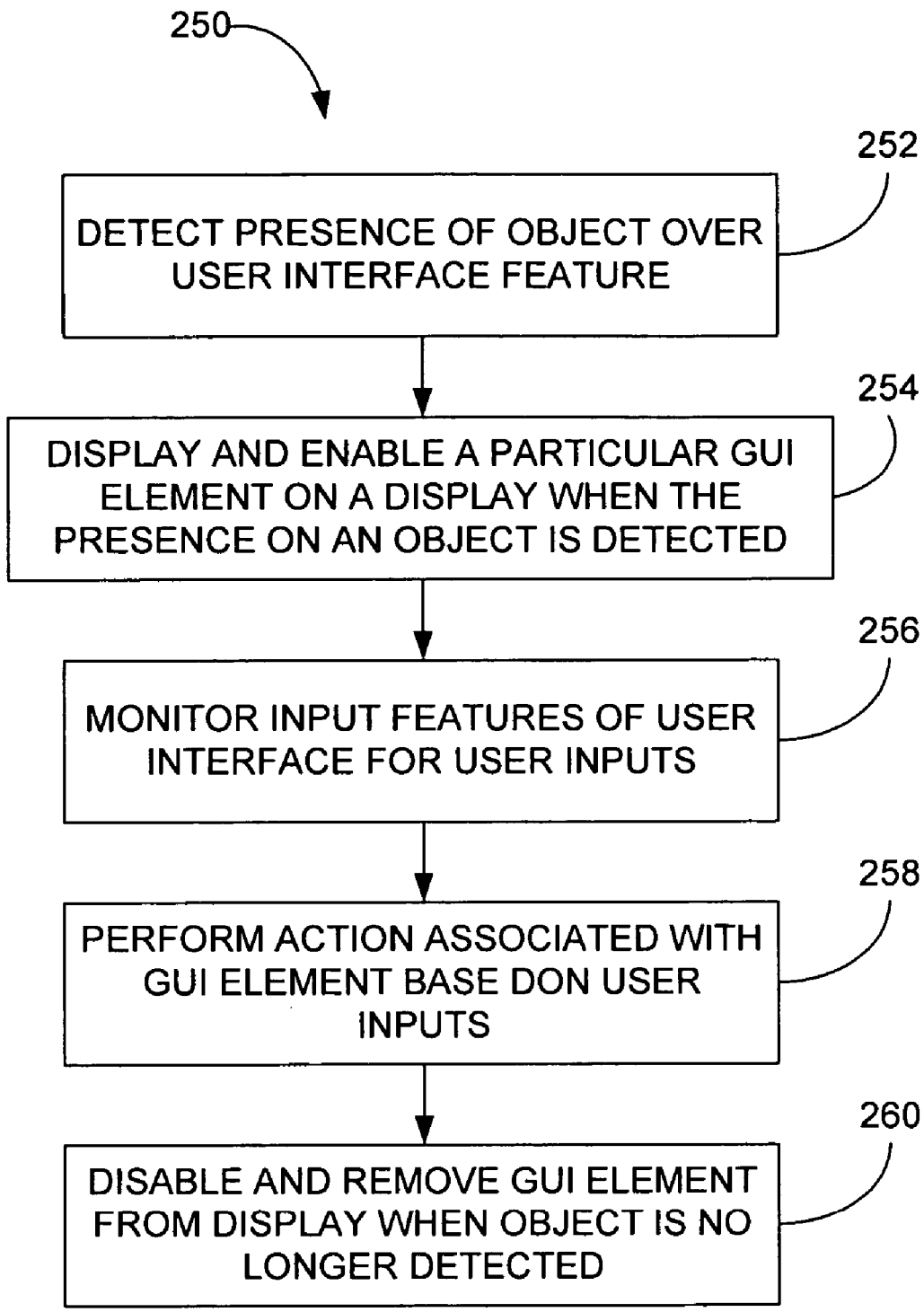
FIG. 8 is a diagram of a proximity method of operating an electronic device, in accordance with one embodiment of the present invention.

FIG. 8 is a diagram of a proximity method 250 of operating an electronic device, in accordance with one embodiment of the present invention. The method begins at block 252 where the presence of an object is detected over a user interface feature. The user interface feature may for example be a display, touch screen display, touch pad or some other navigation/selection based device.

Following block 252, the method proceeds to block 254 where a display portion of the user interface displays and enables a particular graphical user interface element when the presence of the object is detected. By way of example, the graphical user interface element may be a tool box or control panel associated with the application currently running on the electronic device.

Following block 254, the method proceeds to block 256 where input features of the user interface are monitored for user inputs. For example, a touch screen, touch pad or some other navigation/selection based device may be used to generate user inputs. Alternatively or additionally, a proximity based device may be used to generate user inputs.

Following block 256, the method proceeds to block 258 where one or more actions are performed in the particular graphical user interface element based on the user inputs.

In block 260, the graphical user interface element is disabled and removed from the display when the presence of the object is no longer detected. This may be instantaneous or based on a time out.

In one embodiment, block 256 is associated with a touch sensing device such as a touch screen or touch pad, and therefore block 256 includes monitoring touch events that occur on the touch sensitive surface of the touch sensing device. These events may include tracking and selection events, which are normal to touch sensing devices.

In one implementation, the touch sensing device is further configured to differentiate between light touch interactions and hard touch interactions that occur on the touch sensing surface. This may for example be accomplished by monitoring the forces exerted on a touch sensing surface during a touch event. The light touch interactions can be used to perform passive actions such as navigating through content, and content manipulation generally without causing a major event to occur. Examples of passive events include moving a cursor, scrolling, panning, etc. The hard touch interactions, on the other hand, can be used to select on screen buttons or initiate commands (e.g., causes a significant change to occur). In this embodiment, the inputs may include three input levels, proximity, light touch and hard touch.

Figure 9:
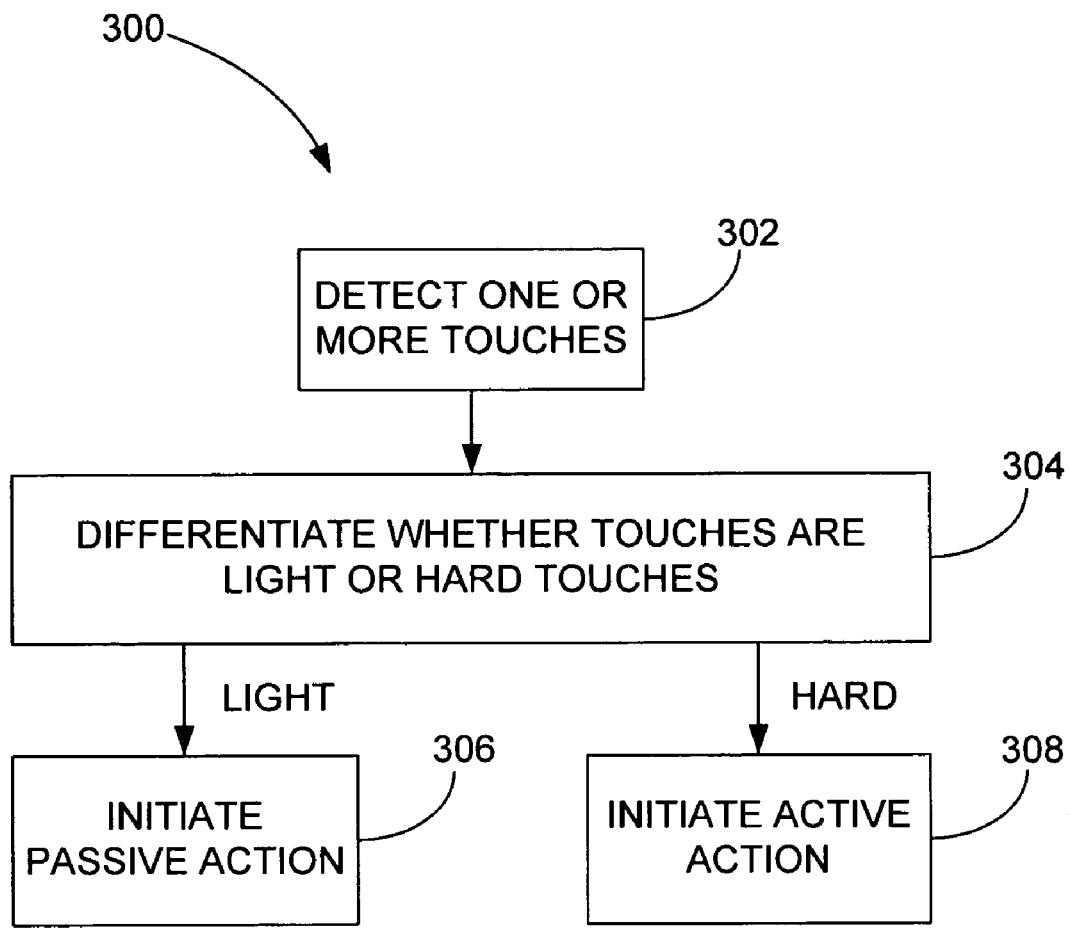
FIG. 9 is a diagram of a touch method, in accordance with one embodiment of the present invention.

FIG. 9 is a diagram of a touch method 300, in accordance with one embodiment of the present invention. The touch method 300 may for example be included in block 256 of FIG. 8. The touch method 300 begins at block 302 where one or more touches are detected. The touches include not only x any y components but also z components. The x and y components are supplied by a touch sensing device such as touch screen, touch pad or touch housing. The z component, on the other hand, is generally provided by force sensors located behind the touch surface of the touch sensing device. By way of example, the x, y and z components may be supplied by a display arrangement that includes a touch screen positioned over a display and a force sensing device disposed underneath the display. The x, y and z components may also be supplied by a touch pad or touch housing that includes a touch sensitive surface and force sensing device underneath the touch sensitive surface. Additionally or alternatively, the z component may be supplied by a physical switch located behind the touch surface (display actuator), or possibly using the touch surface itself (e.g., contact patch areas that increase in size based on increases in touch pressure).

Following block 302, the method proceeds to block 304 where a determination is made as to whether the touch is a light or hard touch (e.g., differentiating whether the detected touch is a light touch or a hard touch). The determination is generally based on the force or pressure of the touch (z component). For example, if the force of the touch is smaller than a predetermined threshold then the touch is considered a light touch and if the force of the touch is larger than the predetermined threshold then the touch is considered a hard touch.

If it is determined that the touch is a light touch, the method proceeds to block 306 where a passive action is initiated when a touch event is performed. Examples of passive actions include navigation, moving a cursor, scrolling, panning, etc. If it is determined that the touch is hard touch, an active action is initiated when a touch event is performed. Examples of active actions include making selections and implementing commands.

Although not a requirement, the touch method may additionally include a block where the one or more touches are classified as a primary touch or a secondary touch. Primary touches are touches that are intended to cause an action while secondary touches are touches that are not intended to cause an action. Gestures are examples of primary touches while a thumb positioned over the touch area in order to hold the hand-held device is an example of a secondary touch. Once the touches are classified as primary or secondary, the secondary touches are filtered out, and the determination of whether a touch is a light or hard touch is made with the primary touches.

Figure 10:
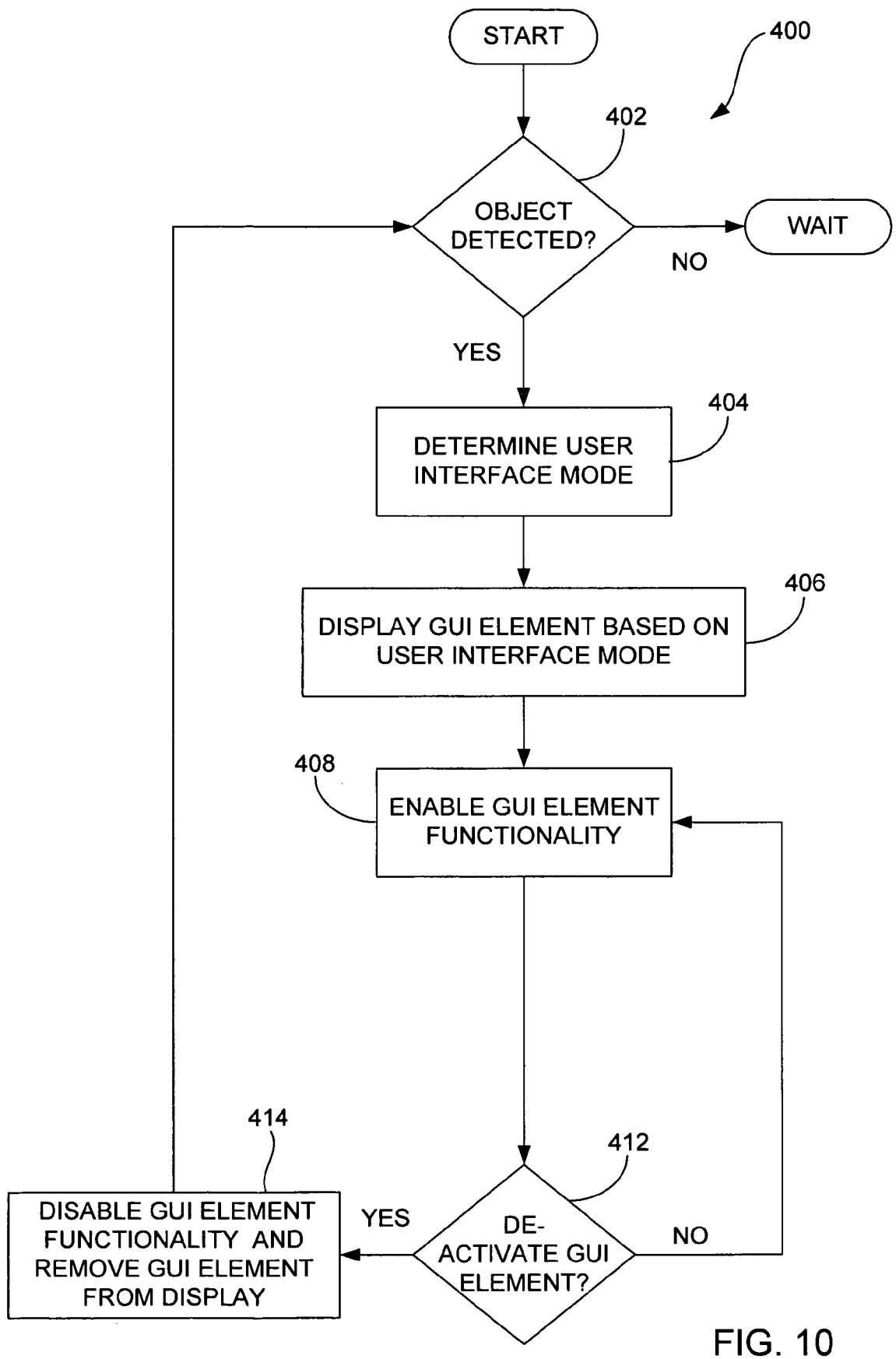
FIG. 10 is user interface method, in accordance with one embodiment of the present invention.

FIG. 10 is user interface method 400, in accordance with one embodiment of the present invention. The user interface method 400 may for example be performed on a computing device having a display, a touch sensitive input device such as a touch screen and a proximity detector. The user interface method 400 begins at block 402 where an object such as a finger or stylus is detected above and spaced away from the display. This may be accomplished with the proximity detector when the finger crosses into the sensing field of the proximity detector. In some cases, the touch screen may act as a proximity detector as for example in cases where the touch screen is based on capacitance. The controller can be configured to monitor changes in capacitance even when there is no touch. The object however typically has to be fairly close to the touch surface of the touch screen.

Once the object is detected, the user interface method 400 proceeds to block 404 where a user interface (UI) mode is determined. The user interface mode may be widely varied. The user interface mode may include scroll modes, data entry modes, edit modes, control modes, information modes, etc. Each mode typically has one or more GUI interface elements associated therewith. By way of example, a virtual scroll wheel or slider bar may be associated with a scroll mode, a keyboard or keypad may be associated with data entry mode, a tool bar such as a formatting tool bar or drawing tool bar may be associated with an edit mode, a control panel including buttons may be associated with a control mode, a window may be associated with an information mode, etc.

The user interface mode may be determined at block 404 based on one or more conditions including for example, one or more applications currently running on the computing device, the current state or mode of the one or more applications and/or the proximity characteristics (e.g., location). In fact, determining the user interface mode at block 404 may involve monitoring and analyzing one or more conditions.

The current applications may for example include operating systems (e.g., Mac OS), word processing programs, spreadsheet programs, draw editing programs, image editing programs, gaming programs, photo management programs (e.g., iPhoto), music management programs (e.g., iTunes), video editing programs (e.g., iMovie), movie management programs (e.g., QuickTime), music editing programs (e.g., GarageBand), Internet interface programs and/or the like.

The current state or mode of the applications may correspond to an active portion of the application (e.g., current window or windows within windows). For example, the active portion of a music management program may correspond to a music control mode, a playlist select mode, a menu mode, and/or the like. Further, the active portion of a photo management program may correspond to photo browsing mode or photo editing mode. Further still, the active portion of an internet interface program may correspond to a web mode or an email mode.

The proximity characteristics on the other hand may, for example, correspond to location, number of detected objects, etc.

With regards to applications, different applications may indicate different UI modes. For example, a word processing or spreadsheet application may indicate a data entry mode, while a music management program may indicate a control or scrolling mode. With regards to the current state of an application, different modes of the application may indicate different UI modes. For example, in a music management program, a menu window may indicate one UI mode, while a play list window may indicate another UI mode.

With regards to proximity, the number of fingers may indicate different UI modes. For example, one finger may indicate a first mode while two fingers may indicate a second mode. In addition, the location of the finger(s) may indicate different UI modes. For example, a first location may indicate a first UI mode, while a second location may indicate a second UI mode (if the object is located over a border of a music program a first UI mode may be implemented, and if the object is located over a play list or list of songs in the music program a second UI mode may be implemented.

In one embodiment, the user interface mode is based on only one of the conditions. For example, the user interface mode is only based on the application, the current state of the application or one of the various proximity characteristics as described above. In another embodiment, the user interface mode is based on multiple conditions. For example, the user interface mode may be based on a combination of at least two selected from the application, the current state of the application and the various proximity characteristics. By way of example, the application combined with a first proximity characteristic may indicate a first UI mode and the same application combined with a second proximity characteristic may indicate a second UI mode.

To cite a few examples, if the application is a word processing or spreadsheet program then the mode may be determined to be a data entry mode so that data can be entered into the spreadsheet (e.g., keyboard). If the application is a music management program and a playlist is currently showing (active portion), the mode may be determined to be a scroll mode so that the items in the list may be scrolled through in order to find a desired item (e.g., scroll wheel). Alternatively, if a song is playing (active portion), the mode may be determined to be a control mode so that the manner in which songs are played can be controlled (e.g., play, stop, seek and volume control options). Further, if the application is a photo management program and a particular photo is displayed (active portion), the mode may be determined to be a control mode so that the photo can be modified (e.g., converting to black and white, removing red eye, and rotate options).

After determining the user interface mode 404, the user interface method 400 proceeds to block 406 where one or more GUI elements are displayed based on the user interface mode. This may be accomplished with the display device. In some cases, only one GUI element is displayed and in other cases multiple GUI elements are displayed. The GUI element is typically associated with a particular mode. For example, a slider bar or scroll wheel may be displayed in a scroll mode, a keyboard or keypad may be displayed in a data entry mode, a tool bar may be displayed in an edit mode, various buttons or a control panel may be displayed in a control mode, and information windows may be displayed in an information mode.

The GUI element may be displayed in a variety of ways. For example, it can be positioned over the currently displayed graphical images, or it can displace the currently displayed graphical images (e.g., minimize, shift, etc.). In some cases, the GUI element is made semi transparent so that the current graphical image disposed below the GUI element can be seen (thereby eliminating minimizing and shifting). This may be helpful when using a scroll wheel to traverse through a list disposed below the scroll wheel. Furthermore, the GUI element can be placed in the vicinity of the touch or it can be placed in some predetermined location. The predetermined location may be based on ergonomics, i.e., what is the best location for the user.

In addition to the above, the GUI element may be displayed using a transition effect such as growing, fading in, popping up, and in some cases may even pulsate, throb, etc. If the effect is popping up, the GUI element is immediately brought into view. If the effect is growing, a small GUI element (e.g., scroll wheel) is initially displayed, and thereafter the GUI element continuously enlarges through various sizes until it reaches its desired size. In addition, the final size of the GUI element may be based on the length of time the object is detected. For example, the GUI element stops growing when the touch is no longer detected. Alternatively, the speed and size may be user adjustable as for example through a control panel. If the effect is fading, the GUI element is slowly brought into view from nothing, through various levels of distortion or transparency, to a final complete image. The fading can be controlled similarly to growth. For example, the level of fade may be controlled by the length of time the object is detected.

The transition effect may even carry over to the currently displayed images, i.e., the images currently displayed before the object was detected. In one embodiment, the opposite effect happens to the currently displayed images. For example, the currently displayed graphical images are minimized smaller and smaller as the GUI element grows larger and larger. Alternatively, if the GUI element immediately pops in, the currently displayed graphical images can immediately pop out or be immediately minimized.

In block 408, the functionality of the GUI element is enabled. When enabled, the GUI element is readied for receiving inputs. In the case of a touch screen, for example, touch events are monitored relative to the GUI element and actions associated with the touch event are performed. The enablement may occur simultaneously with the display of the GUI element so that a user can immediately start using the GUI element once displayed. By way of example, in a scroll mode, a virtual scroll wheel may be displayed and when enabled, the touch events are monitored relative to the scroll wheel. During monitoring, control signals associated with the position of the finger on the scroll wheel are generated as the finger swirls around the virtual scroll wheel. These signals can be used to perform scrolling. For example, the number, combination and frequency of the signals may be converted into distance, direction and speed necessary for moving a selection bar through a list. Examples of virtual scroll wheels and their operations may be found in U.S. patent application Ser. Nos. 10/903,964 and 11/038,590, both of which are herein incorporated by reference.

At some point after enabling and displaying the GUI element, a determination 412 is made as to whether or not to deactivate the GUI element. The determination 412 can be made in a variety of ways including, for example: 1) the object is no longer detected, 2) an object has not been detected for a preset amount of time, 3) a time out occurs (a preset amount of time has gone by since the GUI element was first displayed/enabled), or 4) a user selection (e.g., a user selects a button that closes the GUI element).

If the determination indicates deactivation, then the method proceeds to block 414 where the GUI element is disabled and removed from display. Once disabled, actions will no longer be performed when a touch event occurs. The removal of the GUI element from display may function similar to displaying the GUI element in that it can be removed using a transition effect such as slowly fading out, shrinking or immediately disappearing (popping out). The removal transition effect may work opposite the displaying transitioning effect. For example, the GUI element fades out similarly to fading in, shrinks similarly to growth or pops out similarly to popping in. Further, the GUI element can slowly recess and disappear from view while the displaced or shrunken current graphical images can slowly grow back to their original size and shape. If the determination does not indicate deactivation, then the method maintains the display of the GUI element as well as the enablement thereof.

Figure 11:
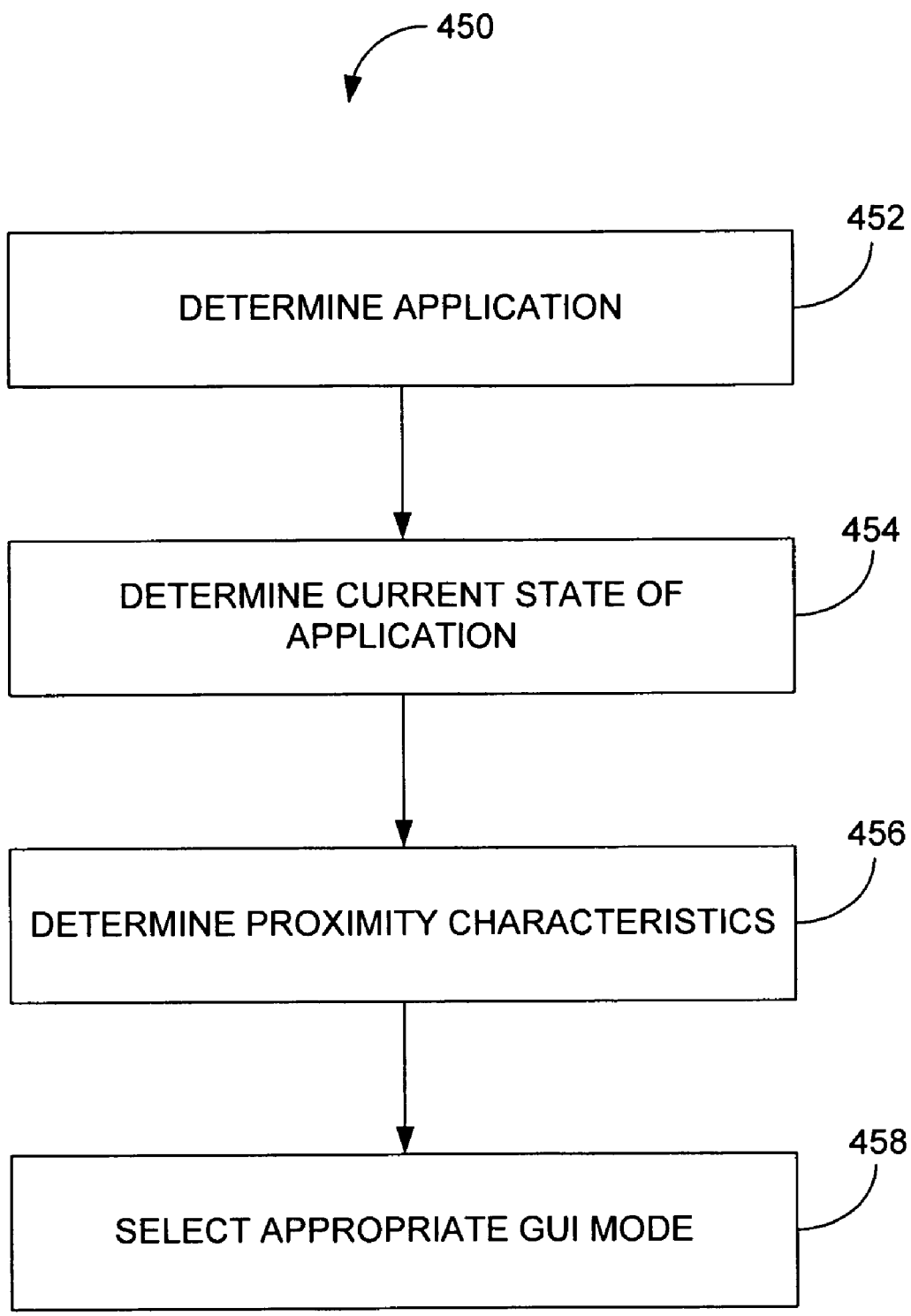
FIG. 11 is a determination method, in accordance with one embodiment of the present invention.

FIG. 11 is a determination method 450 in accordance with one embodiment of the present invention. The determination method may, for example, correspond to the block 404 in FIG. 10. The determination method begins at block 452 where the current application is determined. The determination method proceeds to block 454 where the current state of the application is determined. Following block 454, the determination method proceeds to block 456 where the proximity characteristics associated are determined. The determination method proceeds to block 460 where a UI mode is selected based on the results from blocks 452-458. By way of example, a set of rules may indicate appropriate UI modes for a particular set of conditions.

Figure 12:
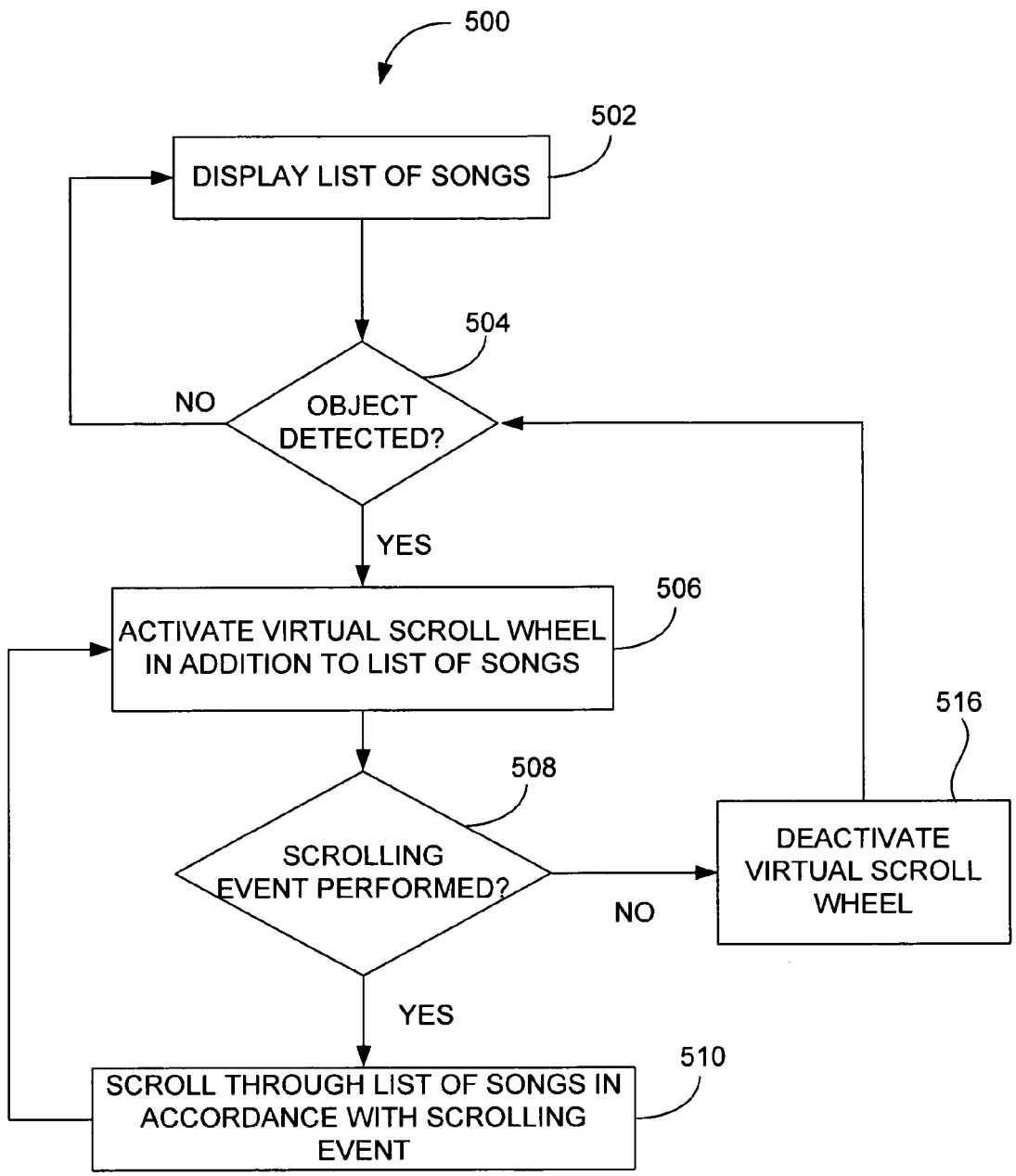
FIG. 12 is a user interface method, in accordance with one embodiment of the present invention.
Figure 13A:
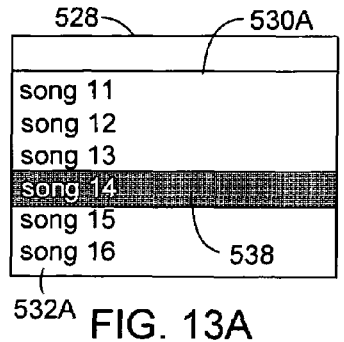
FIG. 13A-13F illustrates a sequence associated with the method shown in FIG. 12, in accordance with one embodiment of the present invention.
Figure 14A:
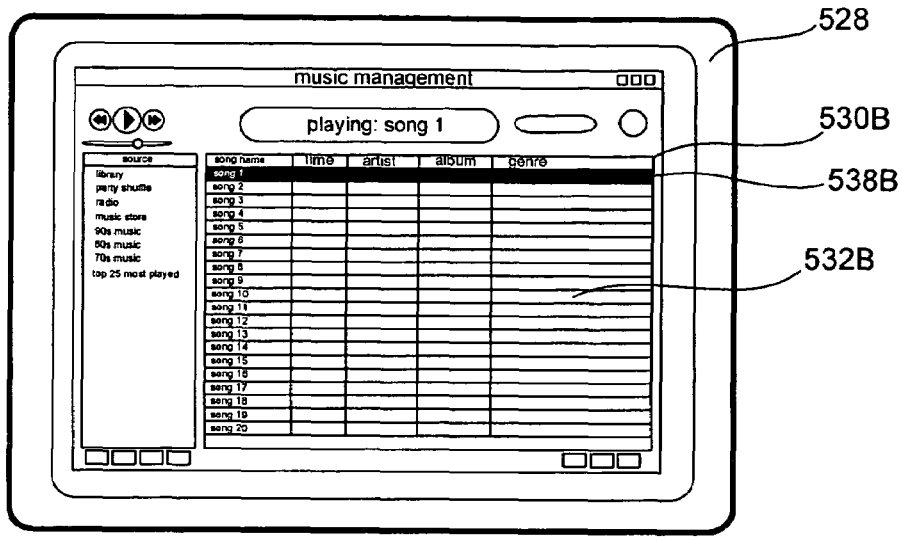
FIG. 14A-14F illustrates a sequence associated with the method shown in FIG. 12, in accordance with one embodiment of the present invention.

FIG. 12 is a user interface method 500 in accordance with one embodiment of the present invention. The method may, for example, be performed on a computing device having a display, a touch sensitive input device such as a touch screen and a proximity detector. The interface method 500 begins at block 502 where a list of songs are displayed. FIG. 13A shows one example of a window 530A including a list of songs 532A, and FIG. 14A shows another example of a window 530B including a list of songs 532B. FIG. 13A may, for example, be a graphical user interface displayed on an iPod® manufactured by Apple Computer of Cupertino, Calif., and FIG. 14A may for example be a graphical user interface associated with a music management program, such as iTunes® manufactured by Apple Computer of Cupertino, Calif.

Figure 13D:
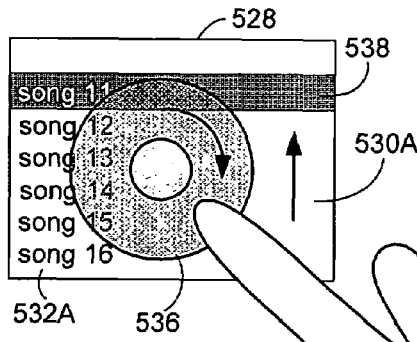
Figure 13B:
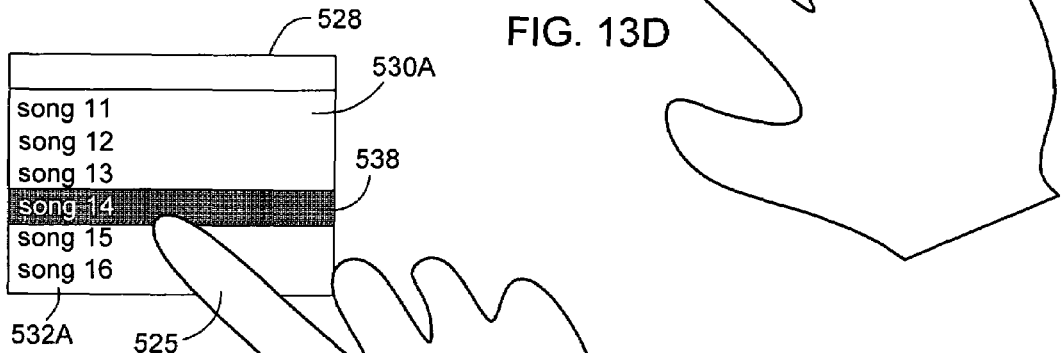
Figure 14B:
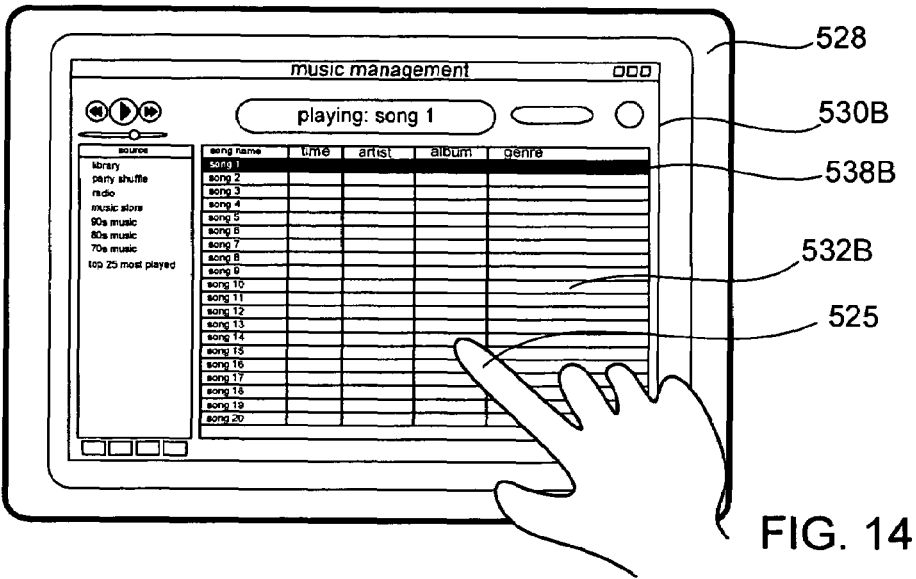

Following block 502, the user interface method 500 proceeds to block 504 where an object is detected over the displayed list of songs (or window or entire GUI). This may be accomplished with the proximity detector when an object such as a stylus or one or more fingers is placed above the touch screen display. FIGS. 13B and 14B show a finger 525 placed over the window 530 including the list of songs 532. Although shown in this figure, the finger is spaced away and not in contact with the touch surface.

Figure 13E:
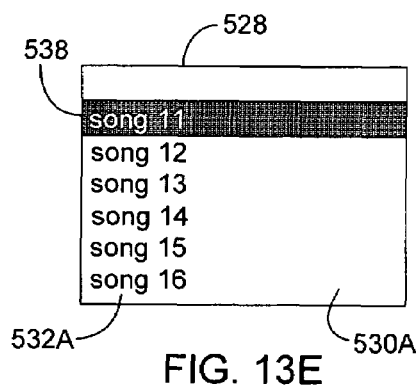
Figure 13C:
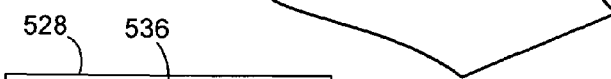
Figure 13F:
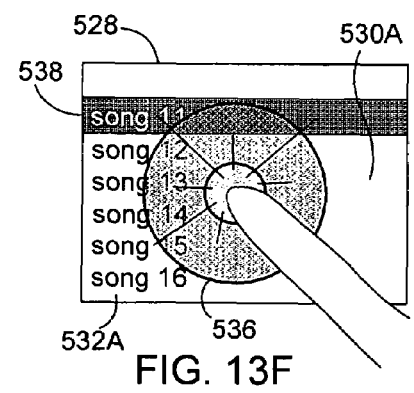
Figure 14C:
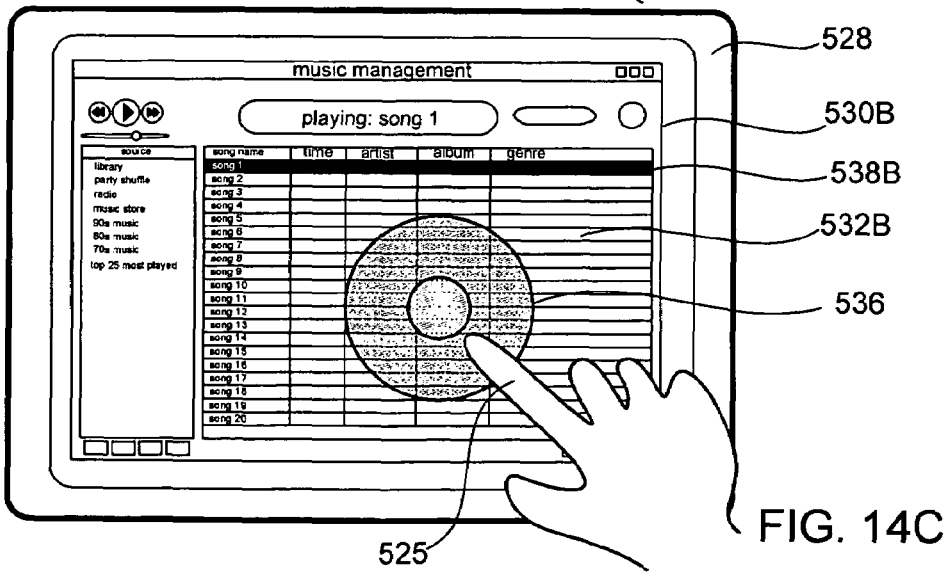

Once the presence of an object is detected, the user interface method 500 proceeds to block 506 where a virtual scroll wheel is activated. That is, a virtual scroll wheel is displayed in addition to the list of songs and its functionality is enabled. In essence, because the song list was active, a scroll wheel that allows a user to traverse through the songs in the list of songs is provided. In some cases, the virtual scroll wheel displaces the media items, i.e., the media items are minimized or shifted to make room for the virtual scroll wheel. In other cases, the virtual scroll wheel is positioned or laid over the media items (the media items keep their current size, shape and position). The virtual scroll wheel can be made semi-transparent so that the media items can be viewed through the virtual scroll wheel. FIGS. 13C and 14C show a transparent virtual scroll 936 wheel laid over the window 530 including the list of songs 532. Alternatively, a virtual slider bar may be displayed.

Once displayed, a determination 508 is made as to whether or not a scrolling event (or gesture) is performed relative to the virtual scroll wheel. For example, whether or not a finger is positioned over the scroll wheel and whether or not the finger is moved around the scroll wheel in a swirling fashion. The scroll event may be a proximity event or a touch event.

Figure 14D:
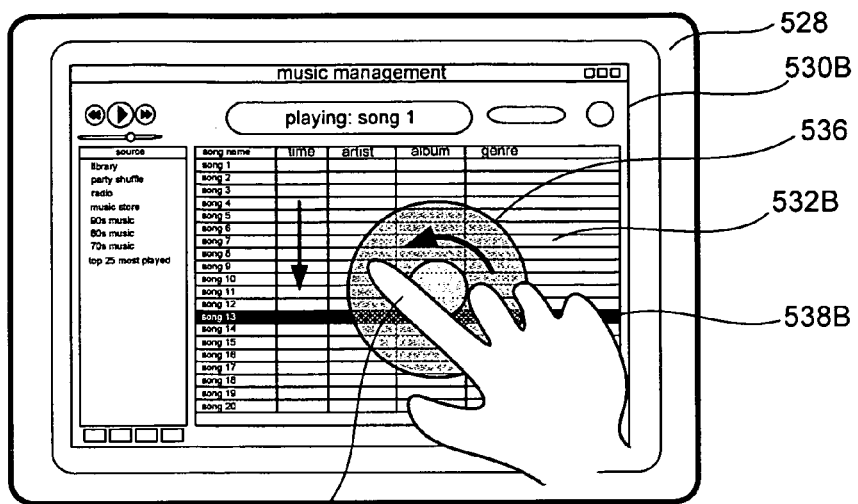
Figure 14E:
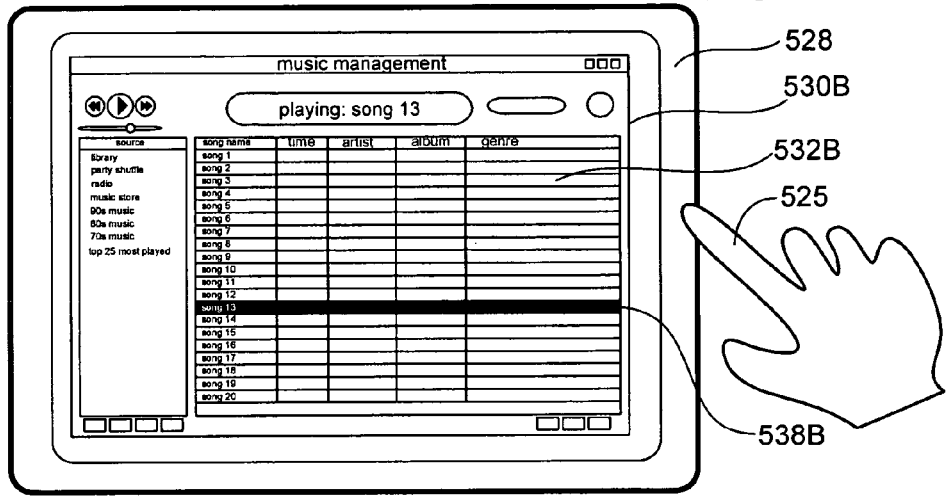
Figure 14F:
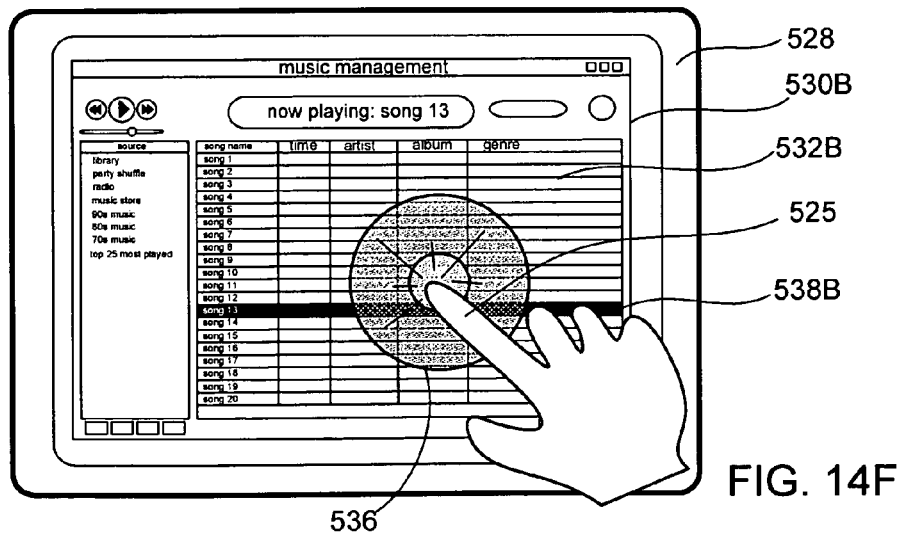

If a scrolling event is performed by the user, the user interface method 500 proceeds to block 510 where scrolling is implemented through the list of songs in accordance with the scrolling touch event. By way of example, a selector bar may be moved from one song to another as the finger is swirled around the virtual scroll wheel. FIGS. 13D and 14D show the finger 525 swirling around the virtual scroll wheel 536, and a selector bar 538 moving linearly through the list of songs 532 in accordance with the swirling finger 525. In the illustrated embodiments, the selector bar is moved linearly up when the finger is swirled in a clockwise fashion and linearly down when the finger is swirled in a counterclockwise fashion. It should be noted, however, that this is not a limitation. For example, the selector bar may moved linearly down when the finger is swirled in a clockwise fashion and linearly up when the finger is swirled in a counterclockwise fashion.

If a scrolling or select touch event is not performed, the user interface method 500 proceeds to block 516 where the virtual scroll wheel is deactivated. That is, the virtual scroll wheel is disabled and removed from the display. FIGS. 13E and 145E show the display 528 without the virtual scroll wheel 536. Although the virtual scroll wheel 536 is removed, changes made to the list of songs, i.e., the position of the selector bar 538, typically remain.

In some cases, the virtual scroll wheel may include button zones across its surface or a virtual button at its center or around its sides. The buttons and button zones may for example correspond to menu, play, seek, pause, and/or the like. In this particular embodiment, the method described above may include additional steps that occur before block 516. For example, if a scrolling touch event is not performed, the user interface method 500 may include an additional block where a determination is made as to whether or not a selection touch event (or gesture) is performed relative to the virtual scroll wheel. The selection touch event may be implemented by tapping the button or by exerting increased or decreased pressure on the button rather than swirling around the surface of the virtual scroll wheel (see FIGS. 13F and 14F). If the button is a song select or enter button, the method include another block where the song with the selector bar disposed thereover is selected. That is, when the virtual button is tapped, or otherwise selected, the song currently covered by the selector bar is played and outputted for the user's enjoyment.

Figure 15A:
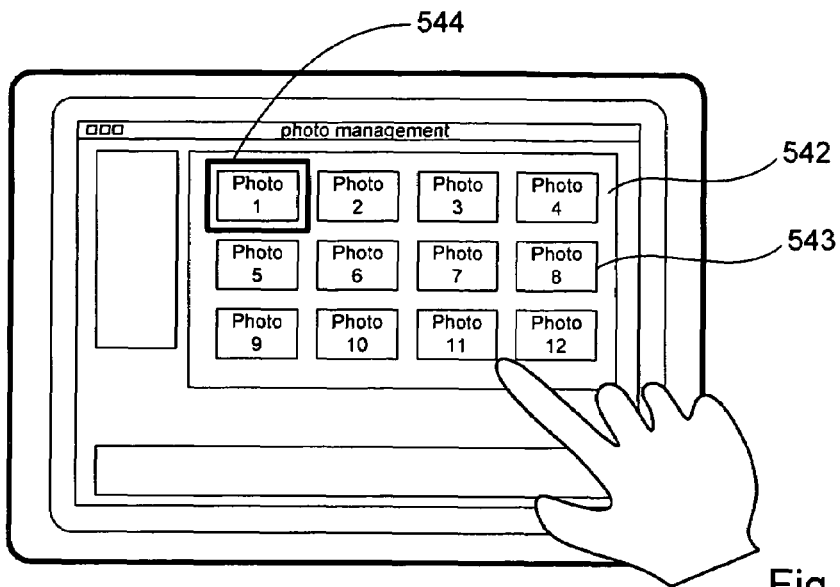
FIGS. 15A-15C illustrate a user interface sequence, in accordance with one embodiment of the present invention.
Figure 15B:
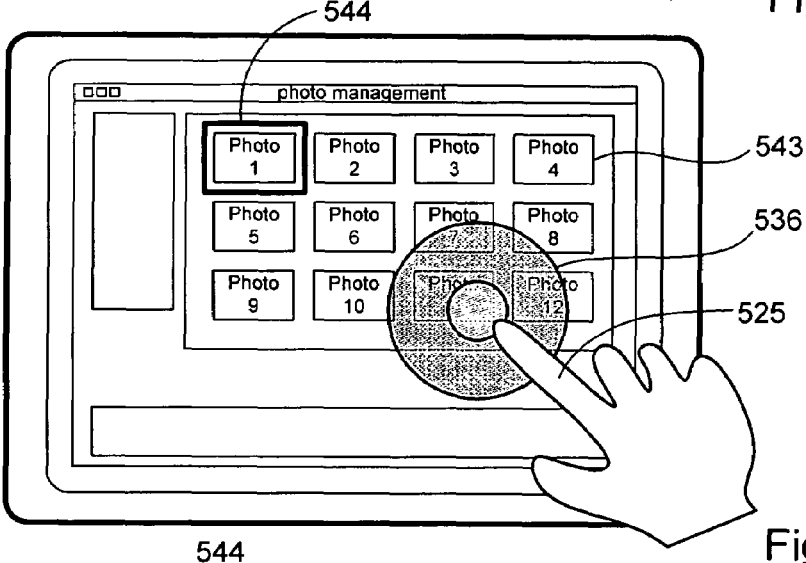
Figure 15C:
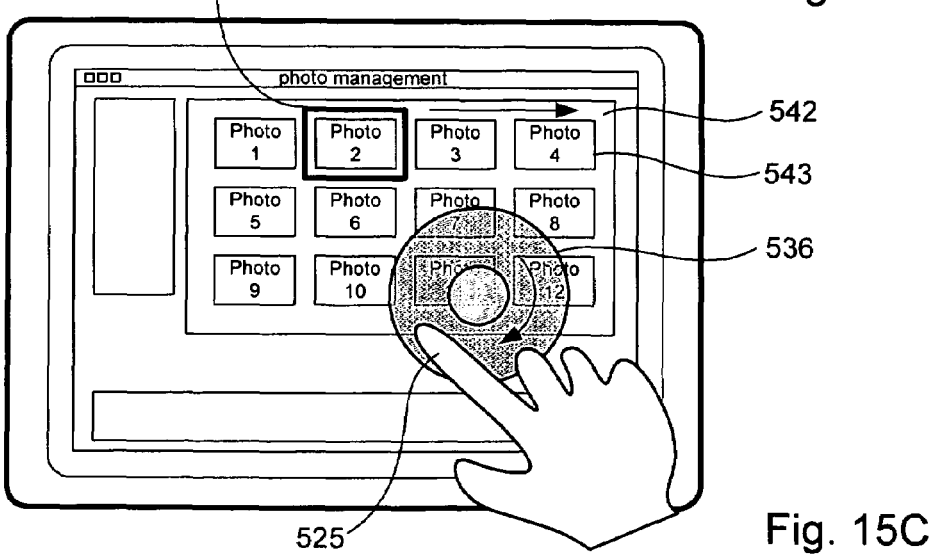

It should be noted that the methods described above are not limited to scrolling through a list of songs. Any media item as well as any group of elements can be scrolled through using the aforementioned technique. For example, in photo layout 542 as shown in FIGS. 15A-15C, the virtual scroll wheel 536 may appear when the user places their finger 525 over the photo layout 542 (or grouping), and thereafter it can be used to move a highlighter 544 through the various photos 543 in the layout 542. By way of example, the photos may be thumbnails images that make traversing through a large number of images easier.

Figure 16:
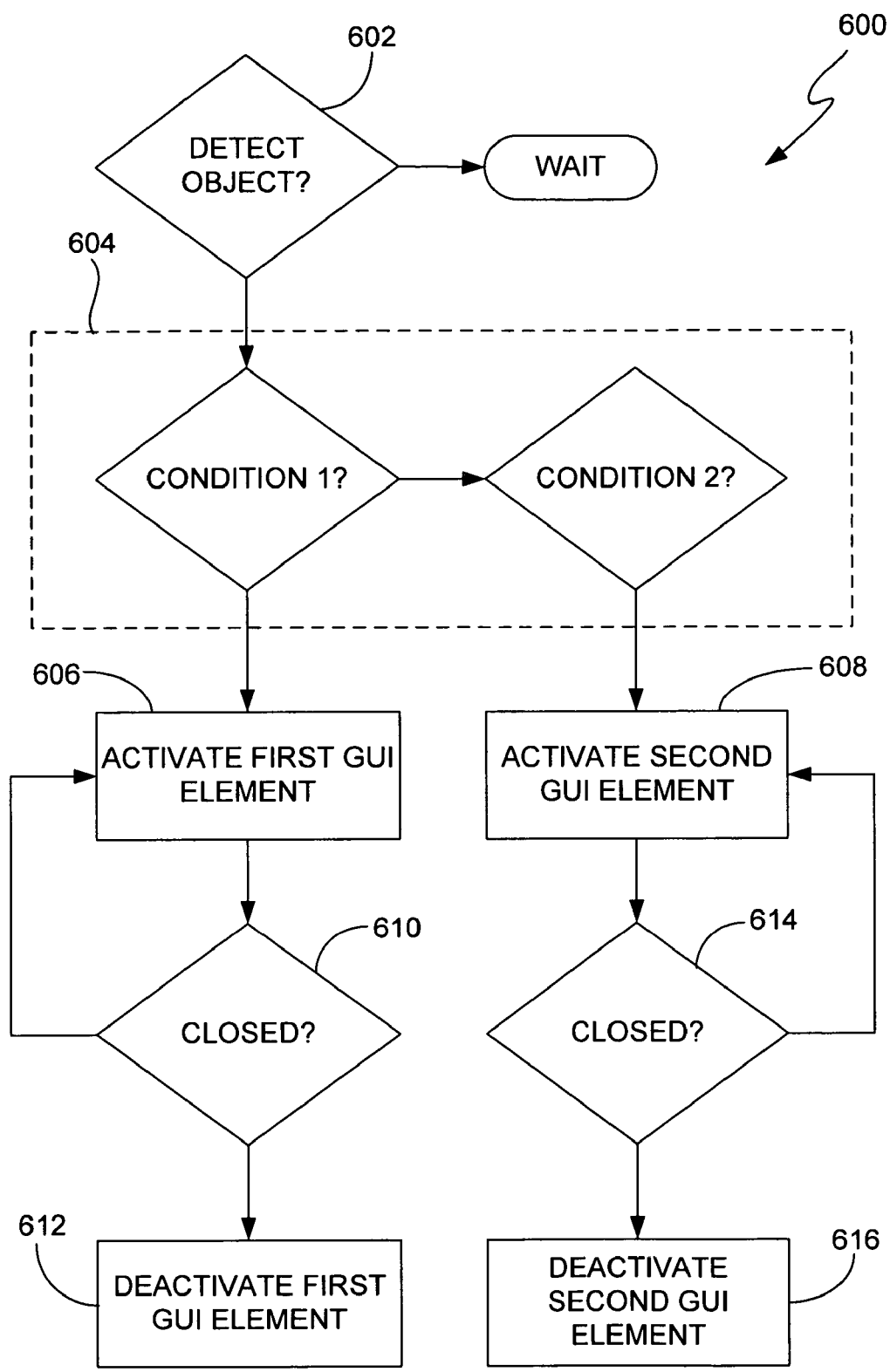
FIG. 16 is a user interface method, in accordance with one embodiment of the present invention.

FIG. 16 is a method 600, in accordance with one embodiment of the present invention. The method begins at block 602 where it is determined if an object in space is detected. If an object is detected, the method proceeds to block 604 where the current operating conditions are monitored and analyzed. The conditions may for example correspond to the current application, the state of the application and/or the proximity characteristics associated with the object.

Figure 17A:
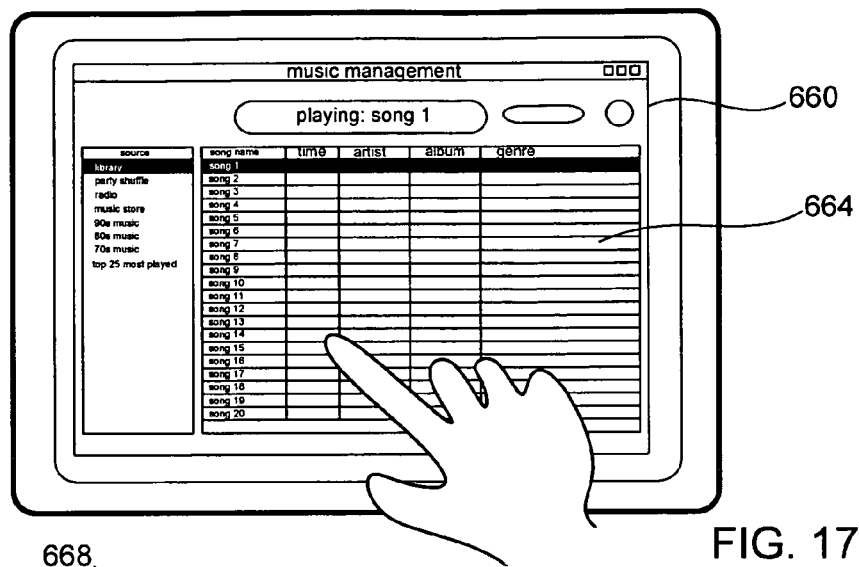
FIGS. 17A-17J illustrate a user interface sequence, in accordance with one embodiment of the present invention.
Figure 17B:
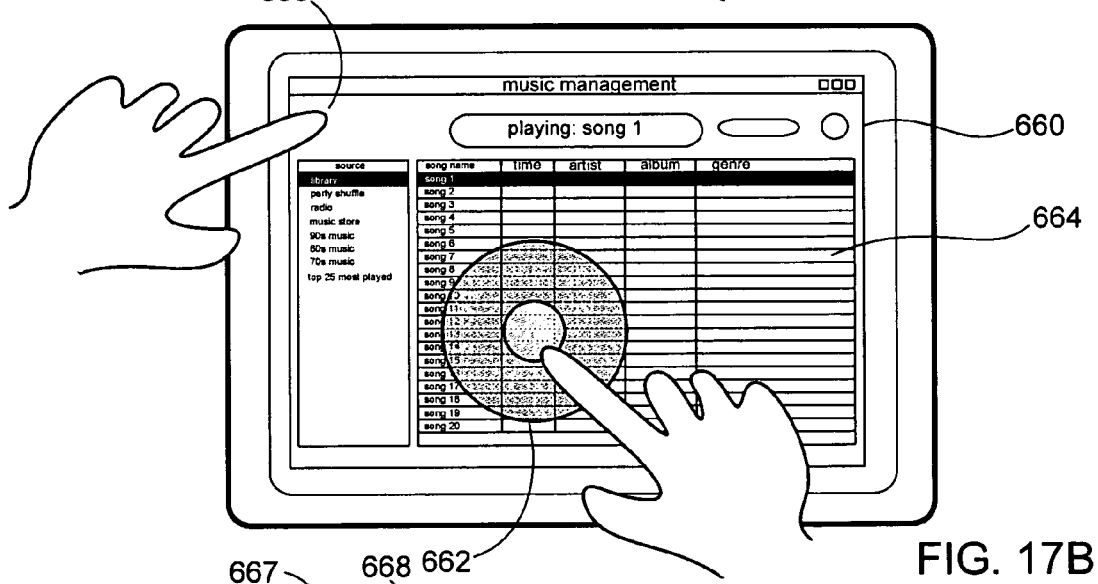

If a first set of conditions are implemented, the method proceeds to block 606 where a first GUI element is activated. For example, as shown in FIGS. 17A-B, in an active window 660 of a music management program, a scroll wheel 662 may be activated when a user places their finger above a playlist portion 664 of the active window 660 without touching the touch surface.

Figure 17C:
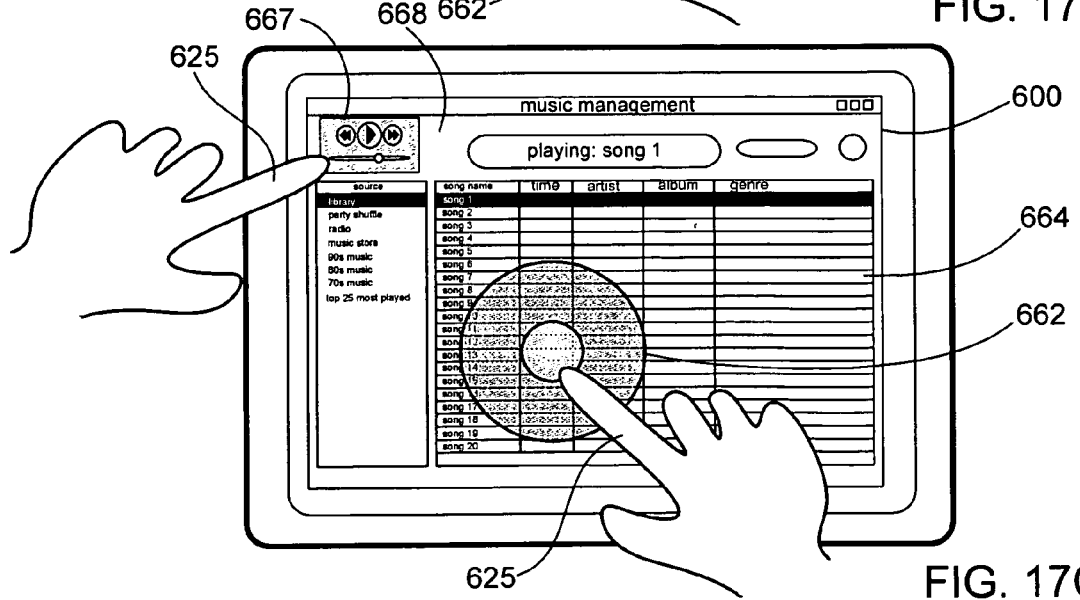

If a second set of conditions are implemented, the method proceeds to block 608 where a second GUI element is activated. For example, as shown in FIGS. 17B-C, in the active window 660 of a music management program, a music control panel 667 may be activated when a user also touches a border 668 of the active window 660. Although they work independent of one another, the first and second GUI elements may be activated at the same time if the first and second conditions occur simultaneously (FIG. 13C).

Figure 17D:
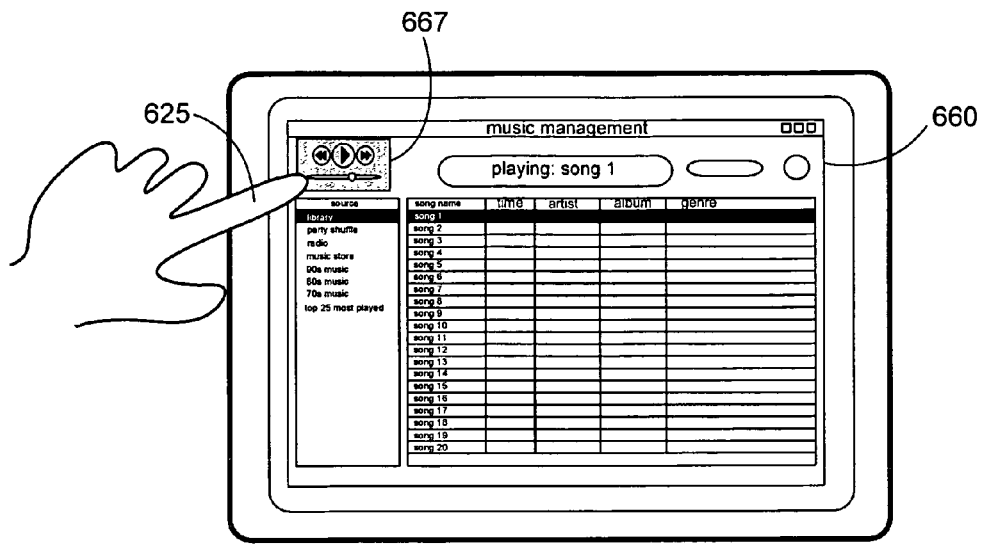

Following block 606, the method proceeds to block 610 where it is determined if the first GUI element should be deactivated. If so, the method proceeds to block 612 where the GUI element is deactivated. For example, as shown in FIG. 17D, the first GUI element (scroll wheel 662) is disabled and removed from display when the finger 625 is no longer detected over the playlist 662. If not, the method maintains block 606.

Figure 17E:
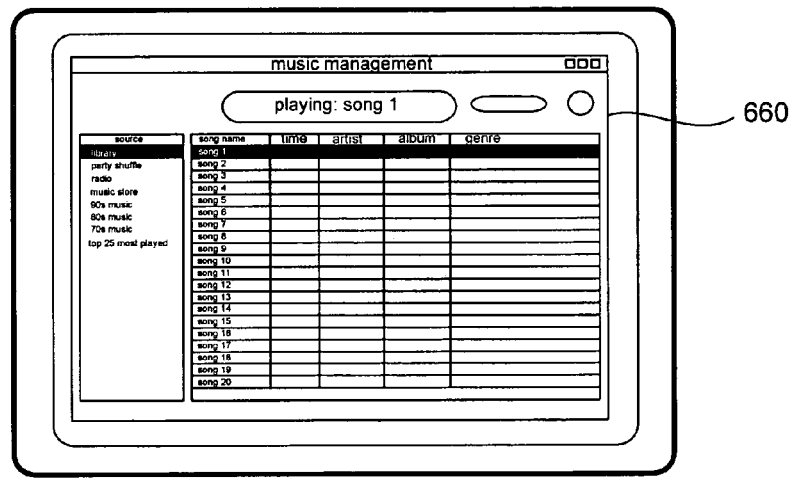

Similarly but independently, following block 608, the method proceeds to block 614 where it is determined if the second GUI element should be deactivated. If so, the method proceeds to block 616 where the GUI element is deactivated. For example, as shown in FIG. 17E, the second GUI element (control panel 667) is disabled and removed from display when the finger 625 is no longer detected over the border 668. If not, the method maintains block 608.

Figure 17F:
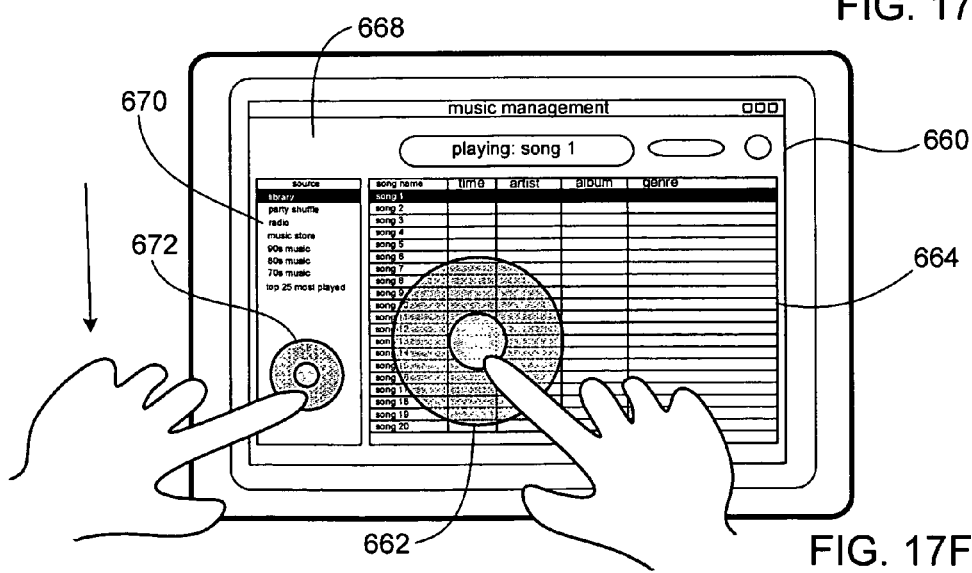

It should be noted that the method is not limited to only two GUI elements and that other GUI elements may be activated if other conditions are implemented (N+1). For example, as shown in FIG. 17F, the user may move their finger 625 from over the border 668 to over a menu portion 670 of the active window 660 thereby initiating a change from the control panel 667 to a scroll wheel 672 (e.g., while the second GUI element is being deactivated, the third GUI element is being activated).

Figure 17G:
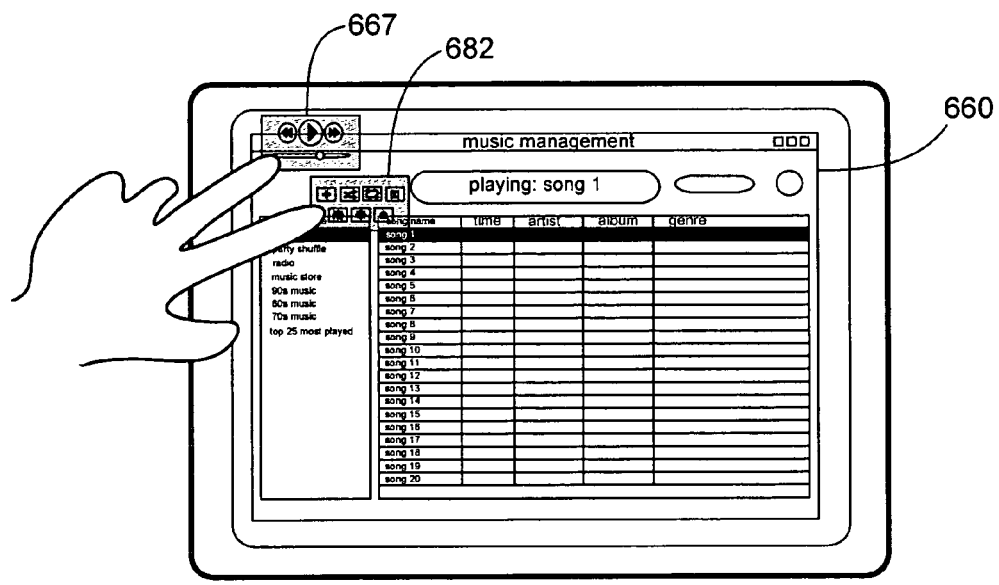

Further, as shown in FIG. 17G, the user may add another finger 625 to the mix thereby initiating a change from the first control panel 667 to a second control panel 682. The first control panel 667 may include a first set of control options such as play, stop, seek and volume options and the second control panel 682 may include a second set of control options such as song playing order, song information, light effect options.

Figure 17H:
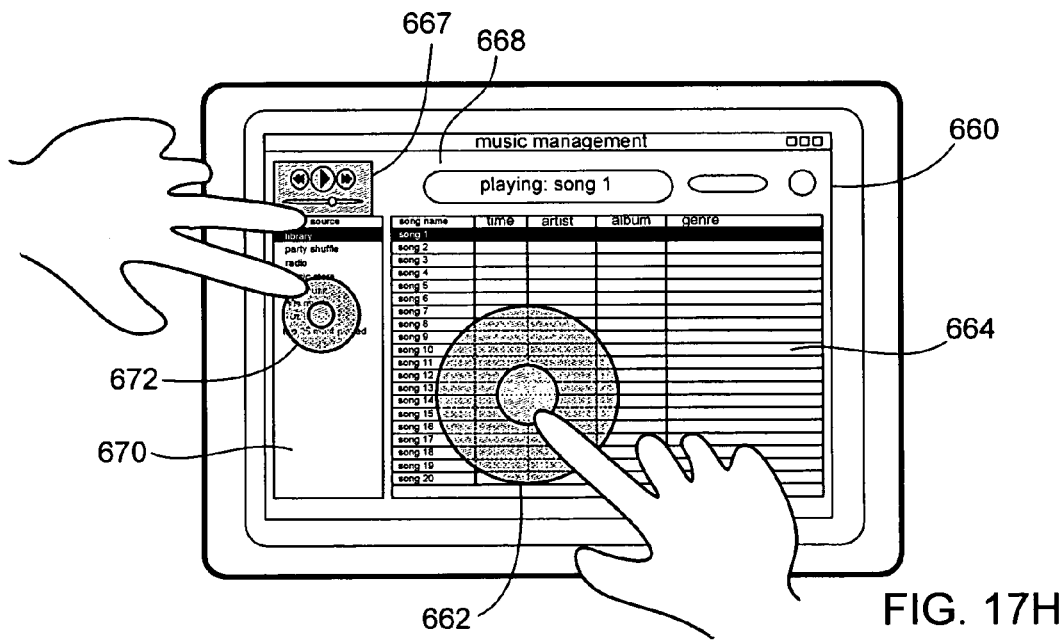

Moreover, as shown in FIG. 17H, the user may place one finger 625A over the border 668, another finger 625B over a menu portion 670, and yet another finger 625C over the playlist portion 664 thereby initiating three different GUI elements, particularly, a control panel 667, a first scroll wheel 672 for scrolling through the menu 670, and a second scroll wheel 662 for scrolling through the playlist 664.

Figure 17I:
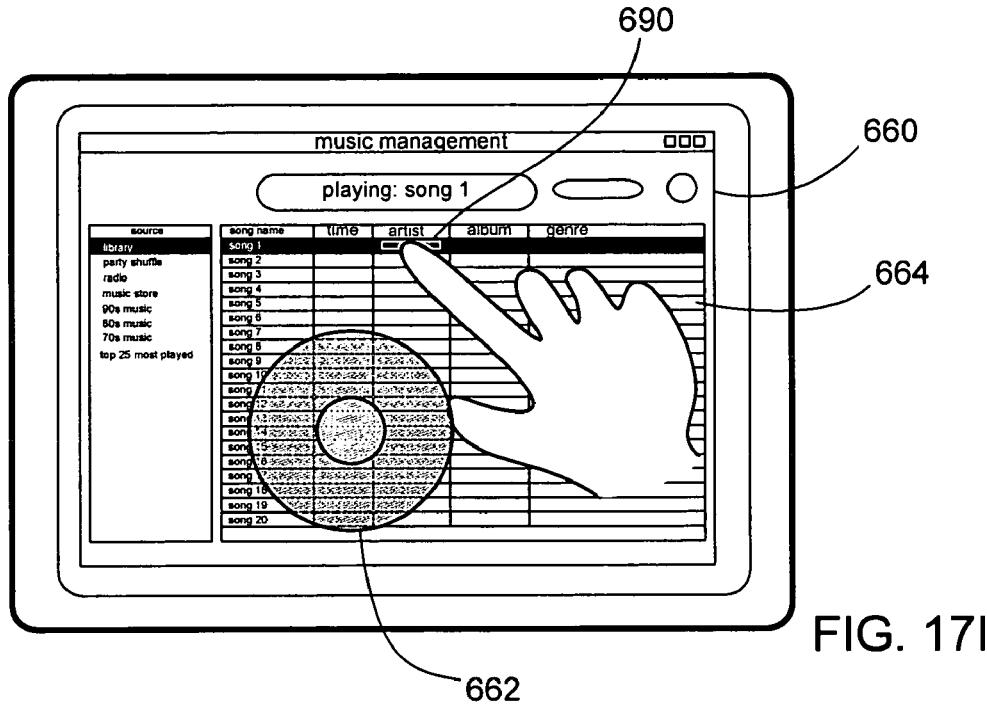
Figure 17J:
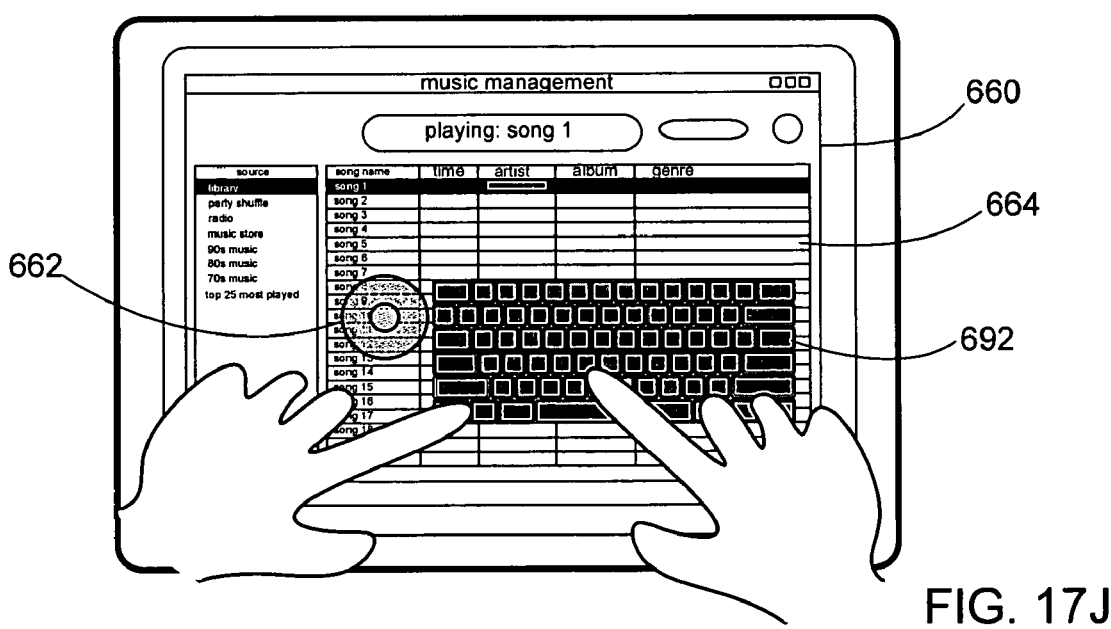

In addition, multiple GUI elements can be activated in the same portion. For example, as shown in FIGS. 17I and 17J, if the user places their finger over a particular box 690 in the playlist 664, a keyboard 692 may be activated so that the user can enter data associated with the song (e.g., title, artist, genre, etc.). If the scroll wheel 662 is active at the same time as the keyboard 692, the scroll wheel 662 may be minimized to accommodate the keyboard 692 as shown. Once the keyboard 992 is deactivated, the scroll wheel 662 reverts back to its original size.

Figure 18:
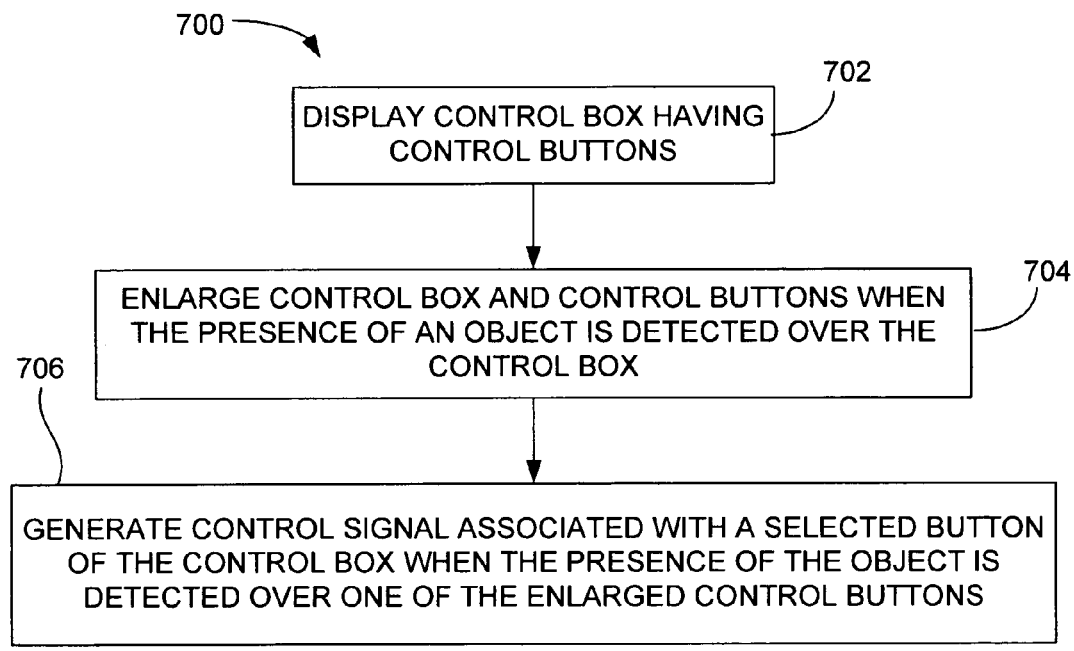
FIG. 18 is a diagram of a GUI operational method, in accordance with one embodiment of the present invention.

FIG. 18 is a diagram of a GUI operational method 700, in accordance with one embodiment of the present invention. The GUI operational method 700 is configured for initiating zooming targets. The GUI operational method 700 generally begins at block 702 where a control box GUI element is displayed. The control box contains one or more control buttons, which are somewhat close together, and which can be used to perform actions. The control box may, for example, include control buttons such as maximize, minimize, close, and the like. Following block 702, the GUI operational method 700 proceeds to block 704 where the control box is enlarged, or at least one of the control buttons is enlarged for a period of time when the presence of an object is detected above the touch screen and over the control box or one of the control buttons. In the case where the control box is enlarged each of the control buttons is enlarged thereby making selection thereof much easier. In the case where only the control button is enlarged, the user would decide whether this is the correct button and if so select the enlarged control button, or restart the process so that the appropriate control button is presented. In most cases, the size of the control buttons corresponds to the size of the finger so that they may be easily selected by the object. Following block 704, the GUI operational method 700 proceeds to block 706 where a control signal associated with the selected control button is generated when the object is placed on the touch screen and over one of the enlarged control buttons.

Figure 19A:
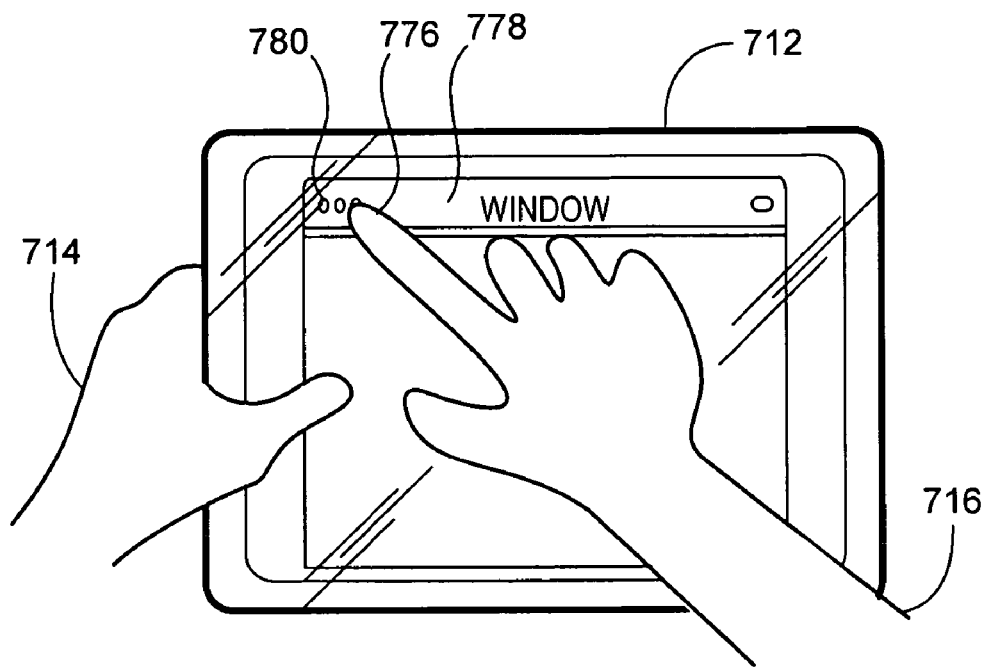
FIGS. 19A-19D illustrate a zooming target sequence using the GUI operational method, in accordance with one embodiment of the present invention.
Figure 19B:
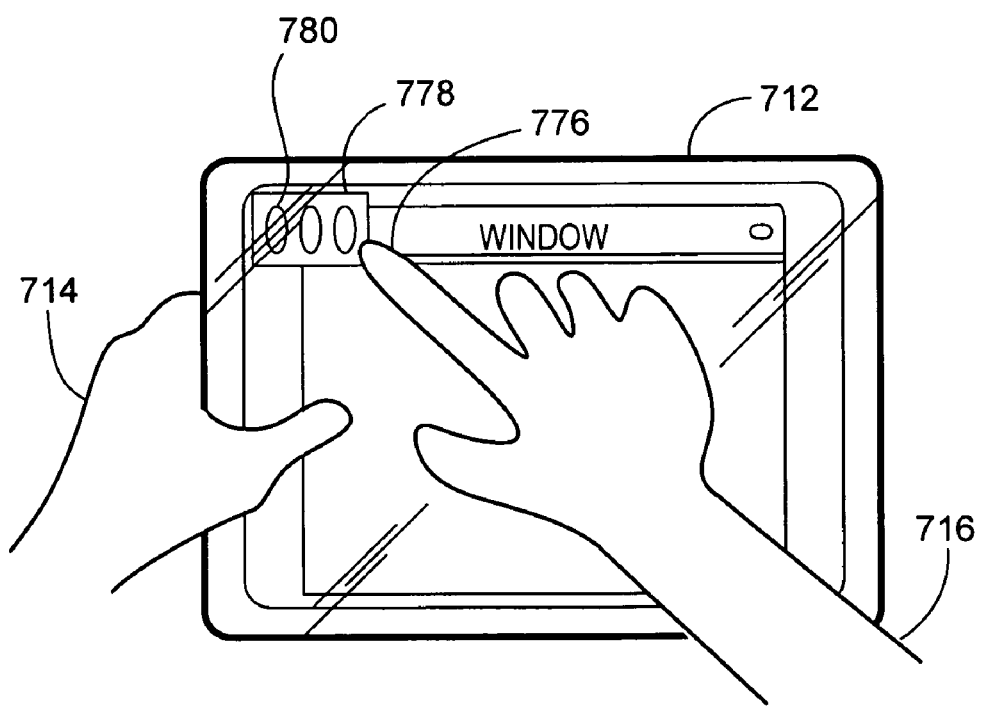
Figure 19C:
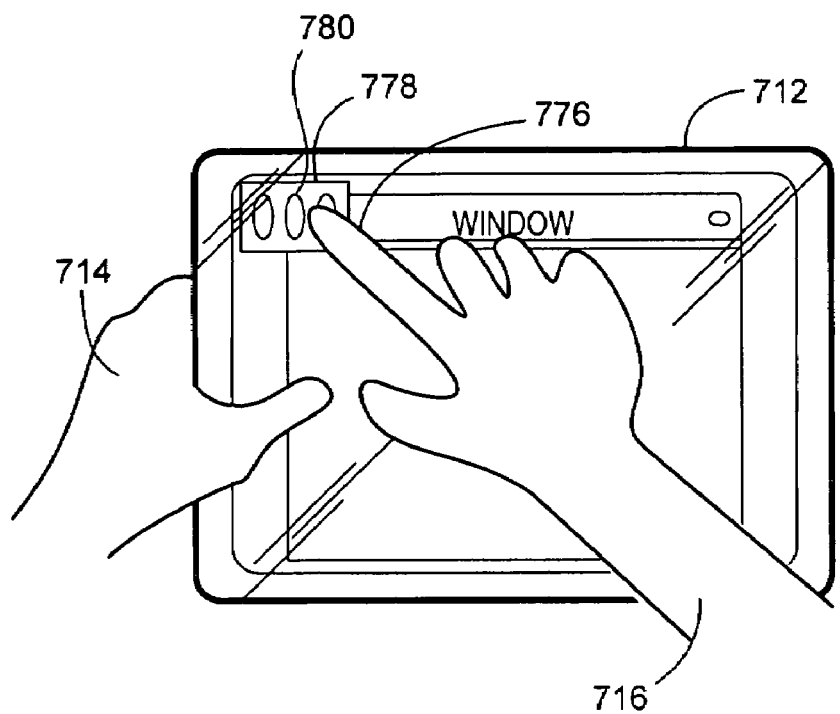
Figure 19D:
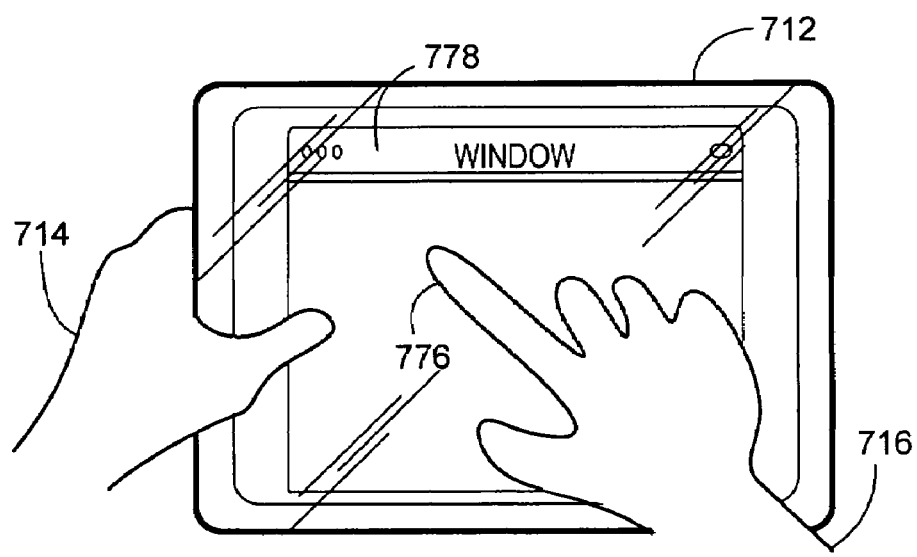

FIGS. 19A-19D illustrate a zooming target sequence using the GUI operational method 700 described above. As shown in FIG. 19A, a user 710 places their finger 776 above the touch screen and over a control box 778. Because the buttons 780 of the control box 778 included therein are smaller than the finger 776 and located close together, it is difficult for the user 710 to make a selection directly without possibly pressing an undesirable button 780, e.g., a button adjacent the desired button. By way of example, the finger 776 may cover two or more of the buttons 780. As shown in FIG. 19B, at least a portion of the control box 778 is enlarged including the buttons 780 included therein when the finger is detected. As shown in FIG. 19C, once the control box has reached its enlarged state, the user can select one of the enlarged buttons, which is now closer to the size of the finger using the touch screen. By way of example, the user may tap on the desired control button. As shown in FIG. 19D, the control box reduces to its initial size after the button is selected or after a predetermined time period in which no selection was made (e.g., times out) or when the user moves their finger substantially away from touch screen (out of the proximity sensing area) or when the user moves their finger out of the area of the control box while still in the sensing area of the proximity detector.

Figure 20:
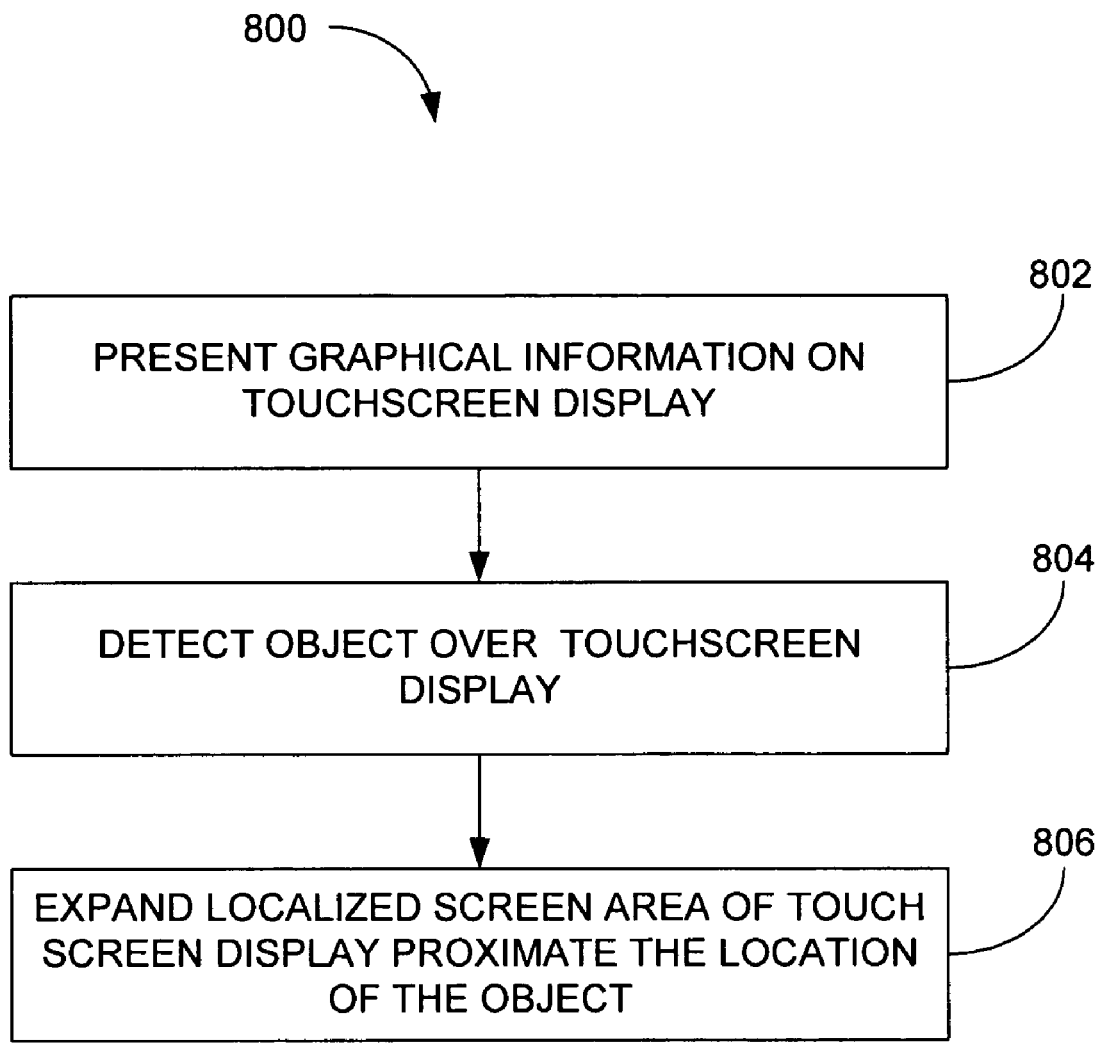
FIG. 20 is an expansion method, in accordance with one embodiment of the present invention.

FIG. 20 is an expansion method 800, in accordance with one embodiment of the present invention. The method may be implemented on computing devices having a touch screen display and a proximity detector. The method generally begins at block 802 where graphical information is presented on the touchscreen display. This is typically accomplished with the display portion of the touchscreen display. In most cases the graphical information fills the entire display screen, although in some cases it may only fill a portion of the display screen. The graphical information may for example be a graphical user interface (GUI). As is generally well known, the GUI represents programs, files and operational options with graphical images. The graphical images may include windows, fields, dialog boxes, menus, icons, buttons, cursors, scroll bars, etc. During operation, the user can select and activate various graphical images in order to initiate functions and tasks associated therewith. By way of example, a user may select a button that opens, closes, minimizes, or maximizes a window, an icon that launches a particular program or a link that opens a particular web page. In addition, the user may actuate user interface controls such as a scroll bar to perform scrolling in the GUI. The GUI can additionally or alternatively display non interactive text and graphics Following block 802, the method proceeds to block 804 where an object is detected over the touchscreen display. This is generally accomplished with the proximity detector and/or the touchscreen display (e.g., capacitive). Depending on the configuration of the proximity detector, the proximity detector may recognizes one or more objects, as well as the position and magnitude of objects in the sensing region of the proximity detector.

Following block 804, the method proceeds to block 806 where an area or portion of the touchscreen display is expanded proximate the location of the object. Any portion of the touchscreen display can be expanded. The step of expanding may include visually expanding a portion of the presented graphical information in the region of the object relative to the remaining portions of the presented graphical information outside the region of the object. The step of expanding may also include expanding the touch sensitive portions associated with the expanded visual portion. The sensitive portion are points or regions of the touchscreen that are linked to particular points or regions of the graphical information as for example, the touch sensitive region above a graphical button. In most cases, the sensitive portions are scaled with the visually expanded portions. That is, the step of expanding includes scaling the input sensitivity with the expanded visual portions of the graphical information. The scaling may be proportional since the sensitive portions are typically a little larger than the visual portions (the visual portion and the sensitive portion aren't exactly a 1:1 relationship). By way of example, if the visual portion grows by a factor of 3 then the sensitive portion grows by a factor of 3.

During expansion, the visual and/or sensitive portions of the touchscreen display may be magnified and/or increased in size compared to the remaining visual and/or sensitive portions of the touchscreen display. By way of example, the visual portion may grow from its original size to an enlarged size (e.g., from 4 mm to 8 mm) and be magnified from its original state to a magnified state (e.g., from 1× to 2×). Although the expanded portions are enlarged and magnified, in most cases, the expanded portion maintains the same aspect ratio and shape that it has in the unexpanded state. As should be appreciated, expansion may be somewhat analogous to zooming.

The area that is expanded may be the area underneath the object. Alternatively, the area that is expanded may be offset from the object such as for example above, below or to the sides of the object. This may allow the user to more clearly view the expanded area.

The size, magnification and shape of the expanded area may be widely varied. By way of example, and not by way of limitation, the expanded area may have an area of between about 100 nm$^2$ and about 400 mm$^2$, and a height and width between about 10 mm to about 20 mm. Furthermore, the expanded portions may be magnified between greater than 1 time to over a thousand times, more particularly between about 2× to about 100×, and even more particularly, the between about 2× and about 20×. Moreover, the expanded area may be formed from various shapes including but not limited to circles, ovals, squares, rectangles, triangles, and the like. Other shapes such as symbols, logos, characters may also be used.

In one embodiment, the expanded portion of the graphical information is raised relative to the non expanded portion of the graphical information. For example, the expanded portion may appear to protrude away from the non expanded portions. This is typically done graphically as both the expanded and non expanded portions are typically produced in the same plane. By way of example, shading principals may be used to make the expanded portion appear to protrude away from the non expanded portions.

In some cases, the expanded portion includes a substantially planar plateau region and a substantially sloped transition region. The planar plateau region provides a planar surface for displaying the targeted graphical information and the transition region provides a gradient of growth between the plateau region and the non expanded portion of the graphical information. The transition region, which is the edge of the plateau compacts or compresses the graphical information located between the plateau and the non expanded portion of the graphical information. For example, the graphical information contained in the transition region have compacted or compressed magnification levels (this may distort the graphical information contained therein) In alternative implementations, the plateau may be rounded rather than being planar or the expanded portion may be one large transition region without having a plateau. In either case, the expanded portion may look like a rounded pimple or bump.

The expanded portion may be a localized area, which can be any portion of the graphical information. The localized area may include any portion of the graphical information including but not limited to background (e.g., wall paper), windows, fields, text, dialog boxes, menus, icons, buttons, cursors, UI controls or any combination thereof.

The expanded portion may also be linked to a particular object of the graphical information. For example, a particular window, field, dialog box, menu, icon, button, tool bar, user interface element (e.g., scroll bar, scroll wheel, slider bar, dial), control box, footnote and the like. In some case, the entire object is expanded. For example, when the finger is placed over a window, the entire window is expanded. In other cases, only a portion of the object is expanded. For example, when the finger is placed over a tool bar, only the selectable items are expanded. As should be appreciated, these objects may need to be expanded so that they can be easily used by a human hand.

The time when expansion takes place can be widely varied. In one embodiment, expansion is activated immediately after the touch is detected. In another embodiment, expansion is activated after the object is detected for a predetermined amount of time. In cases such as this, the user may have to hover their finger over the area desired to be expanded for the predetermined amount of time in order to initiate the expansion. By way of example, the dwell time may be between about 0.5 to about 5 seconds, and more particularly about 1 second. This embodiment may be employed to prevent inadvertent expansion. That is, the time delay may be used to avoid implementing expansion with casual contact not intended for expansion.

Once expansion is activated, the speed or rate at which the expanded area expands may be widely varied. The growth can happen quickly or slowly. In one embodiment, the expanded area grows from its normal state to the expanded state almost instantaneously. In another embodiment, the expanded area grows over some predetermined amount of time, i.e., the area expands gradually over time. The rate may be preset or it may be based on some external factor. For example, the rate of growth may be based on the touch pressure, i.e., the greater the touch pressure, the greater the rate of change. Alternatively, the rate of growth may be based on multiple taps, i.e., each tap causes incremental expansion.

The manner in which expansion is implemented may also be widely varied. In one embodiment, the amount of expansion (size, magnification, etc) is preset. The preset amount may be fixed or it may be adjustable. For example, a user may adjust the characteristics of expansion via a control menu. In another embodiment, the amount of expansion is based on some external factor. In one case, the amount of expansion may be based on the location of the object relative to the graphical information (e.g., region sensitivity). For example, a first located object of the graphical information may be magnified 2× and a second located object of the graphical information may be magnified 16×. In yet another embodiment, the expanded portion may be configured to follow the object as the object is moved across and above the touchscreen display. For example, the location of the expanded portion changes in accordance with the location of the object, i.e., it mirrors the position of the object.

Although not shown in FIG. 20, the method may include additional steps such as reverting back to a non expanded state when the object is no longer detected. In one embodiment, the expansion is deactivated immediately after the object is no longer detected thereby causing the expanded portion to revert back to its normal state. In another embodiment, expansion is deactivated after a predetermined amount of time, i.e., there is a lag time. The lag time may be preset (e.g., user settable) or it may be based on external factors such as the amount of information located in the expanded area and human factors such as how long the user would take to read or grasp this particular amount of information. The lag time may allow the user to establish if the expanded area is the desired target. If its not the desired target, the user can move their finger to a new target. If it is the desired target, the user may perform additionally steps within the expanded area. By way of example, and not by way of limitation the lag time may be between about 0.5 to about 5 seconds, and more particularly 1 second.

The speed or rate at which the expanded area reverts back to its normal state may be widely varied. The atrophy can happen quickly or slowly. In one embodiment, the expanded area atrophies from its expanded state to the normal state almost instantaneously. In another embodiment, the expanded area atrophies over some predetermined amount of time, i.e., the area atrophies gradually over time.

The method may also include receiving inputs within the expanded area. The inputs may for example be touch events such as a selection input that is implemented with tapping or increased touch pressure. Alternatively, the input may be a gestural input or a data entry input. By way of example, in an expanded state, a virtual scroll wheel may be capable of being manipulated by a swirling finger gesture or text may be entered into an expanded document. In all of these cases, the expansion may be designed to expand a feature or group of features (such as buttons) so that they are adequately sized for finger manipulation.

Moreover, the method may include detecting a second object over the touchscreen display and expanding a second area of the touchscreen display proximate to the location of the second object. In one implementation, the second object is detected at the same time as the first object such that the first and second expanded areas are expanded simultaneously (as for example using a multipoint proximity detection system). In another implementation, the second object is detected after the completion of the first object. In cases such as this, if the placement of the second object occurs during the lag time of the first expansion, then the first expansion may smoothly transition to the second expansion (e.g., as the first gradually shrinks, the second gradually expands). Alternatively, a second object in the region of the expanded area may cause further expansion. For example, if the expanded portion includes a plurality of features, a second object may be used to further expand one or more of the features. Thereafter, the feature may be selected for example by performing a touch event on the touch screen.

Alternatively, expansion may not be implemented if more than one object is detected at the same time, i.e., simultaneously. This "double object" could be considered a null input for the purposes of expansion.

The methods mentioned above may be implemented with software or hardware, or a combination of hardware and software. In one embodiment, the method is implemented by an operating system. As such, the method may be implemented during any program or application running in conjunction with the operating system. That is, expansion can occur in any program or application. By way of example, the operating system may correspond to Mac OS, OS/2, DOS, Unix, Linux, Palm OS, and the like. The operating system can also be a special purpose operating system, such as may be used for limited purpose appliance-type computing devices. Operating systems are generally well known and will not be described in greater detail.

Figure 21:
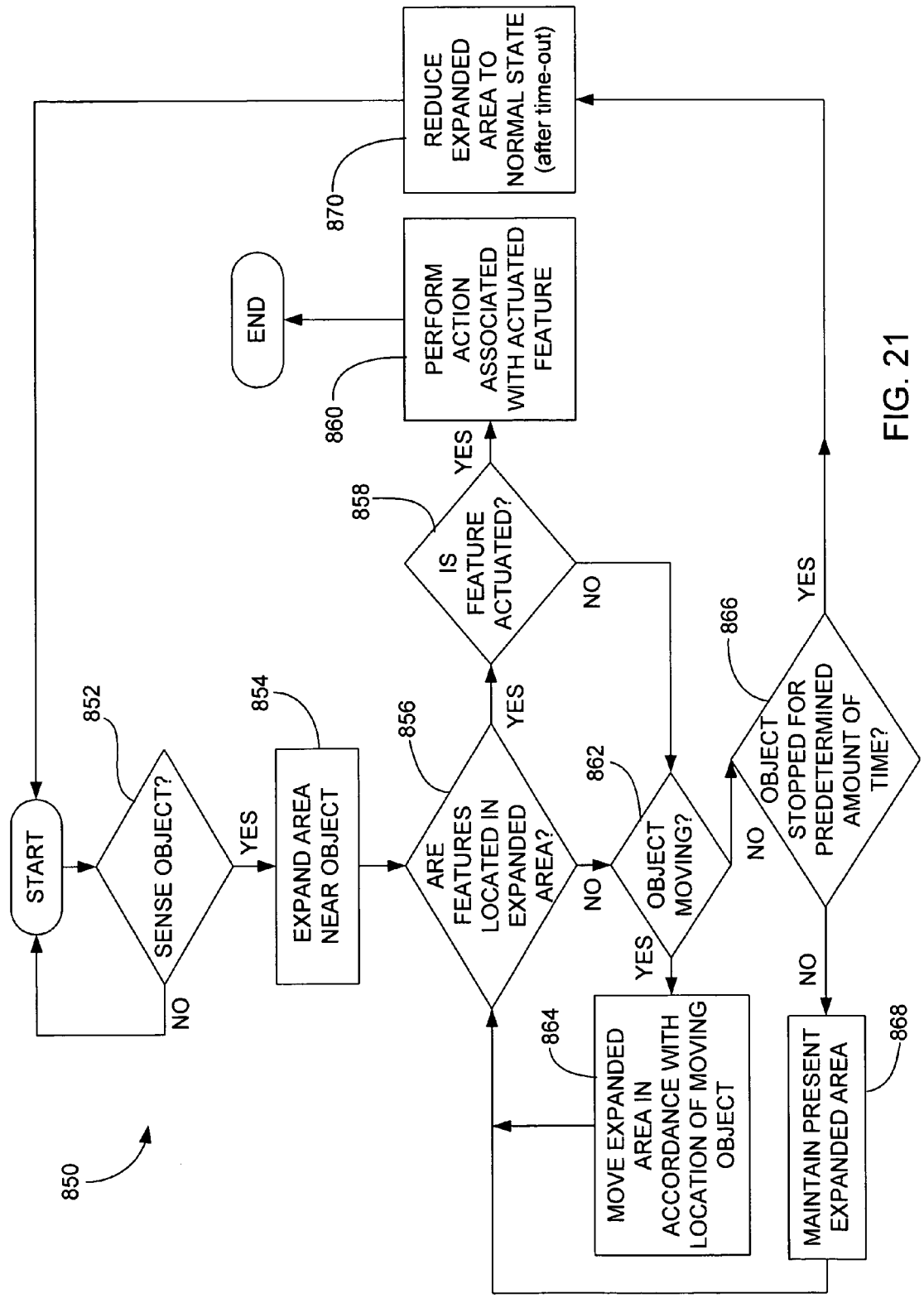
FIG. 21 is a proximity method, in accordance with one embodiment of the present invention.

FIG. 21 is a proximity method 850, in accordance with one embodiment of the present invention. The method begins at block 852 where object sensing is performed via a proximity detection system. The object may for example be a finger or stylus. The object is sensed when the object is placed over, but not in contact with a touchscreen display.

If an object is sensed, the method proceeds to block 854 where the area near the sensed object is expanded. In particular, a portion of the GUI in the vicinity of the object is visually expanded relative to the remaining portions of the GUI. The touch sensitivity associated with the GUI is also expanded. The expanded area may be expanded immediately or it may appear to gradually grow until it reaches its final shape size, elevation, etc.

In most cases the visually expanded portion is made to appear like it is protruding out of the image plane. The protruding effect is typically accomplished through graphics such as shading or other similar means. The protruding effect may be implemented in a localized area of the GUI or it may be implemented at a particular GUI image such as a control box, tool bar, user interface element, and/or the like.

In one embodiment, the expanded portion includes a plateau region and a transition region. During expansion, the target area contained within the plateau region increases in size and magnification. At the same time, the transition region compresses the GUI between the target area contained in the plateau region and the remaining unexpanded portions of the GUI. As a result, the plateau region appears to raise above the remaining portions of the GUI.

Following block 854, the method proceeds to block 856 where a determination is made as to whether or not features are located within the expanded area. The features may be buttons, web links, icons, user interface elements, data entry regions and/or the like.

If a feature is located within the expanded area, the method proceeds to block 858 where a determination is made as to whether or not the feature is actuated via a touch event (e.g., selected, activated, etc.). For example, the object changes from hovering over the touch surface of the touchscreen to actually touching the touchscreen. The determination may include monitoring touches that occur after a hover and associating or linking a particular feature to the touching object. The association or link may be made by ranking the relevance of the touching object to the feature. The ranking may for example include producing a figure of merit, and whichever feature has the highest figure of merit, giving it sole access to the events occurring with the touching object. By way of example, the ranking may include calculating the centroid of a touch and its proximity to the feature.

If the feature is a user interface element, the feature may be actuated via a touch gesture. See for example, U.S. patent application Ser. No. 10/903,964, which is herein incorporated by reference. If the feature is a data entry feature, the feature may be actuated by entering data as for example through the use of a cursor or keyboard (e.g., word processing).

In cases where the expanded area includes a plurality of features, an intermediate block may be included between blocks 856 and 858. The intermediate block includes providing feedback as to which feature is the most likely selectable feature based on some predefined criteria (the feedback indicates where a system thinks the user is targeting). The criteria may for example be based on the location of the spaced away object relative the location of the various features. For example, the feature located closest to the object may indicate that it is the most likely candidate for selection. In essence, the feedback is a confirmation of correct targeting before selection. If the user does not get the right feedback, the user has the option of moving their finger to another location. The feedback may be visual or auditory. By way of example, visual feedback may include modifying the feature such as changing its color, position, size, shape, symbol, etc., and auditory indication may include providing sounds associated with the feature.

Once the feature is actuated, the method proceeds to block 860 where an action associated with the feature is performed. The action may for example include launching a particular program, opening a file or document, viewing a menu, making a selection, executing instructions, generating control signals, and the like.

If the feature is not actuated or if there is no feature located within the expanded area, the method proceeds to block 862 where a determination is made as to whether or not the object (finger) is moving in the sensing field of the proximity detector. For example, if the object is stationary in the sensing field or whether the object is being moved about the sending field.

If the object is moving, the method proceeds to block 864 where the expanded area is moved in accordance with the location of the moving object. That is, the expanded area follows the motion of the object.

If it is determined that the object is not moving, the method proceeds to block 866 where a determination is made as whether or not the object is still sensed. If so, the method proceeds to block 868 where the present expanded area is maintained. Thereafter, the method proceeds back to block 856. If the object is not sensed, the method proceeds to block 870 where the expanded area is reduced to its normal state. The reduction may mimic the expansion, but in a reverse direction. By way of example, in embodiments where the expanded portion includes a plateau region and a transition region, the target area contained within the plateau region may be decreased in size and magnification. At the same time, the transition region may decompress the GUI between the target area contained in the plateau region and the remaining unexpanded portions of the GUI. As a result, the plateau region appears to integrate back into the remaining portions of the GUI. Furthermore, the reduction may occur immediately after the object is not sensed or after some predetermined amount of time.

Figure 22:
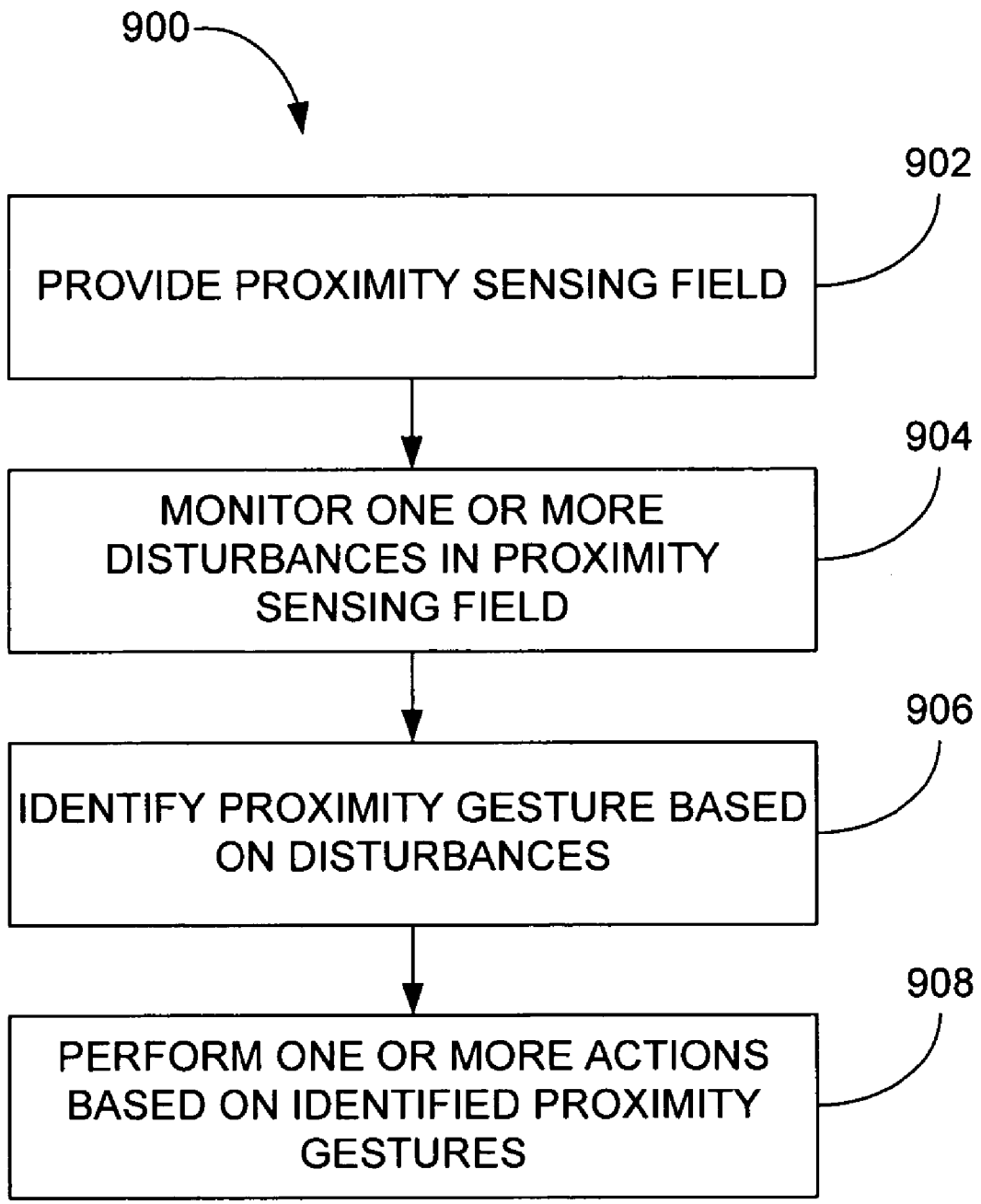
FIG. 22 is a proximity gesture method, in accordance with one embodiment of the present invention.

FIG. 22 is a proximity gesture method 900, in accordance with one embodiment of the present invention. The method generally starts at block 902 where a proximity sensing field is provided. The proximity field may be a single node proximity field or a pixilated array of sensing nodes.

The method proceeds to block 904 where disturbances or changes in the sensing field are monitored. For example, the time between disturbances (tap) and/or the time of the disturbances (lag) and/or the location of distinct disturbances (first tap, second tap), varying locations of a single disturbance (tracking), etc. are monitored. A disturbance being associated with when an object is detected.

Thereafter in block 906, one or more proximity gestures are identified based on the characteristics of the disturbances, i.e., the amount of time the finger hovers, the number of taps, the length of time between taps, etc.

Thereafter in block 908, one or more actions are performed based on the identified proximity gestures.

The proximity gestures may be similar to touch gestures except that no touch occurs. The finger or hand gesture is performed above the surface and thus there is no contact. Some examples of touch gestures that may be applied to proximity gestures can be found in U.S. patent application Ser. Nos. 10/903,964 and 11/038,590, which are herein incorporated by reference.

Figure 23:
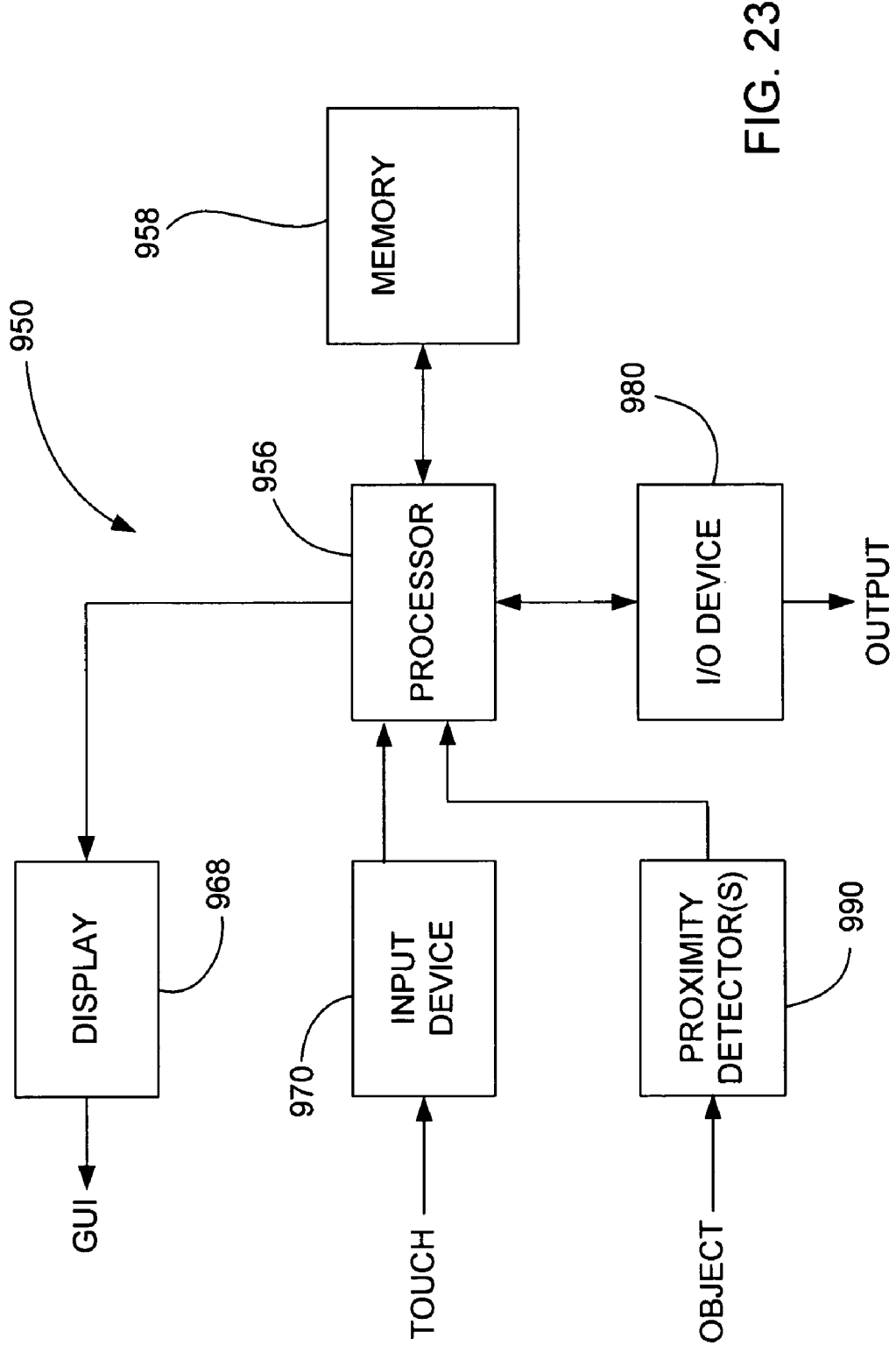
FIG. 23 is a block diagram of an exemplary computer system, in accordance with one embodiment of the present invention.

FIG. 23 is a block diagram of an exemplary computer system 950, in accordance with one embodiment of the present invention. The computer system 950 may correspond to a personal computer, such as a desktop, laptop, tablet or handheld computer. The computer system may also correspond to other types of computing devices such as a cell phones, PDAs, media players, consumer electronic devices, and/or the like.

The exemplary computer system 950 shown in FIG. 23 includes a processor 956 configured to execute instructions and to carry out operations associated with the computer system 950. For example, using instructions retrieved for example from memory, the processor 956 may control the reception and manipulation of input and output data between components of the computing system 950. The processor 956 can be implemented on a single-chip, multiple chips or multiple electrical components. For example, various architectures can be used for the processor 956, including dedicated or embedded processor, single purpose processor, controller, ASIC, and so forth.

In most cases, the processor 956 together with an operating system operates to execute computer code and produce and use data. By way of example, the operating system may correspond to Mac OS, OS/2, DOS, Unix, Linux, Palm OS, and the like. The operating system can also be a special purpose operating system, such as may be used for limited purpose appliance-type computing devices. The operating system, other computer code and data may reside within a memory block 658 that is operatively coupled to the processor 656. Memory block 658 generally provides a place to store computer code and data that are used by the computer system 950. By way of example, the memory block 658 may include Read-Only Memory (ROM), Random-Access Memory (RAM), hard disk drive and/or the like. The information could also reside on a removable storage medium and loaded or installed onto the computer system 650 when needed. Removable storage media include, for example, CD-ROM, PC-CARD, memory card, floppy disk, magnetic tape, and a network component.

The computer system 950 also includes a display device 968 that is operatively coupled to the processor 956. The display device 968 may be a liquid crystal display (LCD) (e.g., active matrix, passive matrix and the like). Alternatively, the display device 968 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks or OLEDs.

The display device 968 is generally configured to display a graphical user interface (GUI) that provides an easy to use interface between a user of the computer system and the operating system or application running thereon. Generally speaking, the GUI represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI can additionally or alternatively display information, such as non interactive text and graphics, for the user on the display device 968.

The computer system 950 also includes an input device 970 that is operatively coupled to the processor 956. The input device 970 is configured to transfer data from the outside world into the computer system 950. The input device 970 may include a touch sensing device configured to receive input from a user's touch and to send this information to the processor 956. In many cases, the touch-sensing device recognizes touches, as well as the position and magnitude of touches on a touch sensitive surface. The touch sensing means reports the touches to the processor 956 and the processor 956 interprets the touches in accordance with its programming. For example, the processor 956 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

In the illustrated embodiment, the input device 970 is a touch screen that is positioned over or in front of the display 968. The touch screen 670 may be integrated with the display device 968 or it may be a separate component. The touch screen 970 has several advantages over other input technologies such as touchpads, mice, etc. For one, the touch screen 670 is positioned in front of the display 968 and therefore the user can manipulate the GUI directly. For example, the user can simply place their finger over an object to be selected, activated, controlled, etc. In touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens.

The touchscreen can be a single point or multipoint touchscreen. Multipoint input devices have advantages over conventional single point devices in that they can distinguish more than one object (finger) simultaneously. Single point devices are simply incapable of distinguishing multiple objects at the same time. By way of example, a multipoint touch screen, which can be used herein, is shown and described in greater detail in copending and commonly assigned U.S. patent application Ser. No. 10/840,862, which is hereby incorporated herein by reference.

The computer system 950 also includes a proximity detection system 990 that is operatively coupled to the processor 956. The proximity detection system 990 is configured to detect when a finger (or stylus) is in close proximity to (but not in contact with) some component of the computer system including for example housing or I/O devices such as the display and touch screen. The proximity detection system 990 may be widely varied. For example, it may be based on sensing technologies including capacitive, electric field, inductive, hall effect, reed, eddy current, magneto resistive, optical shadow, optical visual light, optical IR, optical color recognition, ultrasonic, acoustic emission, radar, heat, sonar, conductive or resistive and the like. A few of these technologies will now be briefly described.

The computer system 950 also includes capabilities for coupling to one or more I/O devices 980. By way of example, the I/O devices 980 may correspond to keyboards, printers, scanners, cameras, speakers, and/or the like. The I/O devices 980 may be integrated with the computer system 950 or they may be separate components (e.g., peripheral devices). In some cases, the I/O devices 980 may be connected to the computer system 950 through wired connections (e.g., cables/ports). In other cases, the I/O devices 980 may be connected to the computer system 950 through wireless connections. By way of example, the data link may correspond to PS/2, USB, IR, RF, Bluetooth or the like.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

The invention claimed is:

1. An I/O platform, comprising:
   an I/O surface having one or more integrated I/O devices selected from input devices and output devices;
   a proximity detection system configured to:
      detect when a finger is in close proximity to but not contacting the I/O surface;
      detect a position of the finger above the I/O surface when the finger is detected in close proximity to but not contacting the I/O surface;
      select, based on an application appearing on the I/O surface when the finger is detected in close proximity to the I/O surface but independent of x and y components of the position of the finger over the application, a first graphical user interface element from a plurality of available graphical user interface elements operable to allow input to be provided at least by movement of the finger when the finger is detected in close proximity to but not contacting the I/O surface;
      display the first graphical user interface element on the I/O surface and below the finger; and
      detect a proximity gesture performed by the movement of the finger above the first displayed graphical user interface element.

2. The I/O platform as recited in claim 1 wherein the proximity detection system is further configured to detect when the finger is in close proximity to but not contacting a particular I/O device of the I/O surface.

3. The I/O platform as recited in claim 1 wherein the I/O surface includes a touch panel and a display.

4. The I/O platform as recited in claim 1 wherein a display is affected in a non trivial manner when the finger is detected.

5. The I/O platform as recited in claim 1,
   wherein the graphical user interface element is a virtual scroll wheel, and
   wherein the movement of the finger is rotational movement that effectively rotates the virtual scroll wheel.

6. The I/O platform as recited in claim 1 wherein the graphical user interface element provides onscreen input tools and controls.

7. The I/O platform as recited in claim 1 wherein the proximity detection system is an optically based system, capacitively based system or an ultrasonic based system.

8. The I/O platform as recited in claim 1 wherein the proximity detection system generates one or more sensing fields above the I/O surface and produces signals when an object disturbs the one or more sensing fields.

9. The I/O platform as recited in claim 1 wherein a single sensing field that substantially covers the entire I/O surface is generated.

10. The I/O platform as recited in claim 9 wherein a single sensing field that only covers a portion of the I/O surface is generated.

11. The I/O platform as recited in claim 9 wherein multiple sensing fields that together substantially cover the entire I/O surface are generated.

12. The I/O platform as recited in claim 9 wherein multiple sensing fields that together only cover a portion of the I/O surface are generated.

13. The I/O platform as recited in claim 1 wherein the I/O platform is operated by:
   generating a proximity sensing field above one or more I/O devices;
   detecting disturbances in the proximity sensing field;
   translating disturbances to mean an object is present in the proximity sensing field; and
   generating a proximity control signal base on the presence of an object in the proximity sensing field.

14. A portable computing device, comprising:
   a housing;
   a user interface including an I/O surface having one or more integrated I/O devices, each of which is positioned at a surface of the housing; and
   a proximity detection system configured to:
      detect when an object is in close proximity but not touching the periphery of the portable computing device;
      detect a position of the object above the I/O surface when the object is detected in close proximity to but not touching the periphery of the portable computing device;
      select, based on an application appearing on the I/O surface when the object is detected in close proximity to the I/O surface but independent of x and y components of the position of the object over the application, a first graphical user interface element from a plurality of available graphical user interface elements that are each operable to allow input to be provided by movement of the object when the object is detected in close proximity to but not touching the periphery of the portable computing device;

display the first graphical user interface element on the periphery of the portable computing device and below the object; and detect a proximity gesture performed by movement of the object above the first displayed graphical user interface element.

15. The portable computing device as recited in claim 14 wherein the proximity detection system is configured to detect an object above a first surface of the housing.

16. The portable computing device as recited in claim 14 wherein the proximity detection system includes a single sensing node.

17. The portable computing device as recited in claim 14 wherein the proximity detection system includes multiple sensing nodes.

18. The portable computing device as recited in claim 14 wherein at least one of the I/O devices is altered when an object is detected.

19. The portable computing device as recited in claim 18 wherein the user interface includes a display and wherein a GUI element is brought into view on the display when an object is detected.

20. The portable computing device as recited in claim 19 wherein the GUI element is an onscreen control box.

21. The portable computing device as recited in claim 19 wherein the GUI element is a virtual scroll wheel.

22. The portable computing device as recited in claim 14 wherein the user interface includes a touch panel that is distinct from the proximity detection system and wherein the proximity detection system detects objects above the touch panel.

23. A portable computing device, comprising:

a display device configured to display a graphical user interface;

an input means integrated with the display device and configured to provide inputs to the portable computing device;

a proximity detector configured to detect a first object in a first position in space above the display device; and a processor operatively coupled to the display device, input means and the proximity detector, wherein the processor is operable to:

select, based on an application appearing on the display device when the first object is detected above the display device but independent of x and y components of the first position of the first object above the application, a first GUI element from a plurality of GUI elements in response to the detection of the first object in the first position in the space above the display;

cause the display device to display the first GUI element in response to the detection of the object, and perform one or more actions associated with the first GUI element when a proximity gesture is detected at the first GUI element via the input means.

24. A proximity based method implemented on a portable electronic device, comprising:

sensing an object in a position spaced away and in close proximity to a user interface of the portable electronic device, the user interface integrated with the portable electronic device; and displaying and enabling, based on an application appearing on a display portion of the user interface when the object was sensed but independent of x and y components of the position of the object over the application, a particular graphical user interface element on a display portion of the user interface;

monitoring input features of the user interface for a proximity gesture detected over the particular graphical user interface element; and performing one or more actions in the particular graphical user interface element based on the proximity gesture.

25. The method as recited in 24 wherein the sensing is performed over an entire side of the electronic device.

26. The method as recited in 24 wherein the sensing is performed regionally at particular locations of the electronic device.

27. The method as recited in 24 wherein multiple areas are sensed in order to monitor the motion of an object.

28. The method as recited in 24 wherein performing an action includes activating some portion of a user interface.

29. The method as recited in 24 wherein a second action is performed when the object is no longer detected.

30. The method as recited in 24 wherein monitoring input features includes monitoring a touch sensing device for touches and differentiating between light touch interactions and hard touch interactions.

31. The method as recited in 24 wherein the portable electronic device is a handheld portable electronic device.

32. The method as recited in 24 wherein the handheld portable electronic device is a media player.

33. A method of providing a user interface for an electronic device that includes a display and a proximity detector integrated with the electronic device, the method comprising:

determining if an object is detected in space above the electronic device;

monitoring and analyzing current operating conditions when the object is detected, the current operating conditions including an application appearing on the display;

determining, based on the monitoring and analyzing of the current operating conditions but independent of x and y components of a position of the object over the application, whether to activate a first GUI element or a second GUI element from a set of available GUI elements;

activating the first GUI element for a first set of operating conditions when activating the first GUI element is determined;

activating the second GUI element for a second set of operating conditions when activating the second GUI element is determined; and detecting a proximity gesture performed above the activated GUI element.

34. The method as recited in claim 33 wherein the display is a touch screen display, wherein determining if an object is detected in space above the electronic device comprises detecting an object in space above the touch screen display of the electronic device, and wherein the method further comprises monitoring a touch event at the touch screen, linking the touch event to the active GUI element, and controlling the GUI element with the touch event.

* * * * *

UNITED STATES PATENT AND TRADEMARK OFFICE
CERTIFICATE OF CORRECTION

PATENT NO.        : 7,653,883 B2
APPLICATION NO. : 11/241839
DATED             : January 26, 2010
INVENTOR(S)       : Hotelling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Twenty-eighth Day of December, 2010

David J. Kappos
*Director of the United States Patent and Trademark Office*